US012746682B2

(12) United States Patent
He et al.

(10) Patent No.: US 12,746,682 B2
(45) Date of Patent: Sep. 29, 2026

(54) CONTROL METHOD FOR COMPLIANT ROBOTS

(71) Applicant: The Trustees of the University of Pennsylvania, Philadelphia, PA (US)

(72) Inventors: Qiguang He, Ardmore, PA (US); Rui Yin, Philadelphia, PA (US); Yucong Hua, Philadelphia, PA (US); Weijian Jiao, Philadelphia, PA (US); Chengyang Mo, Clifton Heights, PA (US); Hang Shu, Philadelphia, PA (US); Jordan R Raney, Kempton, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 298 days.

(21) Appl. No.: 18/173,284

(22) Filed: Feb. 23, 2023

(65) Prior Publication Data

US 2025/0001607 A1 Jan. 2, 2025

Related U.S. Application Data

(60) Provisional application No. 63/313,013, filed on Feb. 23, 2022.

(51) Int. Cl.
*B25J 9/16* (2006.01)
*B25J 9/06* (2006.01)

(52) U.S. Cl.
CPC ............. *B25J 9/1694* (2013.01); *B25J 9/065* (2013.01)

(58) Field of Classification Search
None
See application file for complete search history.

(56) References Cited

U.S. PATENT DOCUMENTS

2008/0021416 A1* 1/2008 Arai .................. A61M 25/0158 604/271
2010/0258362 A1* 10/2010 Trimmer ................. B08B 9/045 180/7.1

(Continued)

FOREIGN PATENT DOCUMENTS

CN 109551470 A * 4/2019 .............. B25J 9/065
CN 110587589 A * 12/2019 .............. B25J 9/065

(Continued)

OTHER PUBLICATIONS

Yao et al., "Twisting for soft intelligent autonomous robot in unstructured environments", Proc. Natl. Acad. Sci. U.S.A., vol. 119, No. 22:e2200265119, pp. 1-10, 2022.

(Continued)

*Primary Examiner* — Daniel D Yabut
(74) *Attorney, Agent, or Firm* — BakerHostetler

(57) ABSTRACT

Provided are stimulus-responsive robots, comprising: an extensible actuator, the extensible actuator being configured such that extension and contraction of the extensible actuator effects a translational movement of the robot; and the first control unit being in mechanical communication with the extensible actuator, the first control unit comprising a first material responsive to a first external non-electrical stimulus, the control unit being configured to exert a bending force on the extensible actuator, the bending force being related to a response of the first material to the first external stimulus. Such robots can autonomously move toward and/or away from stimuli. Also provided are related methods.

27 Claims, 75 Drawing Sheets
(75 of 75 Drawing Sheet(s) Filed in Color)

(56) References Cited

U.S. PATENT DOCUMENTS

| | | | | |
|---|---|---|---|---|
| 2019/0032684 | A1* | 1/2019 | Kowalewski | B25J 18/06 |
| 2019/0348596 | A1* | 11/2019 | Pelssers | A61M 25/0158 |
| 2023/0020239 | A1* | 1/2023 | He | B62D 57/02 |

FOREIGN PATENT DOCUMENTS

| | | | | | |
|---|---|---|---|---|---|
| CN | 113199470 | A | * | 8/2021 | B25J 9/1602 |
| CN | 113386929 | A | * | 9/2021 | B25J 9/065 |
| CN | 113400288 | A | * | 9/2021 | B25J 9/065 |
| EP | 279316 | A | * | 8/1988 | |
| JP | H0866356 | A | * | 3/1996 | |

OTHER PUBLICATIONS

Yaoye et al., "Boundary curvature guided programmable shape-morphing kirigami sheets", Nat. Commun., vol. 13, No. 1, pp. 1-13, 2022.
Yasuda et al., "Transition waves and formation of domain walls in multistable mechanical metamaterials", Phys. Rev. Appl., vol. 13 :054067, pp. 1-8, 2020.
Yichao et al., "Leveraging elastic instabilities for am-plified performance: Spine-inspired high-speed and high-force soft robots", Sci. Adv., vol. 6, No. 19:eaaz6912, 2020, pp. 1-12.
Yichuan et al., "Insect-scale fast moving and ultrarobust soft robot", Sci. Robot., vol. 4, No. 32, eaaxl594, 2019, pp. 1-9.
Yijie et al., "Bifurcation-based embodied logic and autonomous actuation", Nat. Commun., vol. 10, No. 1, 128, pp. 1-10, 2019.
Yinding et al., "Snapping for high-speed and high-efficient butterfly stroke-like soft swimmer", Sci. Adv., vol. 8, No. 46:eadd3788, pp. 1-16, 2022.
Yongjin et al., "Autonomous snapping and jumping polymer gels", Nat. Mater., vol. 20, No. 12, pp. 1695-1701, 2021.
Yoonho et al., "Print-ing ferromagnetic domains for untethered fast-transforming soft materials", Nature, vol. 558, No. 7709, pp. 274-279, 2018.
Yuanyuan et al., "Reversible solvent-sensitive actuator with continuous bend-ing/debending process from liquid crystal elastomer-colloidal material", Soft Matter, vol. 14, No. 27, pp. 5547-5553, 2018.
Yusen Zhaoet al., "Soft phototactic swimmer based on self-sustained hydrogel oscillator", Sci. Robot., vol. 4, No. 33:eaax7112, pp. 1-10, 2019.
Yusen Zhaoet al., "Somatosensory actu-ator based on stretchable conductive photothermally responsive hydrogel", Sci. Robot., vol. 6, No. 53, eabd5483, pp. 1-11, 2021.
Zhao et al., "Optoelectronically inner-vated soft prosthetic hand via stretchable optical waveguides", Sci. Robot., vol. 1, No. 1, eaai7529, pp. 1-10, 2016.
Zhenishbek et al., "Designing minimal and scalable insect-inspired multi-locomotion millirobots", Nature, vol. 571, No. 7765, pp. 381-386, 2019.
Zhihyung Ahnet al., "Inhomogeneous stretch induced patterning ofmolecular orientation in liquid crystal elastomers", Extreme Meeh. Lett., vol. 5, pp. 30-36, 2015.
Zhijian et al., "A lightpowered ultralight tensegrity robot with high deformability and load capacity", Adv. Mater., vol. 31, No. 7, 1806849, pp. 1-19, 2019.
Zhijianet al., "A simple and robust way towards reversible mechanochromism: Using liquid crystal elas-tomer as a mask", Extreme Meeh. Lett., vol. 11, pp. 42-48, 2017.
Ahmad et al., "Programming soft robots with flexible mechanical metamaterials", Sci. Robot., 2019, vol. 4, No. 29:eaav7874, pp. 1-7.
Arda et al., Untethered soft robotic matter with passive control of shape morphing and propulsion. Sci. Robot., 2019, vol. 4, No. 33:eaax7044, pp. 1-14.
Boothby et al., "Dual-responsive, shape-switching bilayers enabled by liquid crystal elastomers", Soft Matter, vol. 13, No. 24, pp. 4349-4356, 2017.
Cagdas et al., "Autonomous undulatory serpentine locomotion utilizing body dynamics of a fluidic soft robot", Bioinspir. Biomim., 2013, vol. 8, No. 2, pp. 1-10.
Caixia et al., "ph oscillator-driven jellyfish-like hydrogel actuator with dissipative synergy between deformation and fluorescence color change", ACS Macro Lett., 2022, vol. 11, No. 3, pp. 347-353.
Carmel Majidi, "Soft robotics: a perspective—current trends and prospects for the future", Soft Robot., 2014, vol. 1, No. 1, pp. 5-11.
Cecilia et al., "Soft robot arm inspired by the octopus", Adv. Robot., 2012, vol. 26, No. 7, pp. 709-727.
Chengjun et al., "Soft ultrathin electronics inner-vated adaptive fully soft robots", Adv. Mater., 2018, vol. 30, No. 13: 1706695, pp. 1-24.
Deng et al., "Elastic vector solitons in soft architected materials", Phys. Rev. Lett., 2017, vol. 118, 204102, pp. 1-7.
Deng et al., "Focusing and mode separation of elastic vector solitons in a 2d soft mechanical metamaterial", Phys. Rev. Lett., 2019, vol. 123, 024101, pp. 1-7.
Drotman et al., "Electronics-free pneumatic circuits for controlling soft-legged robots", Sci. Robot., 2021, vol. 6, No. 51:eaay2627, pp. 1-12.
Emmanuel et al., "Bio-inspired pneu-matic shape-morphing elastomers", Nat. Mater., vol. 18, No. 1, pp. 24-28, 2019.
Eric et al., "Hydraulically amplified self-healing electrostatic actuators with muscle-like performance", Science, vol. 359, No. 6371, pp. 61-65, 2018.
Eric et al., "Universal robotic gripper based on the jam-ming of granular material", Proc. Natl. Acad. Sci. U.S.A., vol. 107, No. 44, pp. 18809-18814, 2010.
Filip et al., "Soft robotics for chemists", Angewandte Chern. Int. Ed., vol. 123, No. 8, pp. 1930-1935, 2011.
Fionnuala et al., "Meehan-ical programming of soft actuators by varying fiber angle", Soft Robot., vol. 2, No. 1, pp. 26-32, 2015.
Grima et al., "Auxetic behavior from rotating squares", J. Mater. Sci. Lett., vol. 19, pp. 1563-1565, 2000.
He et al., "Polymer nanofiber reinforced double network gel composite: Strong, tough and transparent," Ex-treme Mech. Lett., 2016, vol. 9, pp. 165-170.
Hiromi et al., "Mechanical computing", Nature, vol. 598, No. 7879, pp. 39-48, 2021.
Hiromi et al., "Origamibased tunable truss structures for non-volatile mechanical memory operation", Nat. Commun., vol. 8, No. 1, pp. 1-7, 2017.
Huachen et al., "Design and printing of proprioceptive three-dimensional architected robotic metamaterials", Science, vol. 376, No. 6599, pp. 1287-1293, 2022.
Hyunwoo et al., "Hydraulic hydrogel actuators and robots optically and sonically camouflaged in water", Nat. Commun., vol. 8, No. 1, pp. 1-12, 2017.
Jeong-Yun et al., "Highly stretchable and tough hydrogels," Nature, vol. 489, No. 7414, pp. 133-136 2012.
Jonathan et al., "Automation rover for extreme environments", NASA Innovative Advanced Concepts (NIAC) Phase I, Final Report, 2017 California Institute of Technology, pp. 1-44.
Katia et al., "Flexible mechanical metamaterials", Nat. Rev. Mater., vol. 2, No. 11, pp. 1-11, 2017.
Kevin et al., "Controlled flight of a biologically inspired, insect-scale robot", Science, vol. 340, No. 6132, pp. 603-607, 2013.
Lucia et al., "Temperature-responsive multistable metamaterials", ACS Appl. Mater. Interfaces, vol. 13, Np. 26, pp. 31163-31170, 2021.
Matteo et al., "Biomedical ap-plications of soft robotics", Nat. Rev. Mater., vol. 3, No. 6, pp. 143-153, 2018.
Metin, "Physical intelligence as a new paradigm", Extreme Meeh. Lett., vol. 46, 101340, 2021, pp. 1-11.
Michael et al., "An integrated design and fabrication strategy for entirely soft, autonomous robots", Nature, vol. 536, No. 7617, pp. 451-455, 2016.
Michael et al., "Morphing structure for changing hydrodynamic characteristics of a soft underwater walking robot", IEEE Robot. Autom. Lett., vol. 4, No. 4, pp. 4163-4169, 2019.

(56) References Cited

OTHER PUBLICATIONS

Nicholas et al., “A 3d-printed, func-tionally graded soft robot powered by combustion”, Science, vol. 349, No. 6244, pp. 161-165, 2015.
Panagiotis et al., “Towards a soft pneumatic glove for hand rehabilitation,” IEEE/RSJ International Conference on Intelligent Robots and Systems, 2013, pp. 1512-1517.
Philipp et al., “A soft, bistable valve for autonomous control of soft actuators”, Sci. Robot., vol. 3, No. 16:eaar7986, 2018, pp. 1-10.
Pikul et al., “Stretchable sur-faces with programmable 3d texture morphing for synthetic camouflaging skins”, Science, vol. 358, No. 6360, pp. 210-214, 2017.
Qiguang et al., “Electrically controlled liquid crystal elastomer-based soft tubular ac-tuator with multimodal actuation”, Sci. Adv., vol. 5, No. 10:eaax5746, 2019, pp. 1-7.
Qiguang et al., “Electrospun liquid crystal elastomer mi-crofiber actuator”, Sci. Robot., vol. 6, No. 57:eabi9704, 2021, pp. 1-10.
Qiji et al., “Magnetic shape memory polymers with integrated multifunctional shape manipulation”, Adv. Mater., vol. 32, No. 4: 1906657, 2020, pp. 1-24.
Robert et al., “Multigait soft robot”, Proc. Natl. Acad. Sci. U.S.A., vol. 108, No. 51, pp. 20400-20403, 2011.
Rus et al., “Structures undergoing discrete phase transformation”, Nature, 2015, vol. 521, pp. 467-475.
Sang et al., “Reconfigurable soft body trajectories using unidirectionally stretchable composite laminae,” Nat. Commun. vol. 10, No. 1, pp. 1-8, 2019.
Thomas et al., “Soft robot perception using embedded soft sensors and recurrent neural networks”, Sci. Robot., vol. 4. No. 26 eaav1488, 2019, pp. 1-9.
Tie et al., “A mechanical metamaterial with reprogrammable logical functions”, Nat. Commun., vol. 12, No. 1, pp. 1-11, 2021.
Tolley et al., “A resilient, untethered soft robot”, Soft Robot., 2014, pp. 561-566.
Tom et al., “Differential pressure control of 3d printed soft fluidic actuators”, In 2017 IEEE/RSJ International Conference on Intelligent Robots and Systems (IROS), pp. 6207-6213, 2017.
Treml et al., “Origami mechanologic”, Proc. Natl. Acad. Sci. U.S.A., vol. 115, No. 27, pp. 6916-6921, 2018.
Xiaobin et al., “An autonomous untethered fast soft robotic insect driven by low-voltage dielectric elastomer actuators”, Sci. Robot., vol. 4, No. 37:eaaz6451, pp. 1-11, 2019.
Yakacki et al., “Tailorable and programmable liquid-crystalline elastomers using a two-stage thiol-acrylate reaction,” RSC Adv. 2015, vol. 5, No. 25, pp. 18997-19001.
Yanbin et al., “3d transformable modular kirigami based programmable metamaterials”, Adv. Funct. Mater., vol. 31, No. 43:2105641, pp. 1-10, 2021.
Yao et al., “Self-sustained snapping drives autonomous dancing and motion in free-standing wavy rings”, Adv. Mater., 2023, vol. 35, 2207372, pp. 1-10.

* cited by examiner

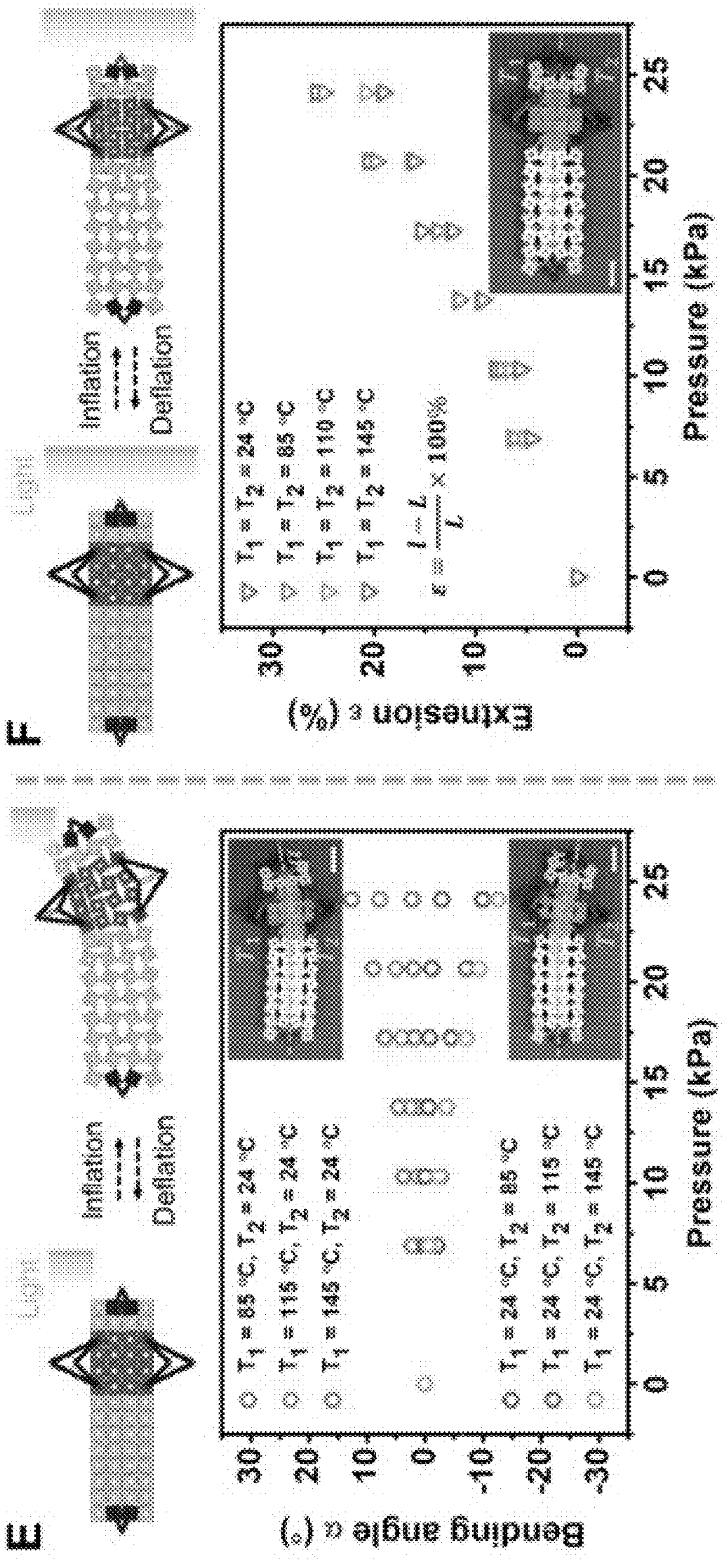
FIG. 3E — 3F

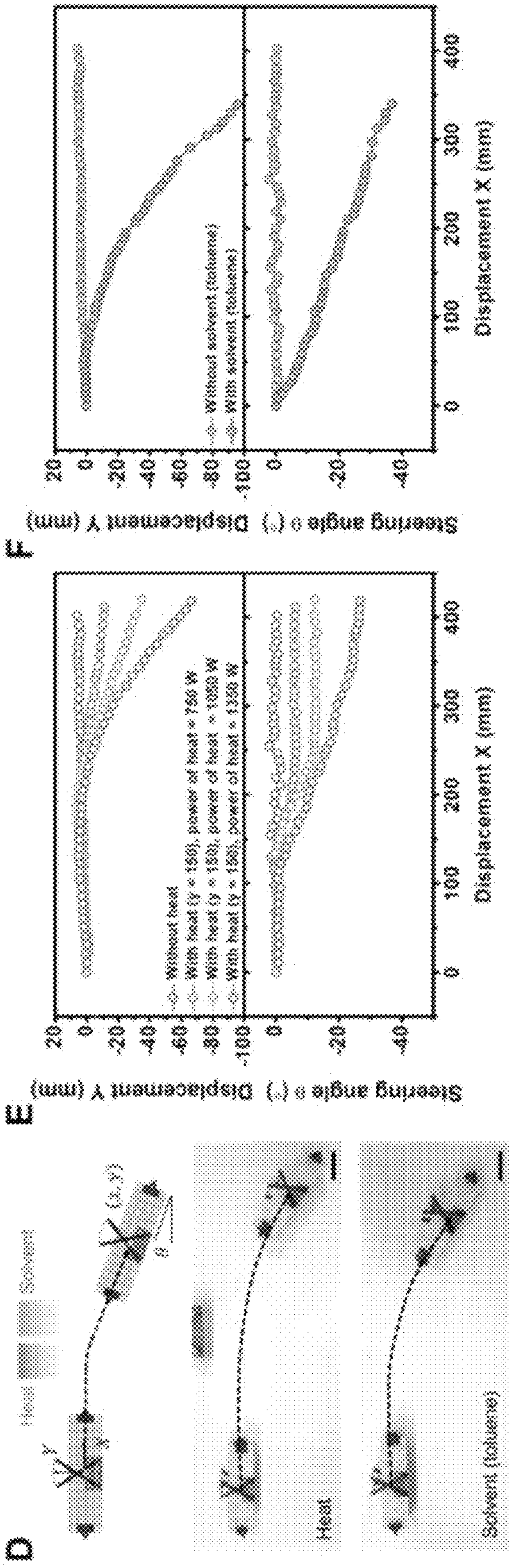
FIG. 4D—4F

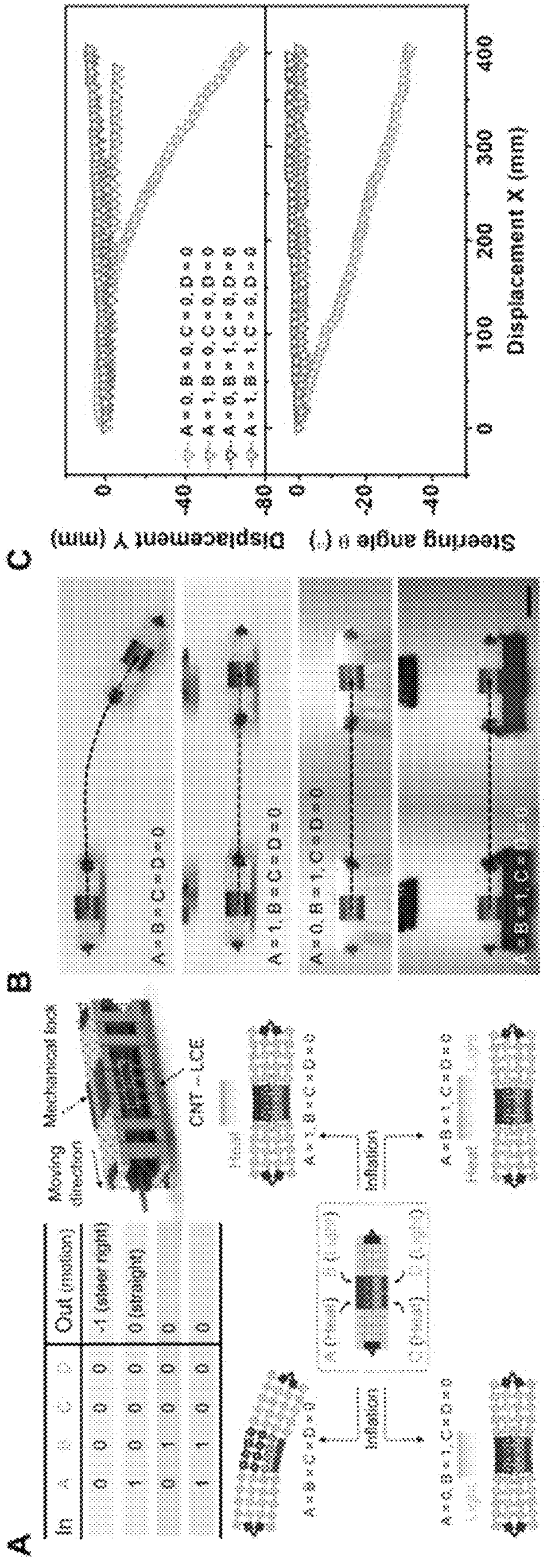
FIG. 5A — 5C

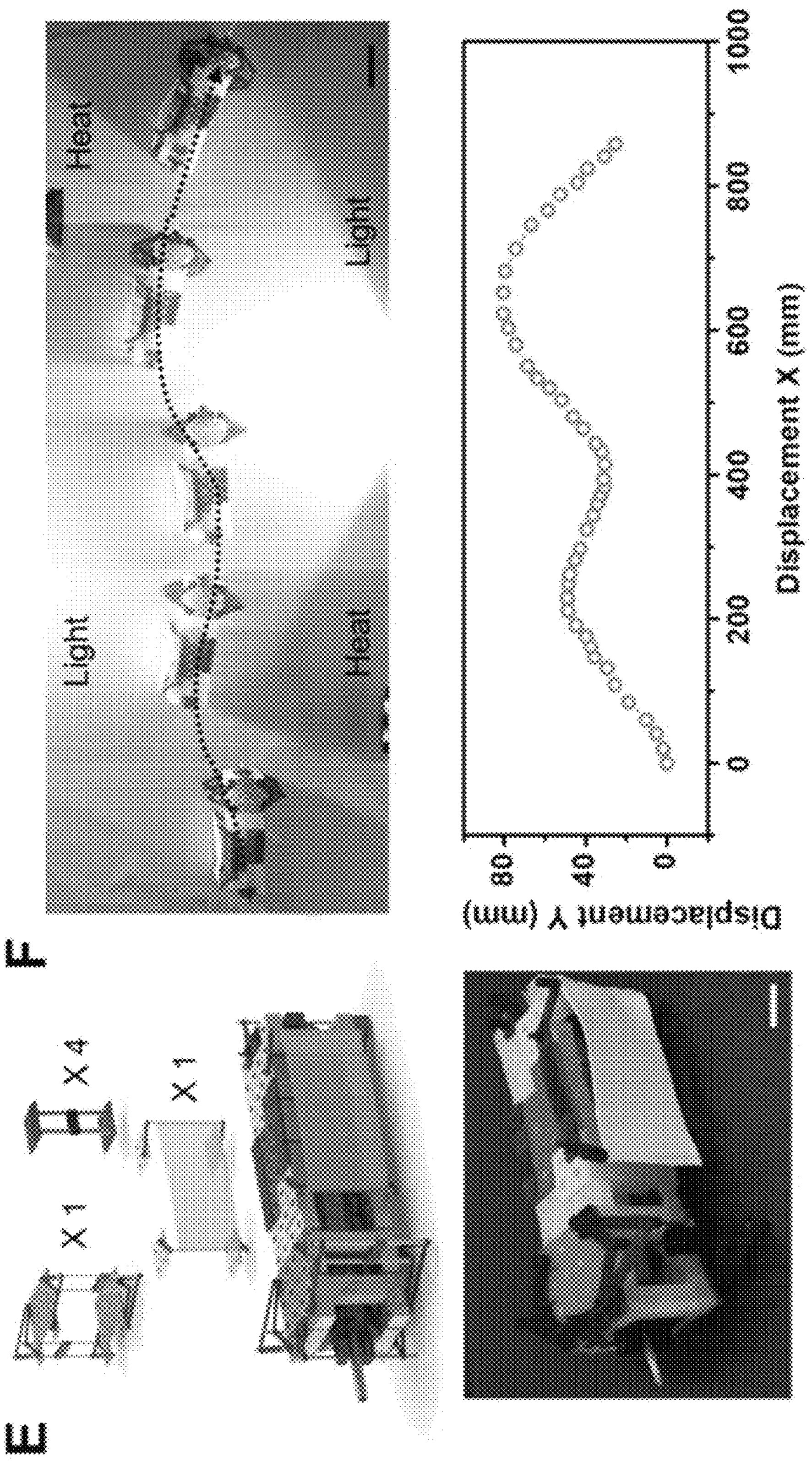
FIG. 6E — 6F

CONTROL METHOD FOR COMPLIANT ROBOTS

CROSS-REFERENCE TO RELATED APPLICATIONS

The present application claims priority to and the benefit of U.S. patent application No. 63/313,013, "Control Method For Compliant Robots" (filed Feb. 23, 2022). All foregoing applications are incorporated herein by reference in their entireties for any and all purposes.

GOVERNMENT RIGHTS

This invention was made with government support under FA990-19-1-0285 awarded by the Air Force and W911NF-20-1-0278 awarded by the Department of Defense. The government has certain rights in the invention.

TECHNICAL FIELD

The present disclosure relates to the field of robotics and to the field of autonomous control.

BACKGROUND

Researchers have continued to develop strategies for environmental adaptation and autonomy in soft robots with ever-increasing capabilities. Historically, robots have achieved the ability to interact with their external environment via feedback loops involving multiple sensors, microcontrollers, and actuators constructed from rigid electronic components that can be bulky, complex, and mechanically incompatible with soft materials. Accordingly, there is a long-felt need in the art for controllable robots that can be controlled (e.g., environmentally controlled) without the use of microcontrollers and other electronic modules.

SUMMARY

Robots typically interact with their environment via feedback loops consisting of electronic sensors, microcontrollers, and actuators, which can be bulky and complex. Researchers have sought new strategies for achieving autonomous sensing and control in next-generation soft robots. Here, we describe an electronics-free approach for autonomous control of soft robots, embodying the sensing, control, and actuation feedback loop in the compositional and structural features of the soft robot. Specifically, we design multiple modular control units that are regulated by responsive materials such as liquid crystal elastomers. These modules enable the robot to sense and respond to different external stimuli—e.g., light, heat, solvents—effecting autonomous changes to the robot's trajectory. By combining multiple types of control modules, complex responses can be achieved, such as logical evaluations that require multiple events to occur in the environment before an action is performed. This framework for embodied control offers a new strategy toward autonomous soft robots that operate in uncertain or dynamic environments.

In meeting the described long-felt needs, the present disclosure provides a stimulus-responsive robot, comprising: an extensible actuator, the extensible actuator being configured such that extension and contraction of the extensible actuator effects a translational movement of the robot; and the first control unit being in mechanical communication with the extensible actuator, the first control unit comprising a first material responsive to a first external non-electrical stimulus, the control unit being configured to exert a bending force on the extensible actuator, the bending force being related to a response of the first material to the first external stimulus.

Also provided is a method, comprising effecting operation of a robot according to the present disclosure, e.g., according to any one of Aspects 1-19.

Further provided is a stimulus-responsive robot, comprising: an extensible actuator, the extensible actuator being configured such that extension and contraction of the extensible actuator effects a translational movement of the robot; and at least one control unit in in mechanical communication with the extensible actuator, the at least one control unit comprising a material being responsive to a first external non-electrical stimulus, the control unit being configured to exert a bending force on the extensible actuator, the bending force being related to a response of the first material to the first external stimulus, the bending being sufficient to change a direction of the translational movement of the robot in response to extension and contraction of the extensible actuator.

Also disclosed is a method, comprising effecting operation of a robot according to the present disclosure, e.g., according to Aspect 21.

Further provided is a stimulus-responsive robot, comprising: a first control unit comprising a first material responsive to an external non-electrical stimulus, the first control unit being configured such that one of exposure or removal of the external non-electrical stimulus effects passage of a fluid into a first chamber of the robot and the other of exposure or removal of the external non-electrical stimulus allows passage of the fluid from the first chamber of the robot, passage of the fluid into the first chamber inflating the first chamber so as to effect motion of the robot in a first direction. A control unit can be according to the present disclosure, e.g., according to FIG. 13 and related disclosure or as described elsewhere herein.

Also provided is a method, comprising operating a robot according to the present disclosure (e.g., according to any one of Aspects 23-26) so as to effect motion of the robot.

Further disclosed is a stimulus-responsive robot, comprising: a moveable element and a conduit, the moveable element and conduit being arranged such that in a resting state, the moveable element effects occlusion of the conduit; and a first control unit, the first control unit being in mechanical communication with the moveable element, the first control unit comprising a first material responsive to a first external non-electrical stimulus, the control unit being configured to, when exposed to the first external non-electrical stimulus exert a force on the moveable actuator so as to reduce or eliminate the occlusion of the conduit by the moveable element.

Further provided is a stimulus-responsive robot, comprising: a moveable element and a conduit, the moveable element and conduit being arranged such that in a resting state, the moveable element effects occlusion of the conduit; and a first control unit, the first control unit being in mechanical communication with the moveable element, the first control unit comprising a first material responsive to a first external non-electrical stimulus, the control unit being configured to, when exposed to the first external non-electrical stimulus exert a force on the moveable actuator so as increase occlusion of the conduit by the moveable element.

BRIEF DESCRIPTION OF THE DRAWINGS

The file of this patent or application contains at least one drawing/photograph executed in color. Copies of this patent or patent application publication with color drawing(s)/photograph(s) will be provided by the Office upon request and payment of the necessary fee.

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings:

FIGS. 3A-3F illustrate physical shape changes of soft autonomous robots in response to environmental inputs. FIG. 3A. The extension ratio e of the pneumatic actuator and the robot (without any control modules) as a function of applied pressure. FIG. 3B. Multiple types of modular control units are developed. They can be easily attached to or removed from the body of the robot. FIG. 3C. As one example, A control module can sense and respond to heat or light. FIG. 3D. In this example, a different control module design causes the robot to bend away from stimuli (in this case, heat or solvents). FIGS. 3E and 3F. In another example, a control module is designed to bend the robot so that its end will align toward a stimulus (in this case, light). Scale bar in FIGS. 3A, C, D, E and F: 2 cm.

FIGS. 4A-4H illustrate autonomous changes to trajectory in response to environmental inputs. FIG. 4A. The schematic and experimental images show that the robot can autonomously steer its trajectory closer to light or heat. FIG. 4B. The trajectories (displacement and steering angle) of the robot as a function of the power of the heat source. FIG. 4C. The trajectories (displacement and steering angle) of the robot as a function of the distance y (in mm) between the light source and the initial trajectory of the robot. FIG. 4D. The second type of control module causes the robot to autonomously steer away from a heat source or the solvent toluene. FIGS. 4E and 4F. The trajectories (displacement and steering angle) of the robot under different stimuli (heat or toluene). FIG. 4G. The third type of control module causes the robot to autonomously steer directly toward a light source. FIG. 4H. The trajectories (displacement and steering angle) of the robot in environments with different locations of the light source. Scale bar in FIGS. A, D and G: 5 cm.

FIGS. 5A-5I illustrate distributed, multi-stimuli-responsive logic via interaction of multiple control modules. Interactions of multiple control modules can be complex (see complete truth tables in FIGS. 47A-47E). Here are a few simplified examples: FIG. 5A. The combination of a "mechanical lock" control module and the CNT-LCE module of FIG. 3C causes the robot's steering to obey a NOR response. FIGS. 5B-C. Experimental images and trajectories, respectively, of the robot with different heat/light inputs. FIG. 5D. In another example, a "mask" control module is used in con-junction with the CNT-LCE module of FIG. 3C to steer in accordance with an AND strategy (for the environment shown in panel E). FIGS. 5E-F. Experimental images and trajectories, respectively, of the robot with different heat/light inputs. FIG. 5G. In another example, two identical control modules (actuated by heat or light) are distributed symmetrically along the two sides of the robot body, Which enable the robot to realize XOR response. FIGS. 5H-I. Experimental images and trajectories, respectively, of the robot with different heat/light inputs. Scale bar in FIGS. 5B, E and H: 5 cm.

FIGS. 6A-6F illustrates autonomous trajectory changes for the robot configured with different control modules moving through environments with multiple stimuli. FIGS. 6A, C and E. show the robot configured with different modular control units. FIGS. 6, D and F. show experimental images and trajectories that result from these designs. Scale bar in FIGS. A, C and E: 2 cm. Scale bar in FIGS. 6B, D and F: 5 cm.

FIG. 7A. The working mechanism of the mechanical bistable valve. When the membrane bends upward, it blocks the pneumatic tube inside the top chamber. As a result, the pressurized air flows into the actuator, inflating the pneumatic actuator. Once the pressure of the top chamber reaches a critical pressure Pc, the membrane snaps, the air tube in the top chamber is no longer blocked, and the pressurized air can flow out to the atmosphere, deflating the pneumatic actuator. FIG. 7B. The bistable valve translates a constant pressure input to a periodically varying pressure output (supplied to the pneumatic actuator). FIGS. 7C, FIG. 7D Demonstration of autonomous motion in response to various light and heat sources. Scale bar in FIG. 7D: 5 cm.

Effects of $K_1$ and $K_2$ on the tensile deformation of a kirigami structure. A. Schematic of a 4×14 kirigami under tensile deformation (the dashed box indicates the initial position of the kirigami). Boundary condition $U_1=V_1=U_2=0$ is applied to the squares in black, and horizontal forces $\overline{F}$ are applied to the squares in green. B. Extension ε of the kirigami as functions of the normalized force $|\overline{F}|$ against different values of $K_1$ with $K_2=0.02$. C. Extension ε of the kirigami as functions of the normalized force $|\overline{F}|$ against different values of $K_2$ with $K_1=0.2$.

FIG. 20 provides

Effects of γ, $K_1$, and $K_2$ on the steering deformation of a kirigami structure embedded with mechanical constraints. A. Schematic of a 4×14 kirigami structure under constraint-driven steering. The two mechanical constraints highlighted in red are located at the center of the bottom row. The external force $\overline{F}$ is allowed to change its direction during steering deformation, and the degree of the direction change is controlled by γ. B. Steering angles α of the kirigami as functions of the normalized force $|\overline{F}|$ against different values of γ with $(K_1, K_2)=(0.2, 0.02)$. C. Steering angles α of the kirigami as functions of the normalized force $|\overline{F}|$ against different values of $K_1$ with γ=0.1 and $K_2=0.02$. D. Steering angles α of the kirigami as functions of the normalized force $|\overline{F}|$ against different values of $K_2$ with γ=0.1 and $K_1=0.2$.

FIGS. 21A-21D provide a calibration of parameters used in FEA. FIG. 21A. Extension of pneumatic actuator as a function of pressure for both experiments (points) and finite element analysis (solid curves). Parameters for the pneumatic actuator are as follows: C10=14 kPa, k1=350 kPa. FIG. 21B. Comparison of the pneumatic actuator as measured experimentally (white) and simulated via FEA (red). FIG. 21C. Extension of robot (including pneumatic actuator and kirigami layer) under various applied pressures for both experiments (points) and FEA (solid curves). Parameters for the kirigami are as follows: C10=20 kPa. FIG. 21D. Comparison of the actuated robot as measured experimentally (white) and via FEA (red).

FIGS. 22A-22C provide a simplified geometric model for predicting actuating bending angle. FIG. 21A Illustration of geometric parameters of unactuated robot. FIG. 21B—illustration after actuation. FIG. 21C prediction of bending angle for robots with single constraint of various lengths.

FIGS. 23A-23D provide a FEA of robot with rigid mechanical constraints. A The actuated robot with one mechanical constraint of various lengths, showing experiments (optical images) and FEA (in red). B Bending angle of the robot as a function of pressure for both experiments (points) and FEA (solid curves). C-D Same data as in A-B, but now multiple adjacent mechanical constraints are used (instead of the monolithic mechanical constraints of A-B).

Figure 24:
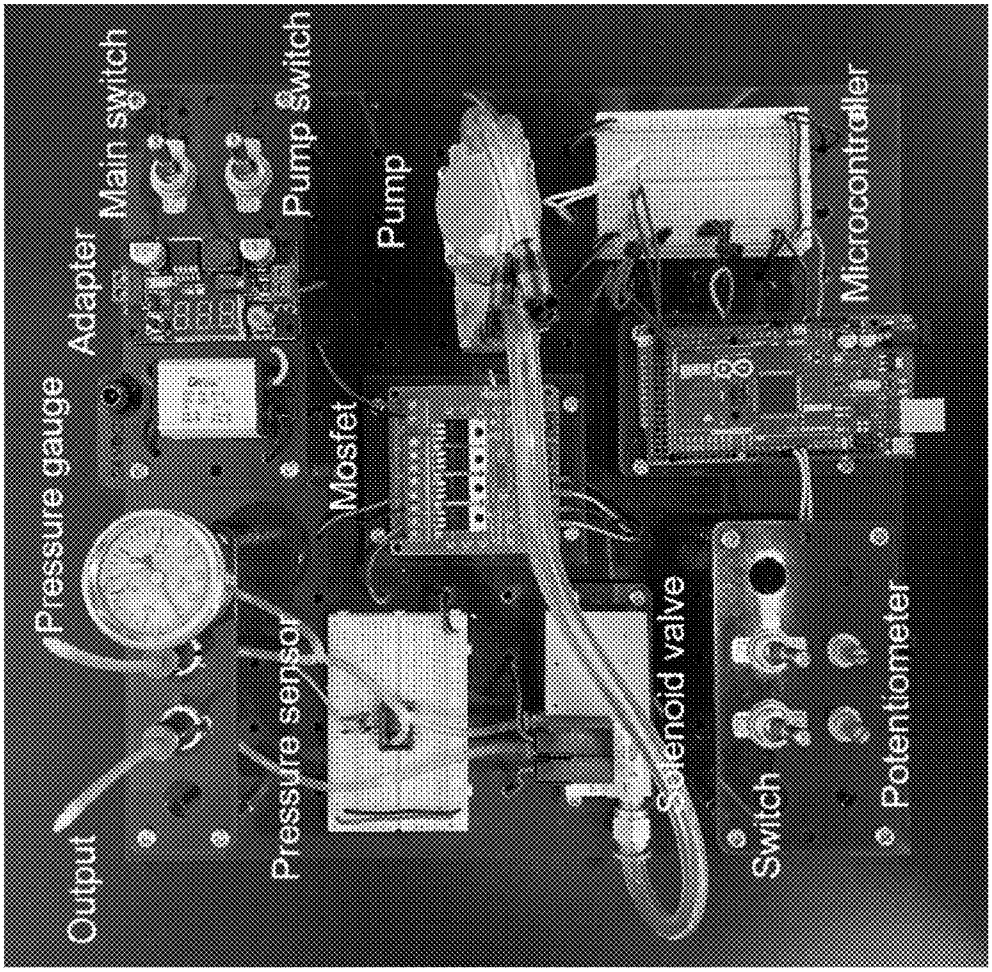

FIG. 24 provides an example fluid control system. This system consists of an air pump, micro-controller, solenoid valve, switches, potentiometers, MOSFET, pressure sensors, pressure gauge, and power adapters. The pressurized air can be generated by the air pump, regulated by the solenoid valve through pulse width modulation, and measured by the pressure sensors and pressure gauge.

FIGS. 25A-25C illustrate the effect of the hinge thickness of the kirigami. FIG. 25A: We measure the force-strain relationship of the kirigami platform with different hinge thicknesses (1.0 mm and 1.7 mm). The force is initially small, since the extension of the kirigami is initially rotation dominated. Later, at the "critical strain", the extension becomes stretch-dominated. The smaller hinge thickness (1.0 mm) gives a larger critical strain. FIG. 25B: The kirigami (1.0 mm hinge thickness) extends when the pneumatic actuator is inflated. FIG. 25C: The kirigami (1.7 mm hinge thickness) bends when the pneumatic actuator is inflated, this is due to buckling of the pneumatic actuator. Scale bar in B and C: 2 cm.

Figure 26:
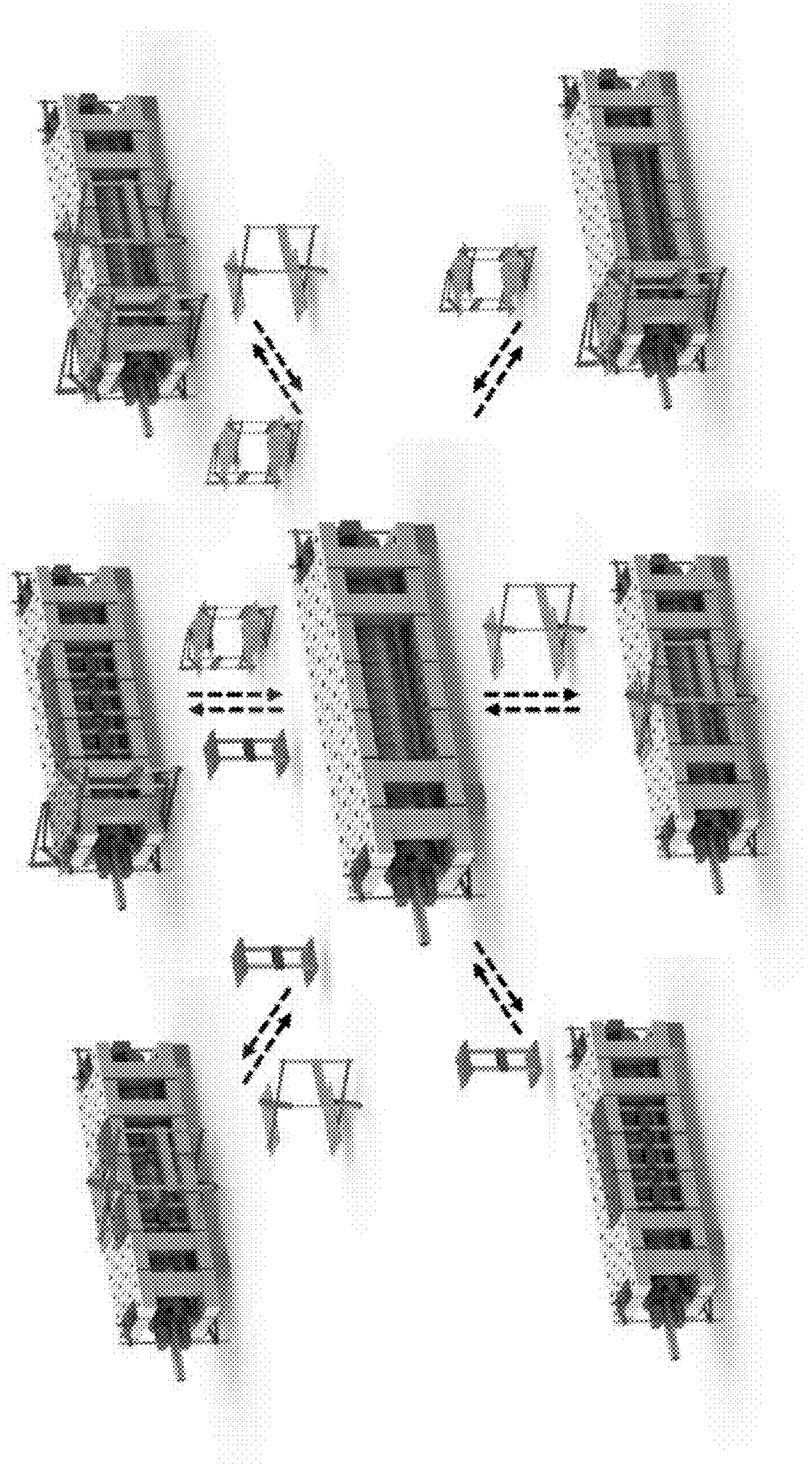

FIG. 26 illustrates modularity of the disclosed control units. Multiple types of control modules can be easily attached to or removed from the body of a given robot, showing the simplicity of the entire robotic system.

Figure 27:
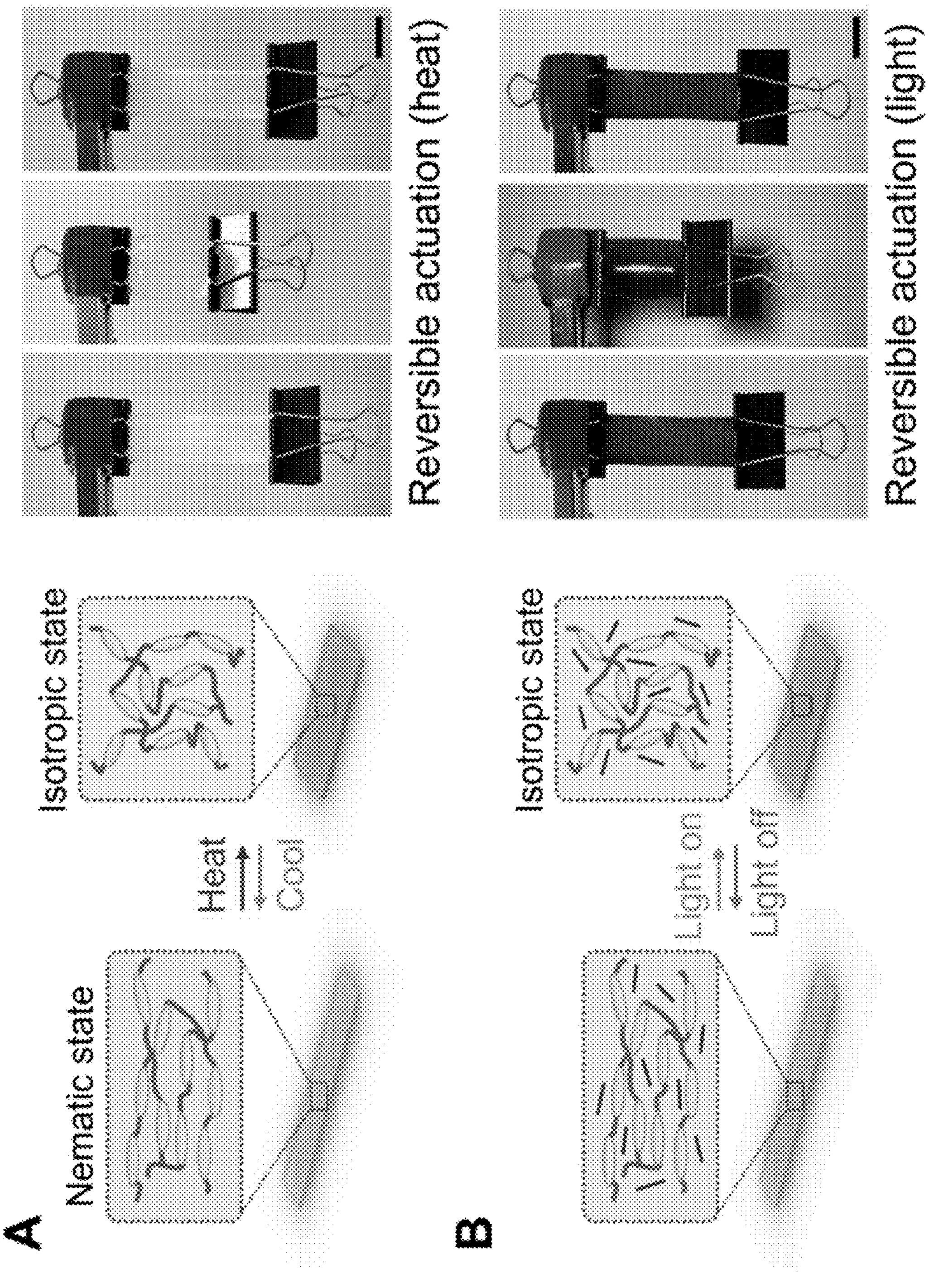

FIGS. 27A-27B illustrate reversible actuation of LCEs and CNT-LCE composites. A. When the LCE film is heated, it can contract due to a nematic-isotropic phase transition. The LCE can fully recover to its initial shape after cooling. B. When the CNT-LCE film is subjected to intense light, the CNT-LCE composite contracts due to the photothermal effect. The actuation is reversible: the CNT-LCE fully recovers when the light is switched off. Scale bar in A and B: 2 cm.

FIGS. 28A-28D illustrate actuation strain and cycling tests of LCE (A, C) and CNT-LCE (B,D). The actuation strain (ϵ) is defined as $\epsilon=(L-1)/L\times100\%$, where L is the length of the LCE at room temperature and 1 is the length of the LCE at high temperature. The actuation strain increases with the environmental temperature. Scale bar in A and B: 2 cm.

Figure 29:
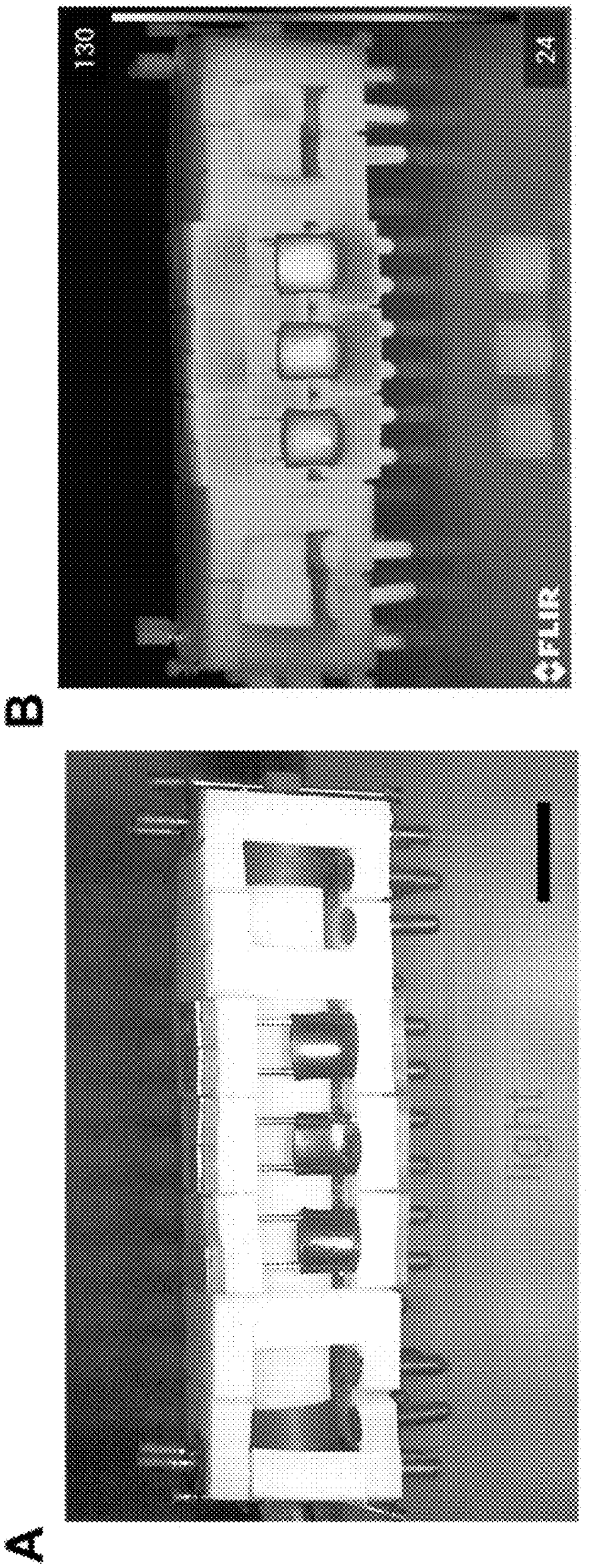

FIGS. 29A-29B provide an optical image (A) and infrared/thermal image (B) of the robot under the light irradiation A. The CNT-LCE composite strips have relatively higher temperature than the robot body, indicating the CNT-LCE composite strips can absorb light and convert to heat. Scale bar in A: 2 cm.

Figure 30:
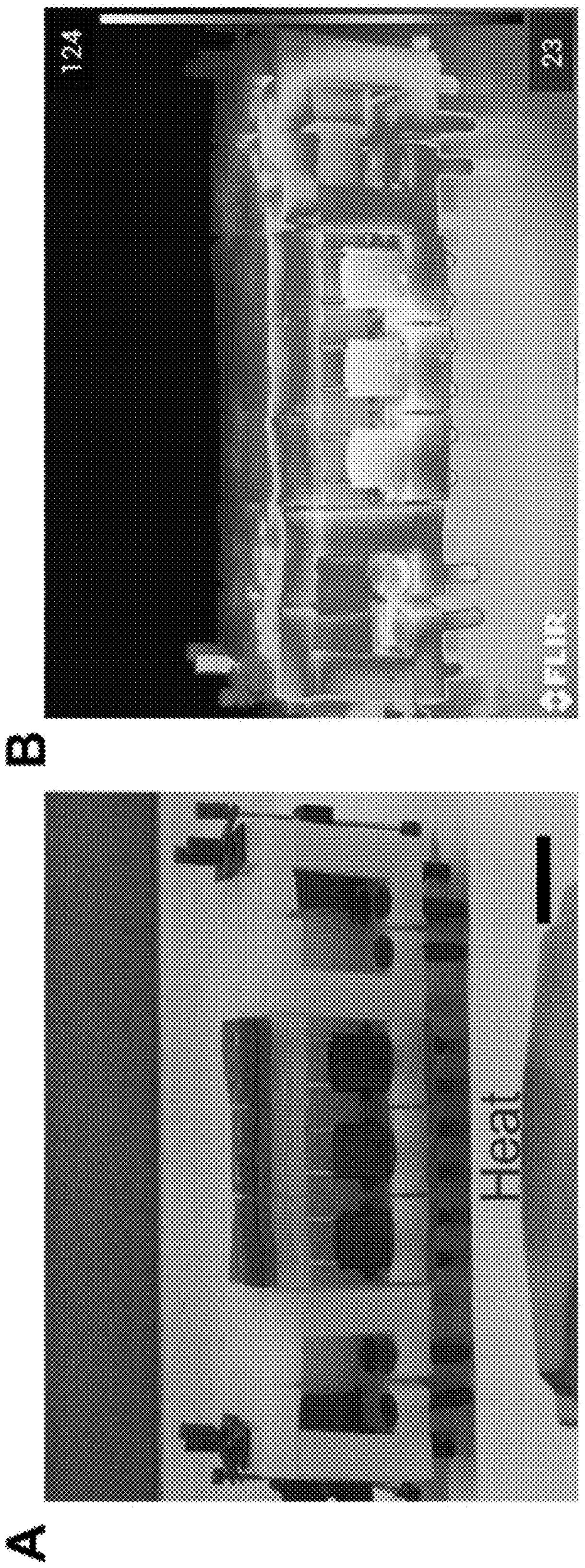

FIGS. 30A-30B provide an optical image (A) and an infrared/thermal image (B) of the robot under the heat source A. The temperatures of CNT-LCE composite strips and robot body are comparable. Scale bar in A: 2 cm.

Figure 31:
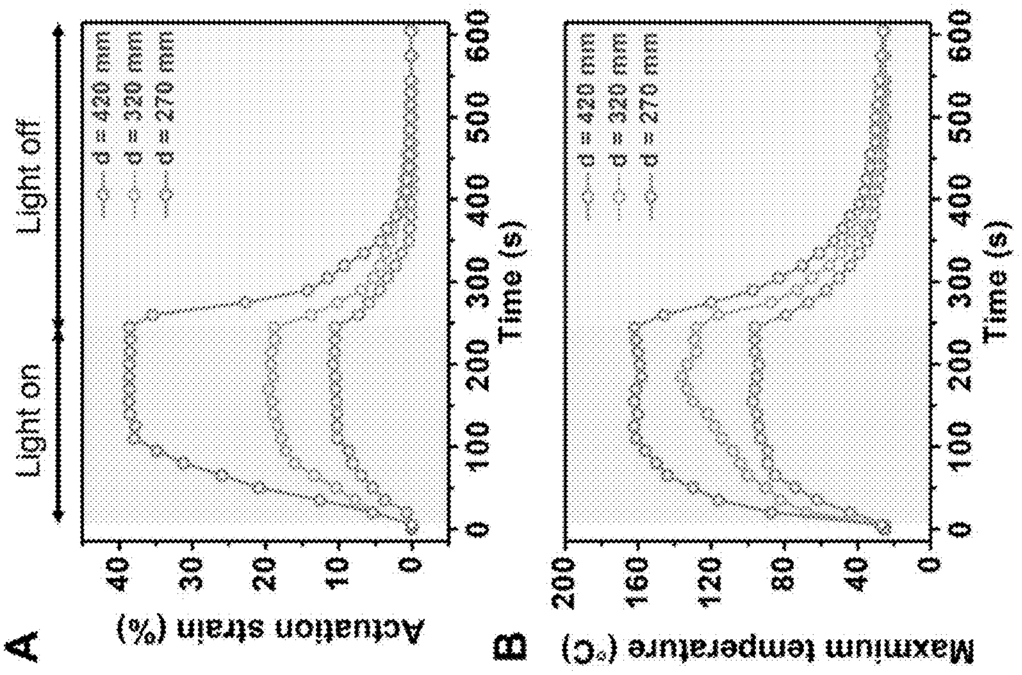

FIGS. 31A-31B illustrate response of CNT-LCE under different lighting conditions. A. Actuation strain as a function of time for the CNT-LCE film. In the experiment, the light is switched on for 240 s and then switched off (360 s), the light intensity can be varied by changing the distance between the light source and the sample (420 mm, 320 mm, and 270 mm). The actuation strain gradually increases when the light is switched on. After 100 s, the actuation strain reaches a constant value, corresponding to the steady state. When the light is switched off, the actuation strain drops to 0 within 160 s. B. The maximum surface temperature of the CNT-LCE film during the experiments.

Figure 32:
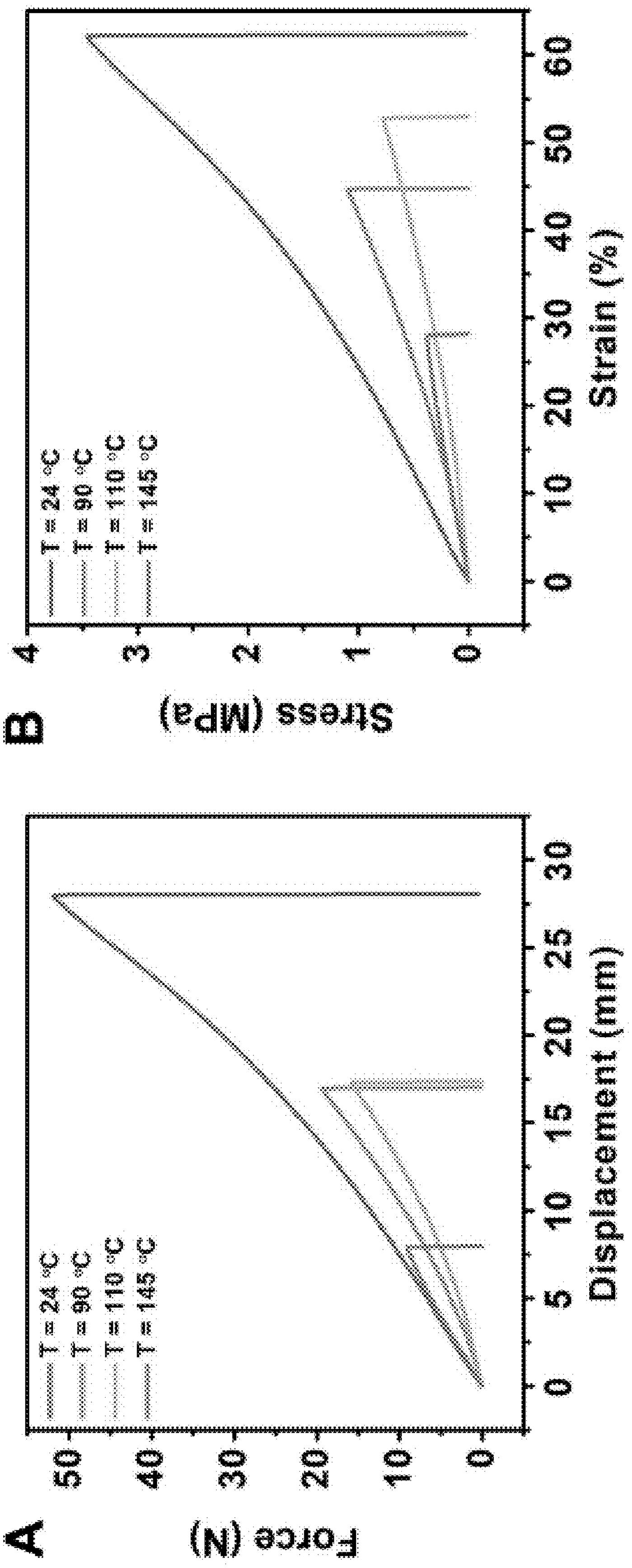

FIGS. 32A-32B illustrate mechanical properties of the CNT-LCE film under different temperatures. A. The force-displacement relationship of the CNT-LCE films (45 mm×15 mm×1 mm) under different temperatures. The maximum force decreases from 50 N to 10 N when the temperature is elevated from 24° C. to 145° C. B. The stress-strain relationship of the CNT-LCE under different temperatures. Both the strength and the stretchability of the CNT-LCE are decreased when the temperature is gradually increased.

FIGS. 33A-33B illustrate mechanical properties of the pristine LCE film under different temperatures. A. The force-displacement relationship of the pristine LCE films (45 mm×15 mm×1 mm) under different temperatures. The maximum force decreases from 60 N to 10 N when the temperature is elevated from 24° C. to 150° C. B. The stress-strain relationship of the CNT-LCE under different temperatures. Both the strength and the stretchability of the CNT-LCE are decreased when the temperature is gradually increased.

FIGS. 34A-34B illustrate bending angle of the kirigami when using different types of mechanical constraints. A. Optical images and B. bending angle (α) vs. pressure measurements, which show the effect of different sizes and types of mechanical constraints on the bending angle. Scale bar in A: 2 cm.

FIGS. 35A-35B illustrate the effect of the geometry of the kirigami. In the experiments, three kirigami designs with different geometries (4×10, 4×14, 6×14) are tested. Multiple types of rigid mechanical constraints are attached to the kirigami body. The bending angle of the kirigami is measured. A. Experimental images of the kirigami after inflation of the pneumatic actuator to a pressure of 25 kPa. B. The bending angle α of the kirigami as a function of pressure. The 4×14 design of the kirigami can generate the largest bending angle. Scale bar in A: 2 cm.

FIGS. 36A-36B illustrate bending of kirigami as a function of the location of rigid mechanical constraints. A 1×4 rigid mechanical constraint is placed at different lo-cations. The bending angle is measured after the pneumatic actuator is pressurized to 25 kPa. Scale bar in A: 2 cm.

FIGS. 37A-37D illustrate the effect of length of the CNT-LCE strip in the control modules. A. Schematic of squares with CNT-LCE strips at different temperatures. B. A strip of length 35 mm is too short to allow free rotation of the kirigami at room temperature (24° C.). C. A strip of length 55 mm is too long to constrain the rotation of the squares, even at high temperature (145° C.). D. The length of the CNT-LCE strip is set to be 45 mm. At 25° C., the pulling force gradually increases when the temperature is increased, which means the CNT-LCE strip constrains the rotation of the squares at high temperatures.

Figure 38:
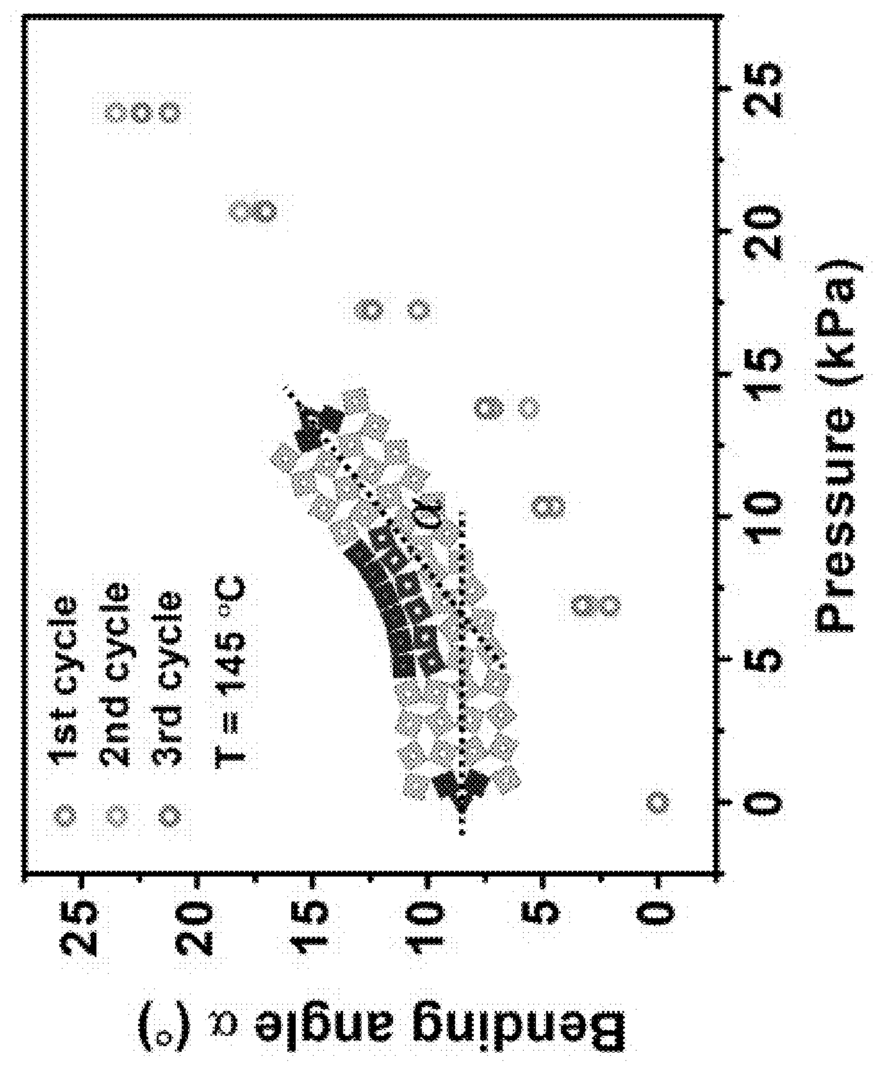

FIG. 38 illustrates repeatability of the control module. The experimental measurements of the bending angle α as a function of the applied pressure under three different inflation/deflation cycles at high temperature (145° C.).

FIGS. 39A-39D illustrate the effect of LCE strip length in the control modules. A. Schematic of squares with LCE strips under different environments (temperatures or exposure of the solvent toluene). B. At room temperature, the pristine LCE cannot prevent the opening of the squares. C. When the temperature is increased, the pristine LCE strip contracts and generates tension. When the kirigami is stretched, the force at 25% strain gradually increases when the temperature of the LCE is increased, which means that the pristine LCE can constrain the rotation of the squares. D. When the LCE strip is exposed to solvents, the LCE contracts due to a nematic-isotropic phase transition. The LCE can thereby generate force and constrain the rotation of the squares.

Figure 40:
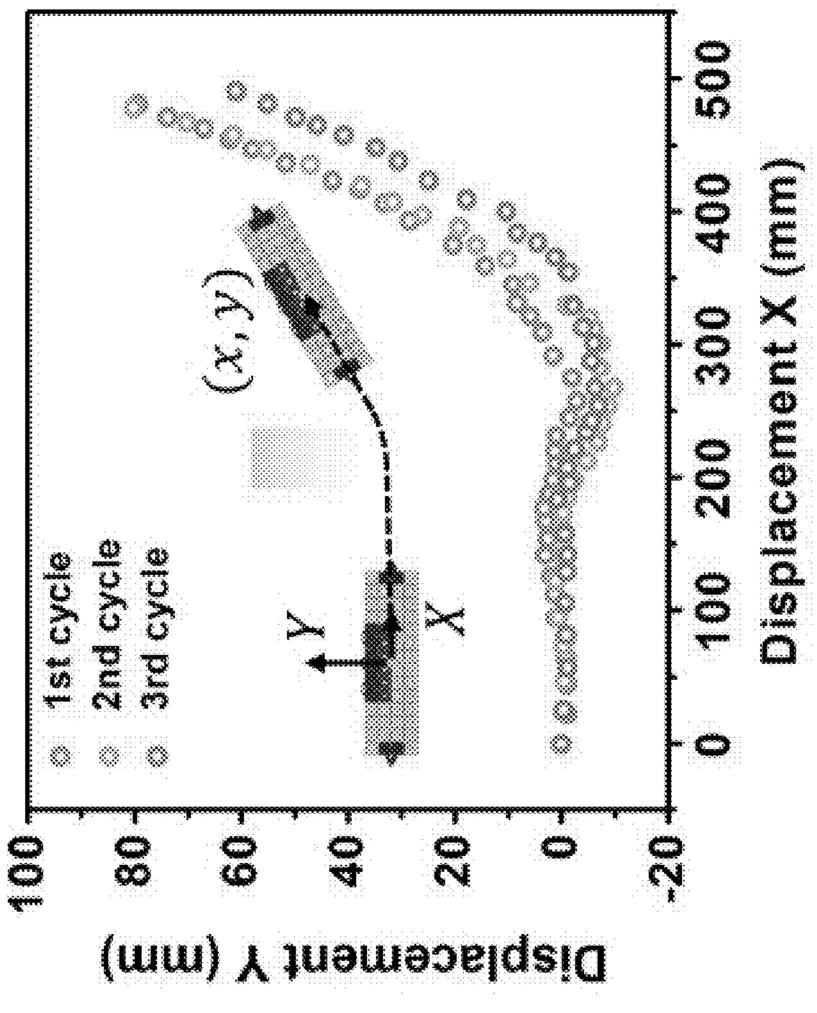

FIG. 40 illustrates repeatability of the robot's trajectory. The trajectory of the same robot in different runs at same light condition.

FIGS. 41A-41B illustrate that a soft robot steers itself in a dynamic light environment. The soft robot (integrated with control module 3) steers itself and moves toward the light as the light sources are sequentially switched on and off. Scale bar in A: 5 cm.

FIGS. 42A-42B illustrate a swelling mechanism of responsive materials (PDMS or hydrogels). A. We attach the flexible strip with responsive materials (PDMS/hydrogel) onto the kirigami platform. The squares can freely open when there are no stimuli (solvents/water) present in the environment. B. If the control modules are subjected to solvents or water, the responsive materials swell, generating tension in the strip, preventing the square units from rotating and opening.

FIGS. 43A-43B illustrate that a control module can sense and respond to water. A. The control module (integrated with hydrogel) is submerged in water for 2 hours and then attached to the robot. The swollen hydrogel locally prevents the squares from opening when the pneumatic actuator is pressurized. Consequently, the robot bends in the same direction as the module. B. Bending angle α as a function of the applied pressure in different conditions (with water or without water). Scale bar in B: 2 cm.

FIGS. 44A-44B illustrate that a control module can sense and respond to toluene. A. When the module is exposed to toluene, the silicone strip constrains the opening of the squares, causing the kirigami body to bend. In the experiment, we submerge the strip in toluene for 15 minutes and then reattach the strip to the robot. B. Experimental measurements of the bending angle α as a function of the applied pressure under different conditions (with toluene, without toluene). Scale bar in B: 2 cm.

Figure 45:
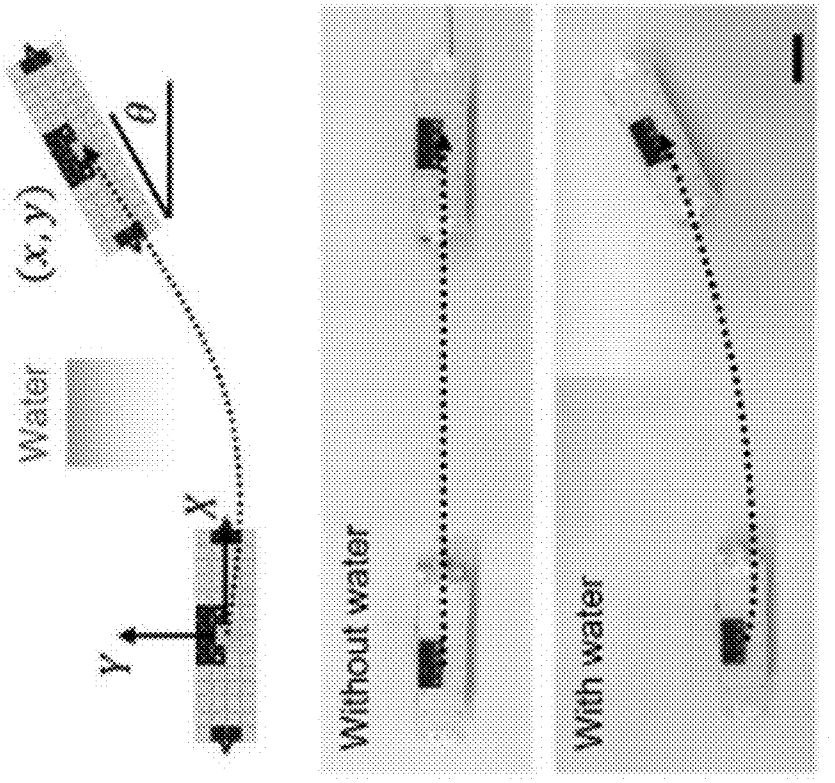
Figure 46:
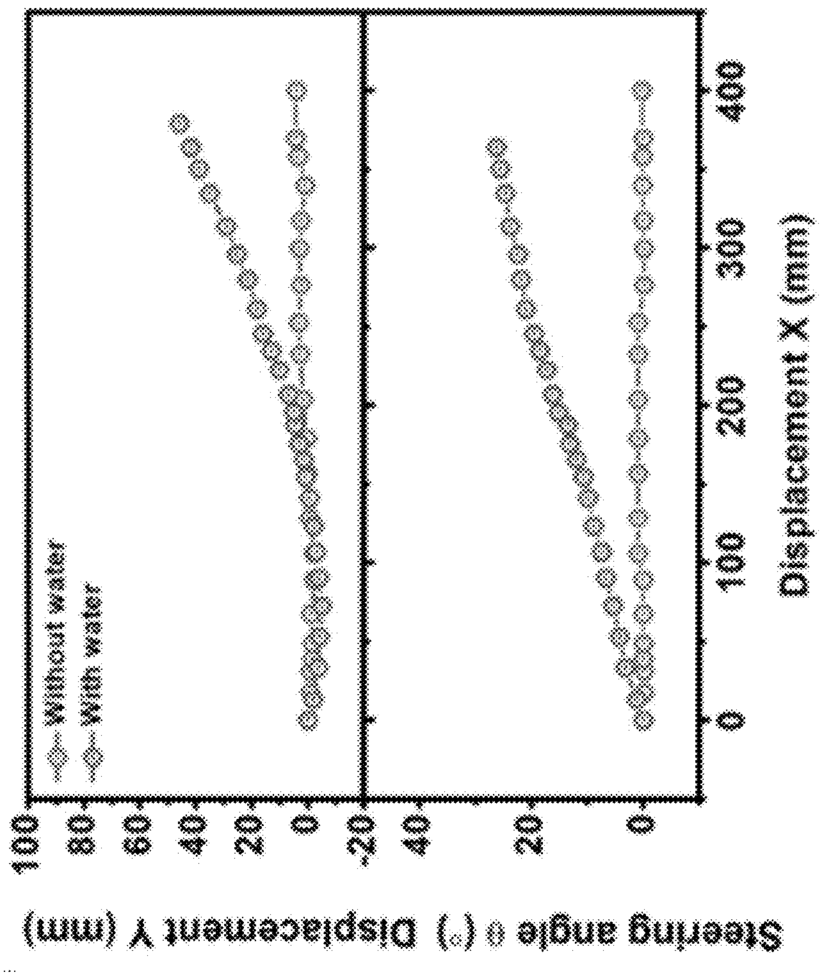

FIGS. 45 and 46 illustrate autonomous changes to trajectory in response to water. FIG. 45 shows that the robot can autonomously steer when exposed to water. When no water is present, the robot moves straight. FIG. 46 shows the trajectory (displacement and steering angle) of the robot in different conditions (without water or with water in the environment). Scale bar: 5 cm.

FIGS. 47A-47E provides "truth tables" that relate inputs (i.e., the stimuli in the environment) to outputs (i.e., trajectory) for several different control modules. The distance between the robot and the energy source is 200 mm to prevent "overheating" from occurring too rapidly.

Figure 48:
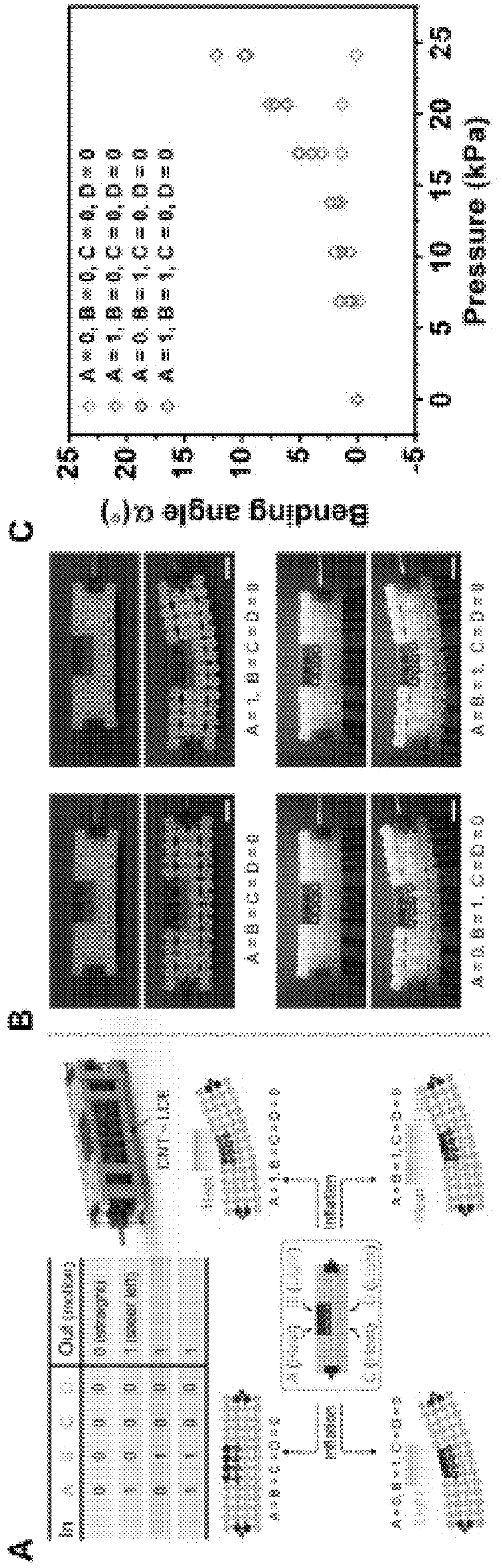

FIGS. 48A-48C provides "OR" response of the robot. A. A single CNT-LCE module (FIG. 3C) acts like a logical "OR". B. The experimental images of the robot under different light and heat conditions. When the robot is subjected to light or heat, the control module is activated, causing the robot to bend to the left. C. Measurements of bending angle α as a function of the applied pressure under different light and heat conditions. Scale bar in B: 2 cm.

FIGS. 49A-49C provide a trajectory caused by an "OR" module of the previous figure. A. The truth table of the "OR" response. B-C. Experimental images and trajectories, respectively, of the robot with different heat or light inputs. Scale bar in B: 5 cm.

FIGS. 50A-50C provide "NOR" response of the robot. A. For the "NOR" response, we attach a "mechanical lock" module and a CNT-LCE module (i.e., FIG. 3C) to the body of the robot. B. The experimental images of the robot under different light and heat conditions. With no stimuli present (A=B=C=D=0), the mechanical lock causes the robot to bend to the right. When the CNT-LCE control module is subjected to heat or light from the left, the activation of the module cancels the effect of the mechanical lock, causing the robot to move straight ahead. C. Measurements of bending angle α as a function of the applied pressure under different light and heat conditions. Scale bar in B: 2 cm.

Figures 3A, 3B:
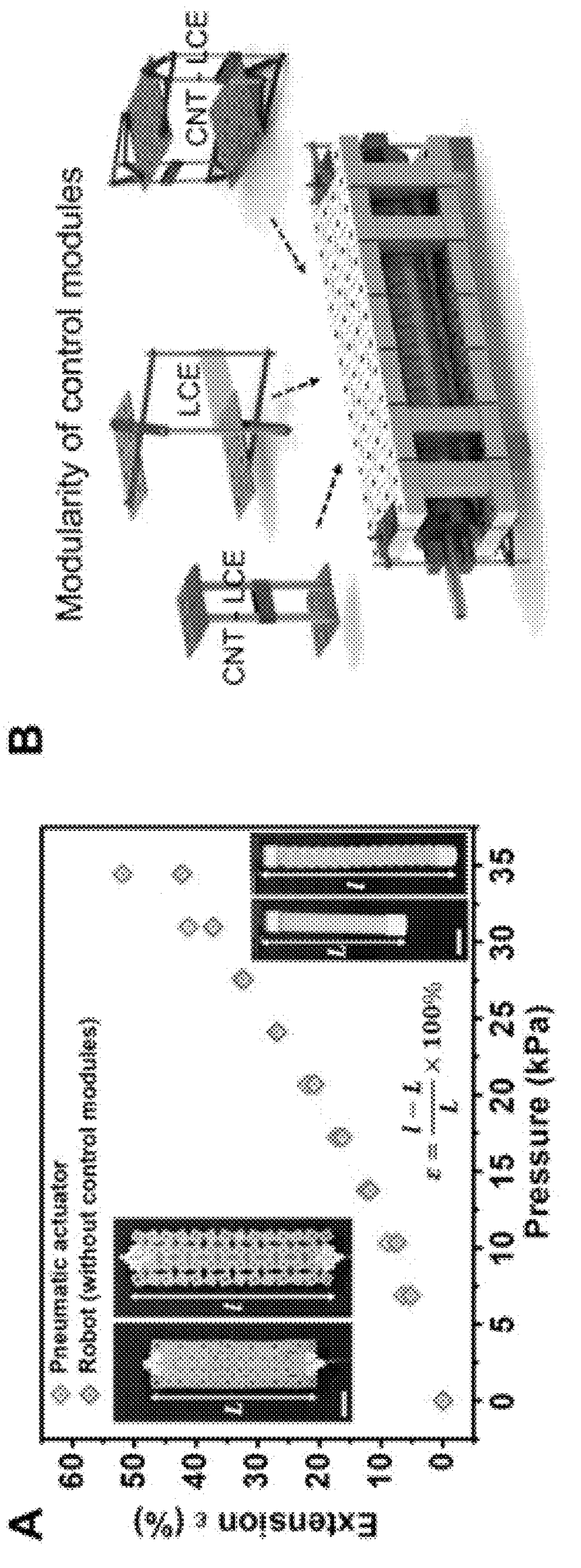
Figures 3C, 3D:
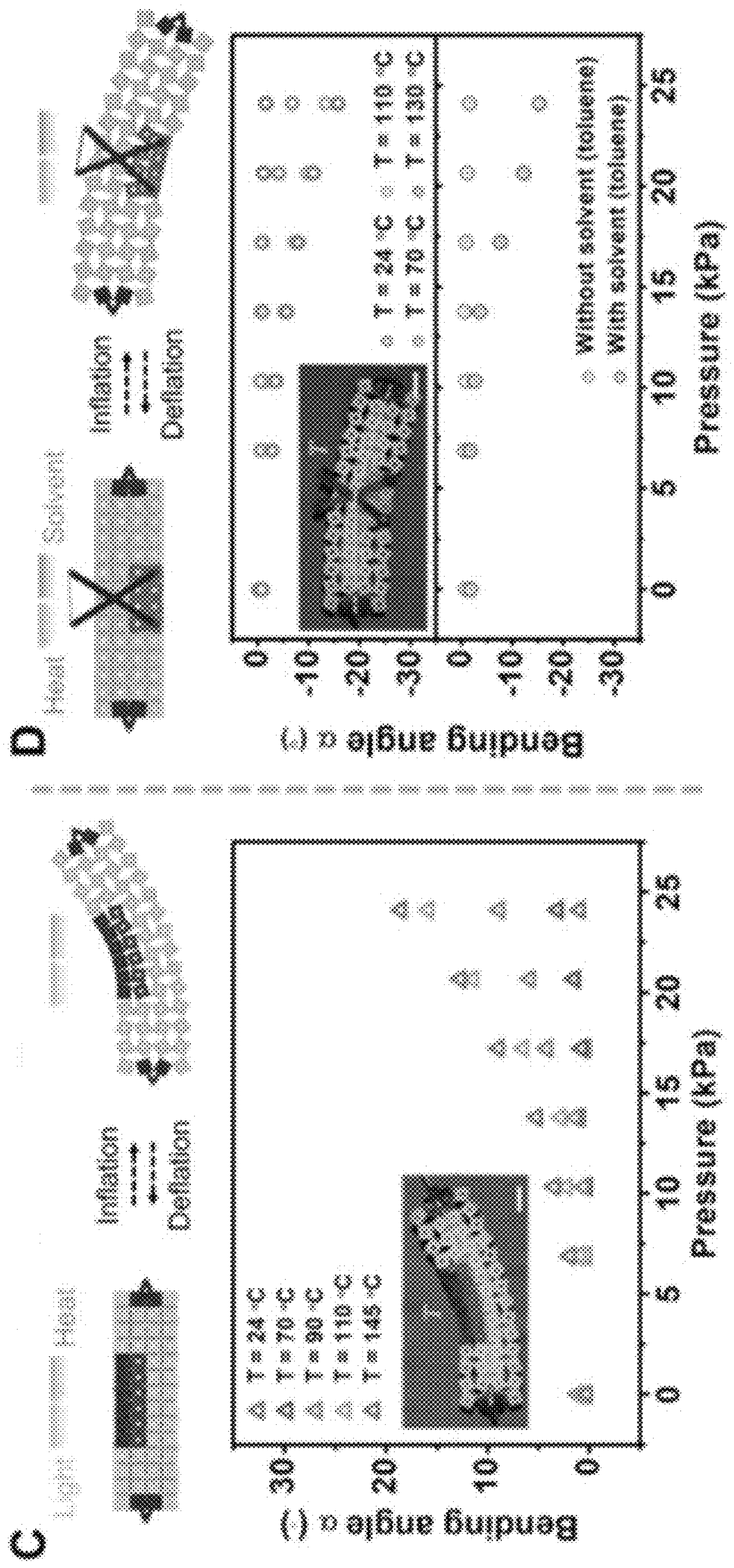

FIGS. 51A-51C provide "AND" response of the robot. A. For the "AND" response, we attach a mask control module to the exterior of a CNT-LCE module (FIG. 3C). B. The experimental images of the robot under different light and heat conditions. When the robot is exposed to only heat or light from the left side, (A=1, B=C=D=0 or A=0, B=1, C=D=0), the CNT-LCE cannot be actuated because the mask blocks the stimulus. Therefore the robot moves straight ahead. If the robot is exposed to both heat and light (A=B=1, C=D=0), the mask becomes transparent, allowing light to pass through it to actuate the inner CNT-LCE module. As a result, the robot bends to the left. C. Measurement of the bending angle α as a function of the applied pressure under different light and heat conditions. Scale bar in B: 2 cm.

Figure 52:
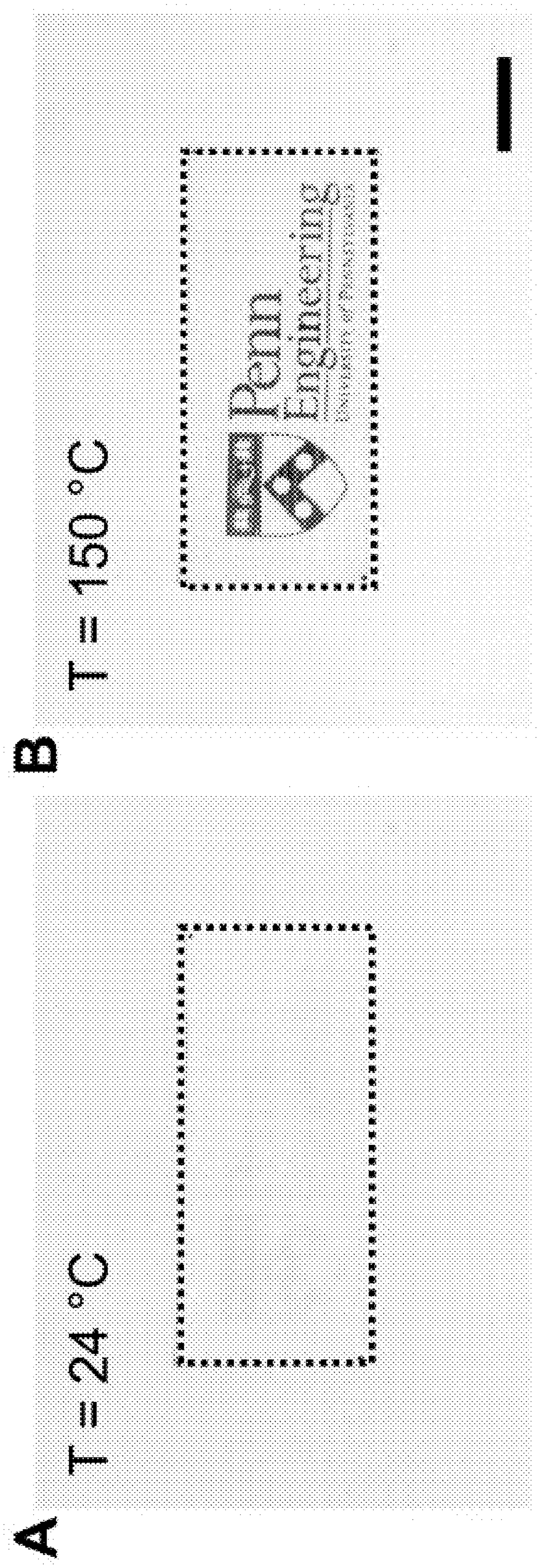

FIGS. 52A-52B illustrate that the polydomain LCE changes its transparency when the temperature is increased A. At room temperature, the polydomain LCE is opaque. B. At high temperature, the LCE is transparent due to a nematic-isotropic phase transition. Scale bar in B: 2 cm.

Figure 53:
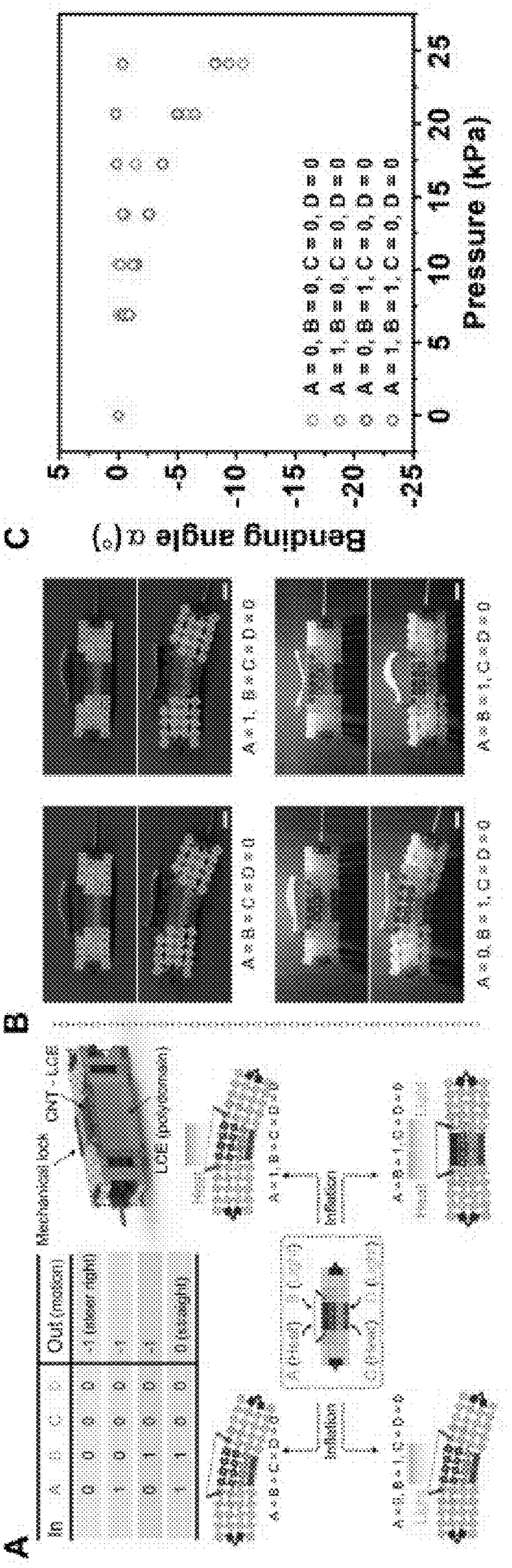

FIGS. 53A-53C provide "NAND" response of the robot. A. For the "NAND" response, we use a "mechanical lock" module, "mask" module, and CNT-LCE module. B. The robot bends to the right when subjected to only heat or light from the left side (A=1, B=C=D 0 or A=0, B=1, C=D=0). However, if the robot is exposed to both heat and light, the mechanical constraints on the two sides cancel one another, causing the robot to move straight ahead. C. Measurement of the bending angle α as a function of the applied pressure under different light and heat conditions. Scale bar in B: 2 cm.

Figure 54:
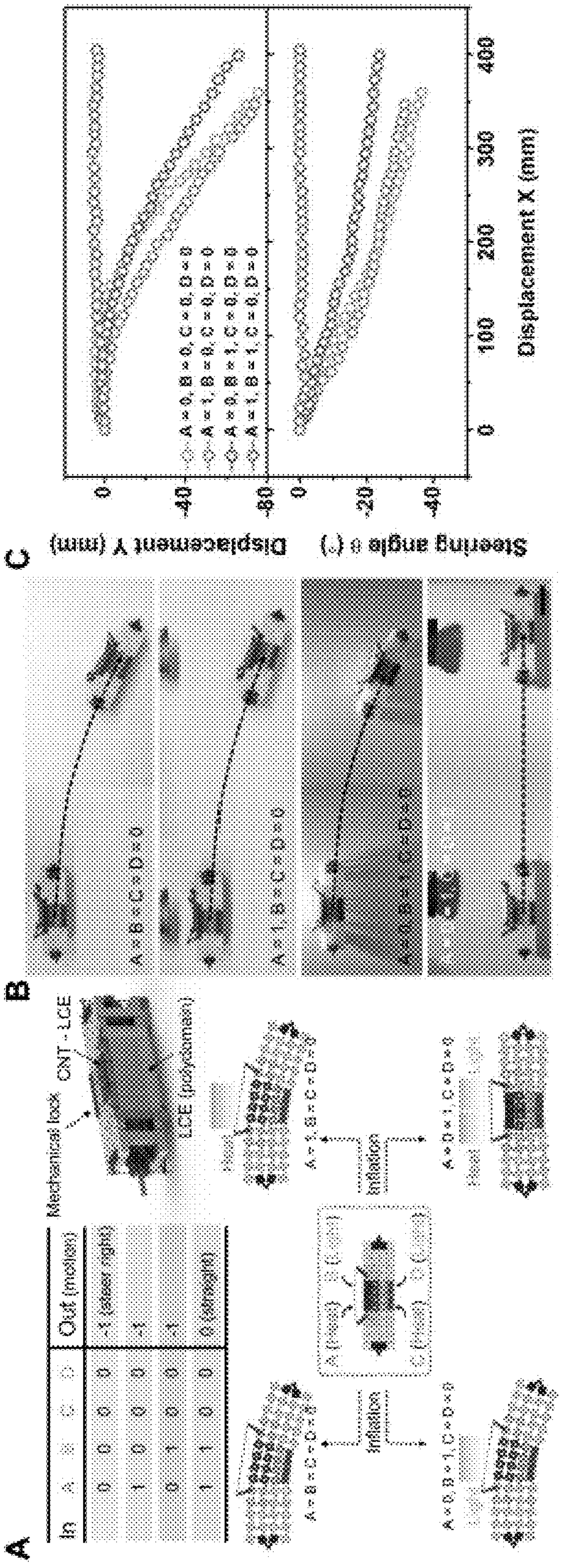

FIGS. 54A-54C provide the trajectories caused by a "NAND" response. A. The truth table of the "NAND" response. B-C. Experimental images and trajectories, respectively, of the robot with different heat or light inputs. Scale bar in B: 2 cm.

FIGS. 55A-55C provide "XOR" response of the robot. A. In this case, two identical control modules are distributed symmetrically along the two sides of the robot body. B. When one side of the control module is subjected to light or heat, the body of the robot bends toward the stimulus. If the control modules on both sides are active, their effects cancel, causing the robot to move straight ahead. C. Measurement of the bending angle α as a function of the applied pressure under different light and heat conditions. Scale bar in B: 2 cm.

Figure 56:
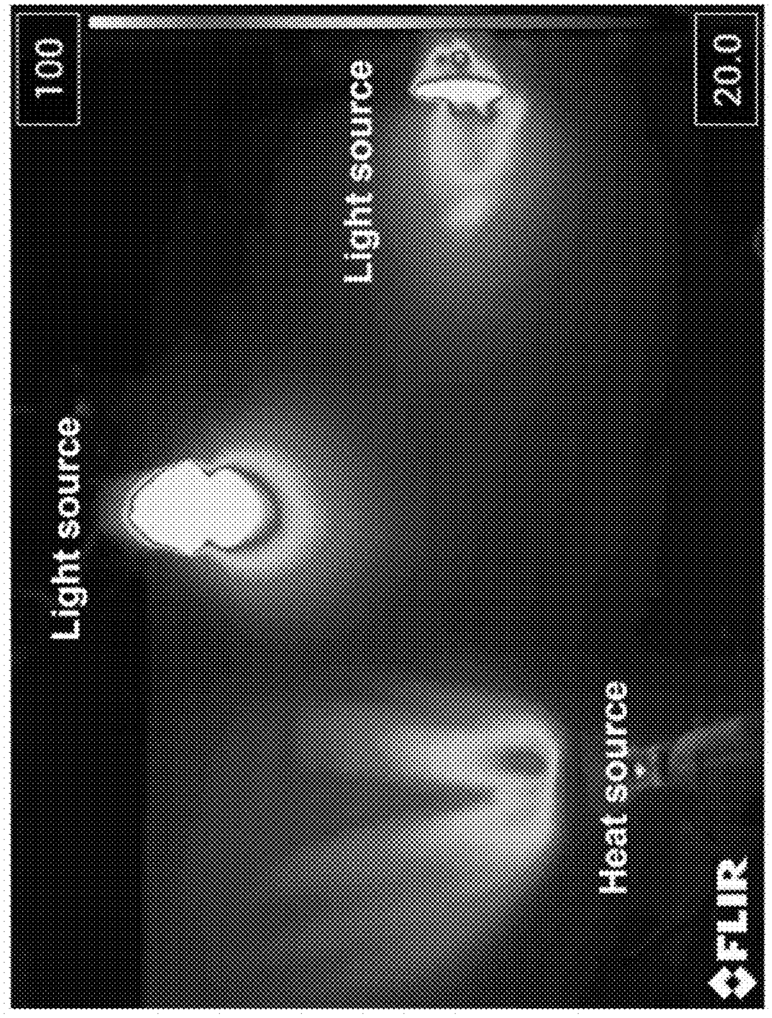

FIG. 56 provides an infrared/thermal image of the environment with multiple external stimuli.

Figure 57:
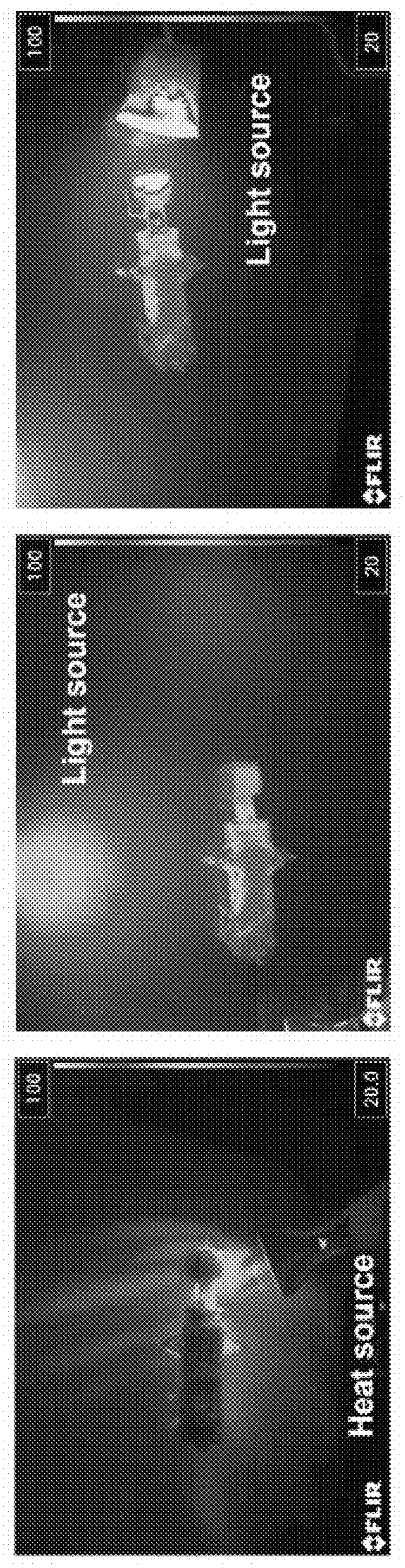

FIG. 57 provides additional thermal images of the electronics-free soft robot in different environments.

Figure 58:
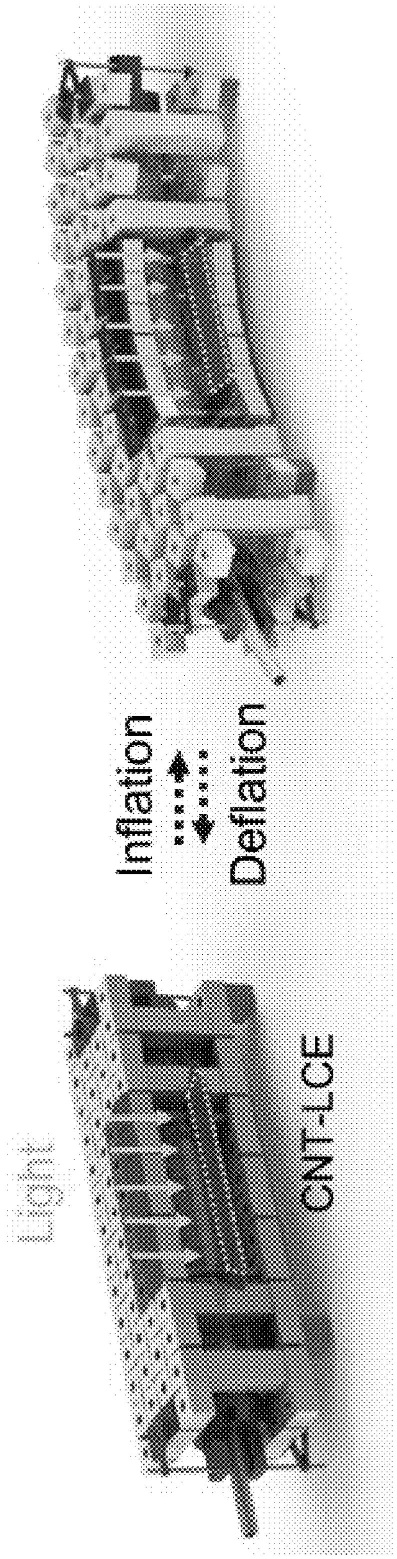

FIG. 58 illustrates that a robot can sense and respond to the light from top.

Figure 59:
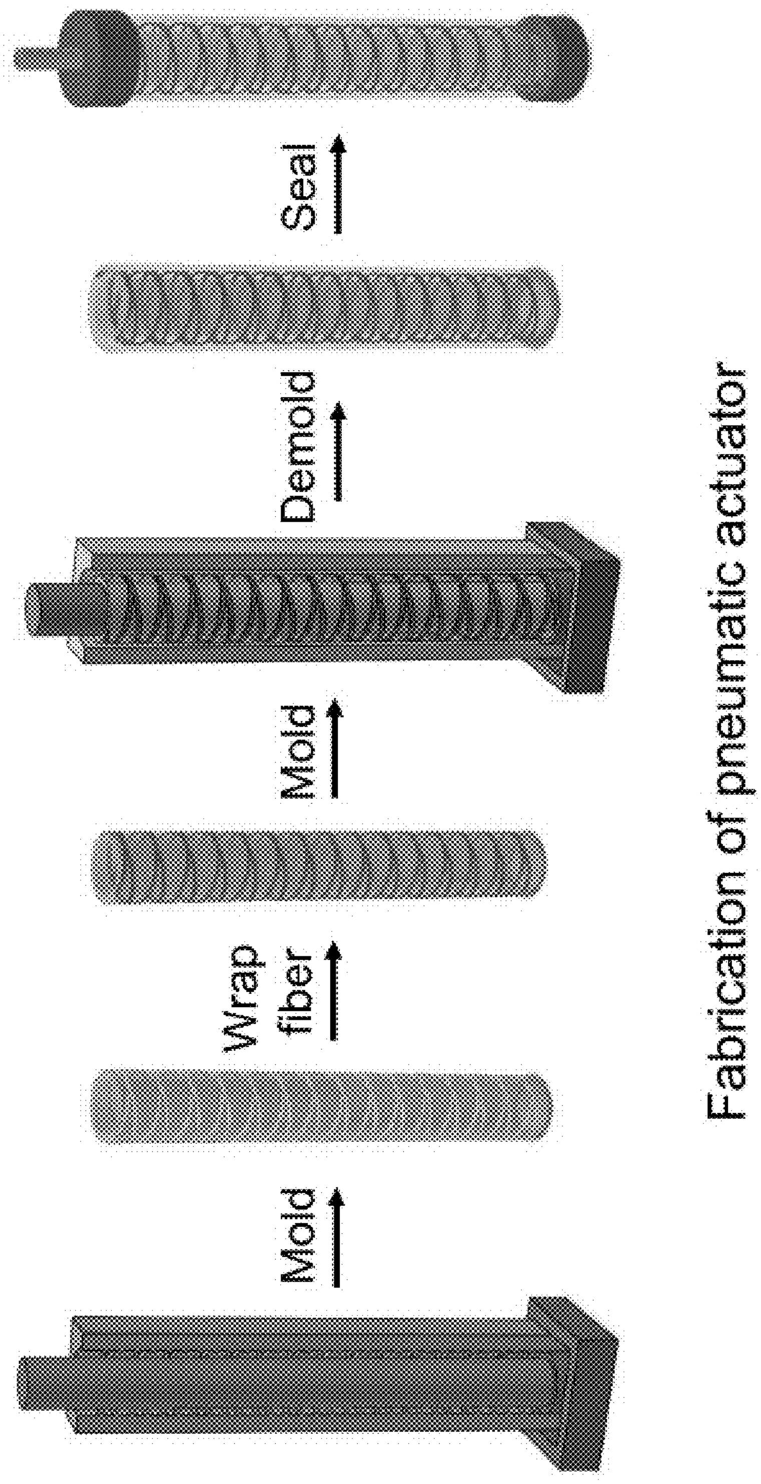

FIG. 59 illustrates fabrication of the pneumatic actuator. The pneumatic actuator is fabricated following a conventional molding-casting process. The silicone precursor (Ecoflex 30) is poured into the 3D printed mold and cured. Then, a kevlar fiber is wrapped on the surface of the cured silicone tube. After that, we encapsulate the kevlar fiber by pouring another layer of the silicone precursor. Two caps are finally glued to the tube and we insert an air tube at one end.

Figure 60:
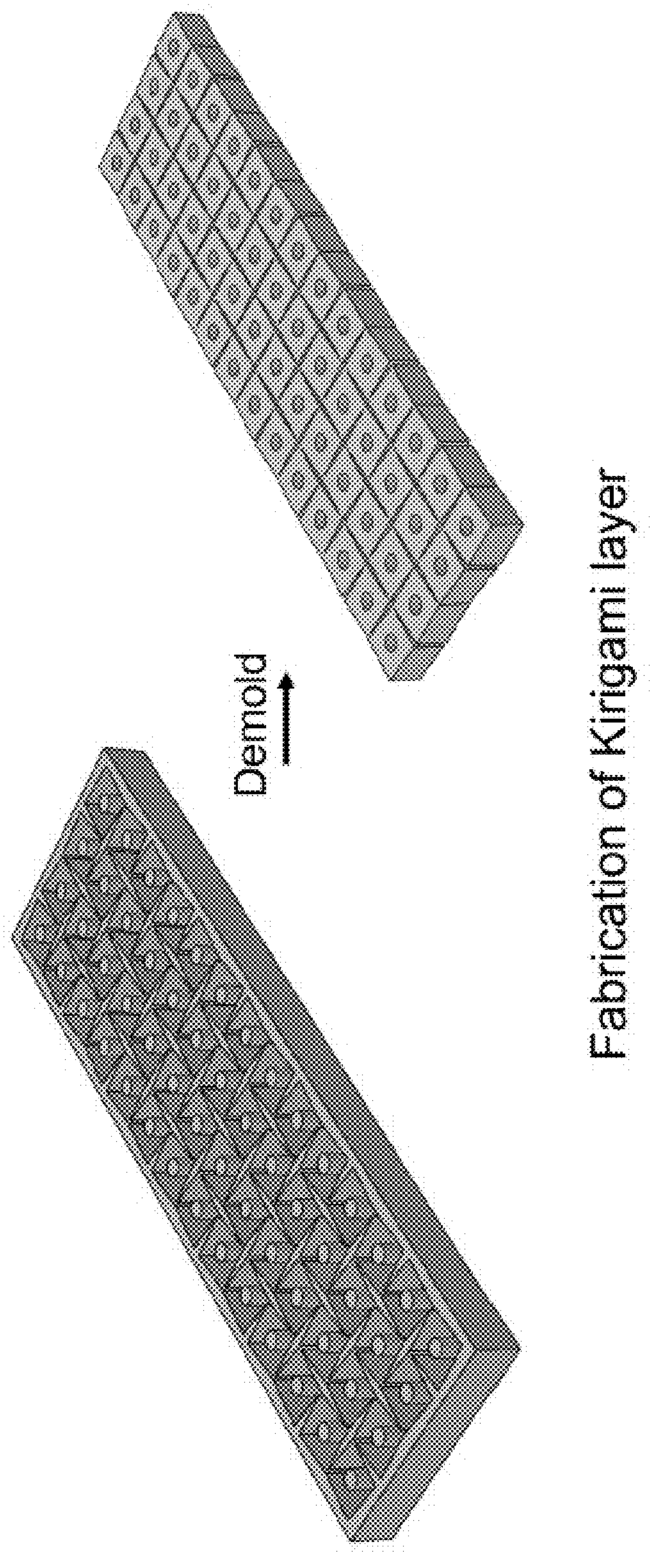

FIG. 60 illustrates fabrication of the rotating squares kirigami platform. The rotating squares kirigami platform is fabricated following a conventional molding-casting process. The silicone precursor (Dragonskin 10) is poured into the 3D-printed mold and cured.

FIGS. 61A-61B illustrate connecting the kirigami body and pneumatic actuator. A. Schematic shows how the actuator and kirigami body are connected to each other. B. All the squares can be freely opened when pressure is applied to the pneumatic actuator. The actuator does not buckle when the applied pressure is 25 kPa. Scale bar in B. 2 cm.

Figure 62:
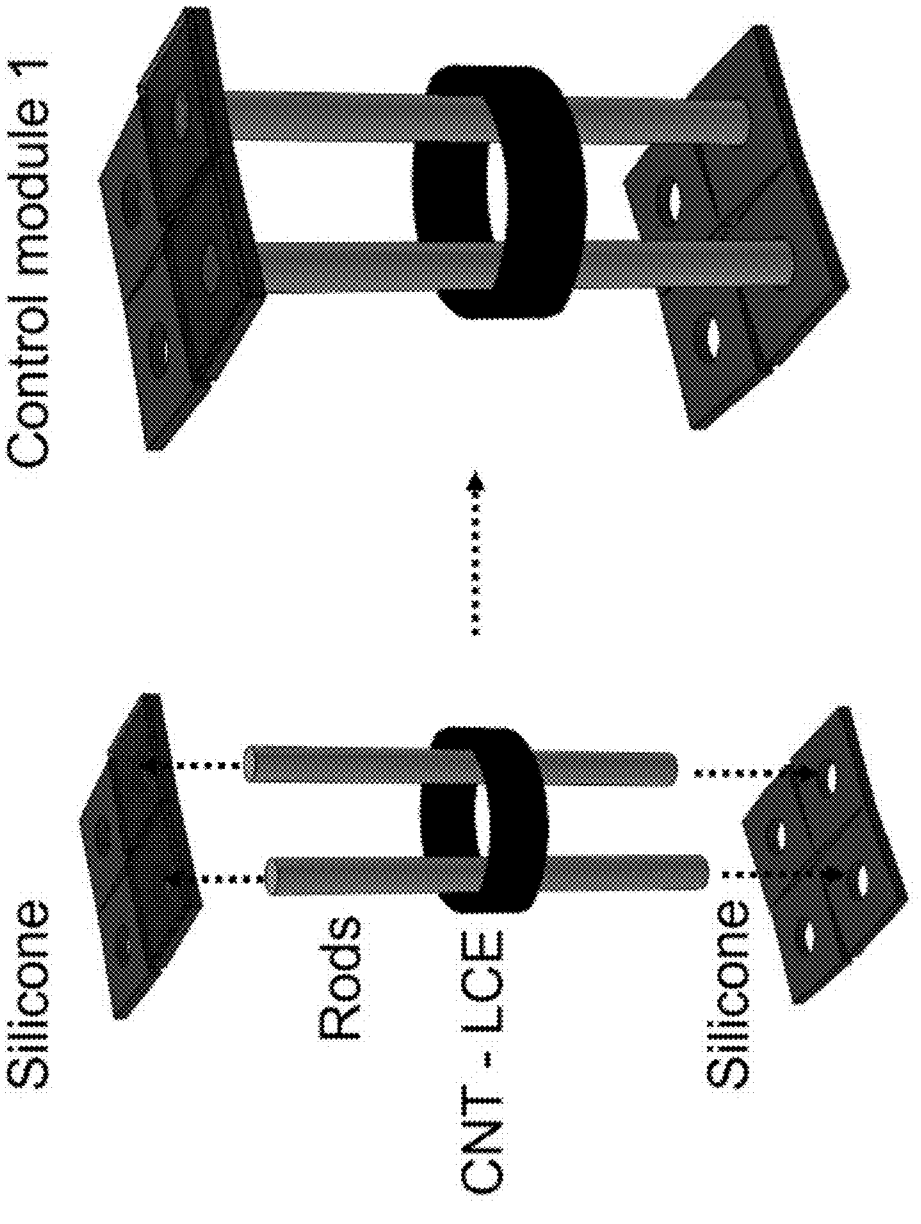

FIG. 62 illustrates a structure of control module 1. This control module consists of two layers of the silicone kirigami (red), two rigid rods, and a CNT-LCE strip.

Figure 63:
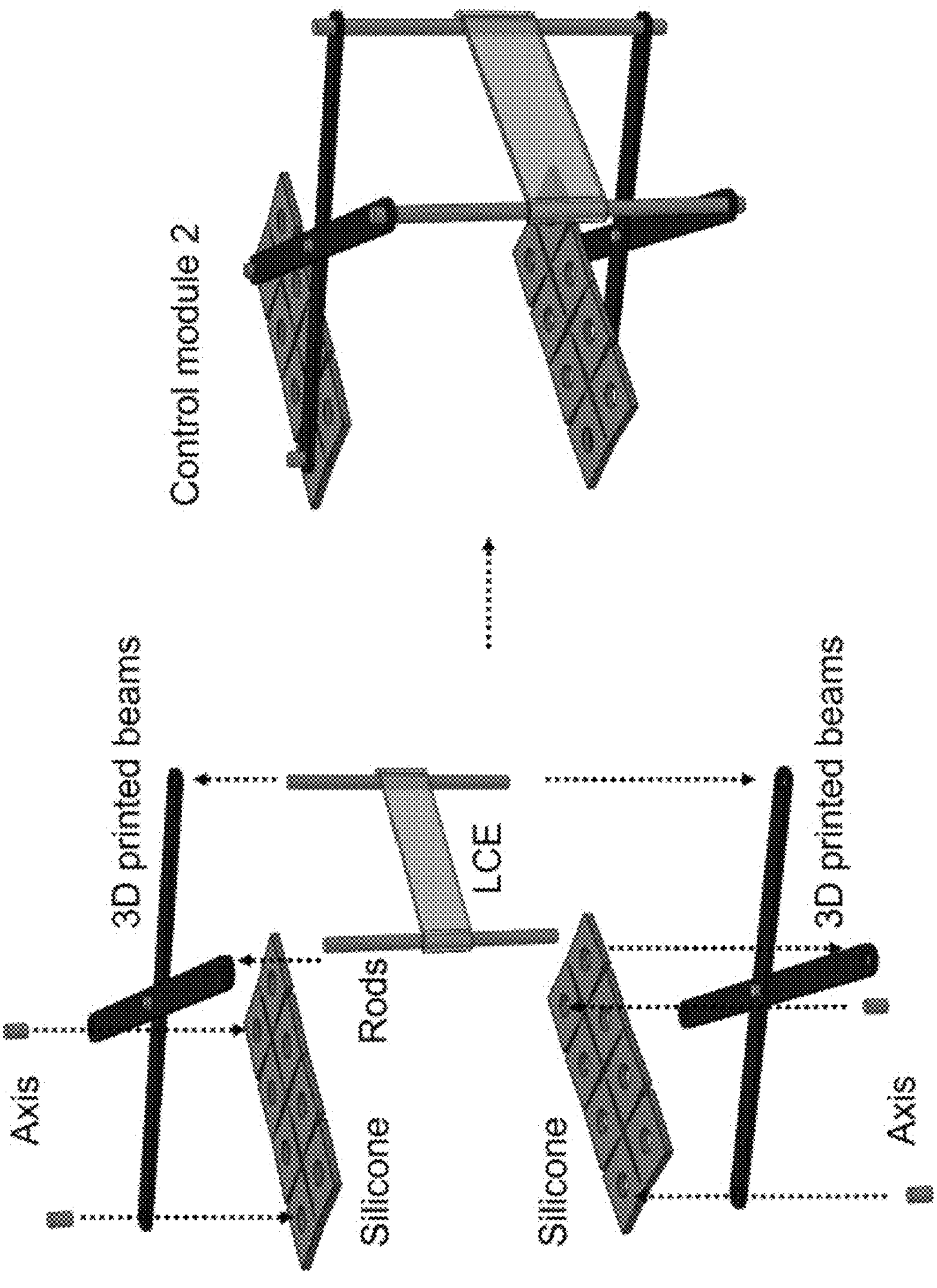

FIG. 63 provides a detailed structure of control module 2. This control module consists of two layers of the silicone kirigami (blue), four 3D-printed beams, two rigid rods, and a LCE strip.

Figure 64:
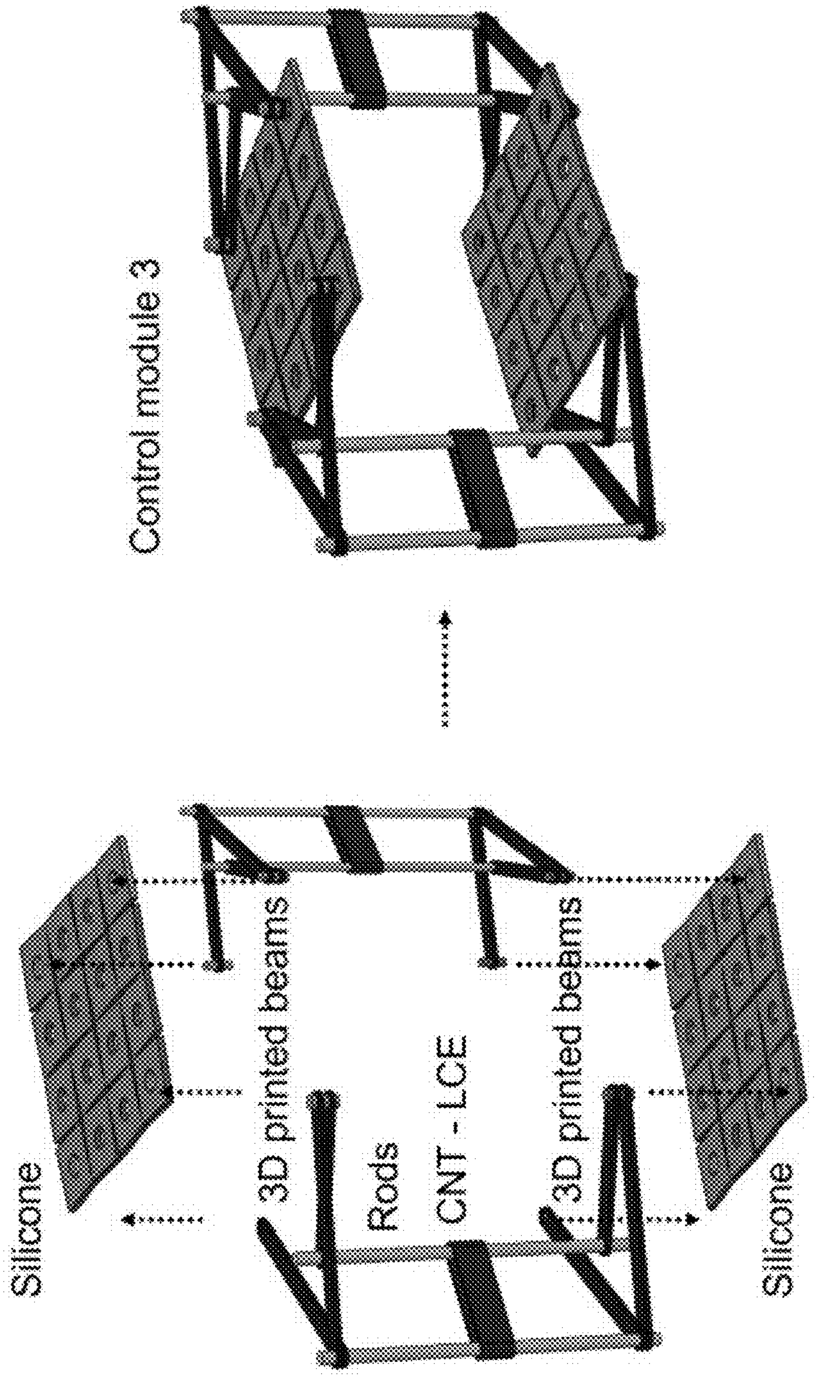

FIG. 64 provides a detailed structure of control module 3. This control module consists of two layers of the silicone kirigami (green), sixteen 3D-printed beams, four rigid rods, and two CNT-LCE strips.

Figure 65:
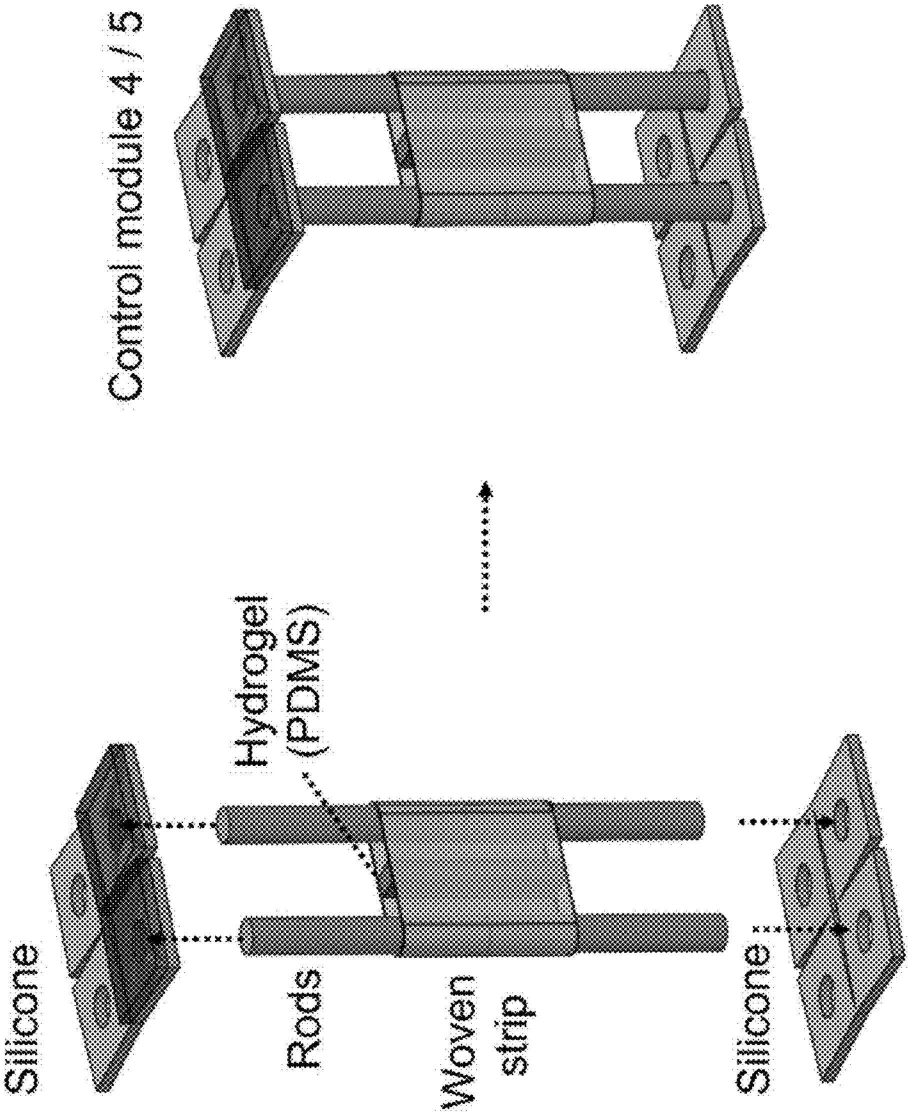

FIG. 65 provides a detailed structure of control modules 4 and 5. This control module consists of two layers of the silicone kirigami (pink), two rigid rods, and a woven strip integrated with hydrogel or PDMS.

Figure 66:
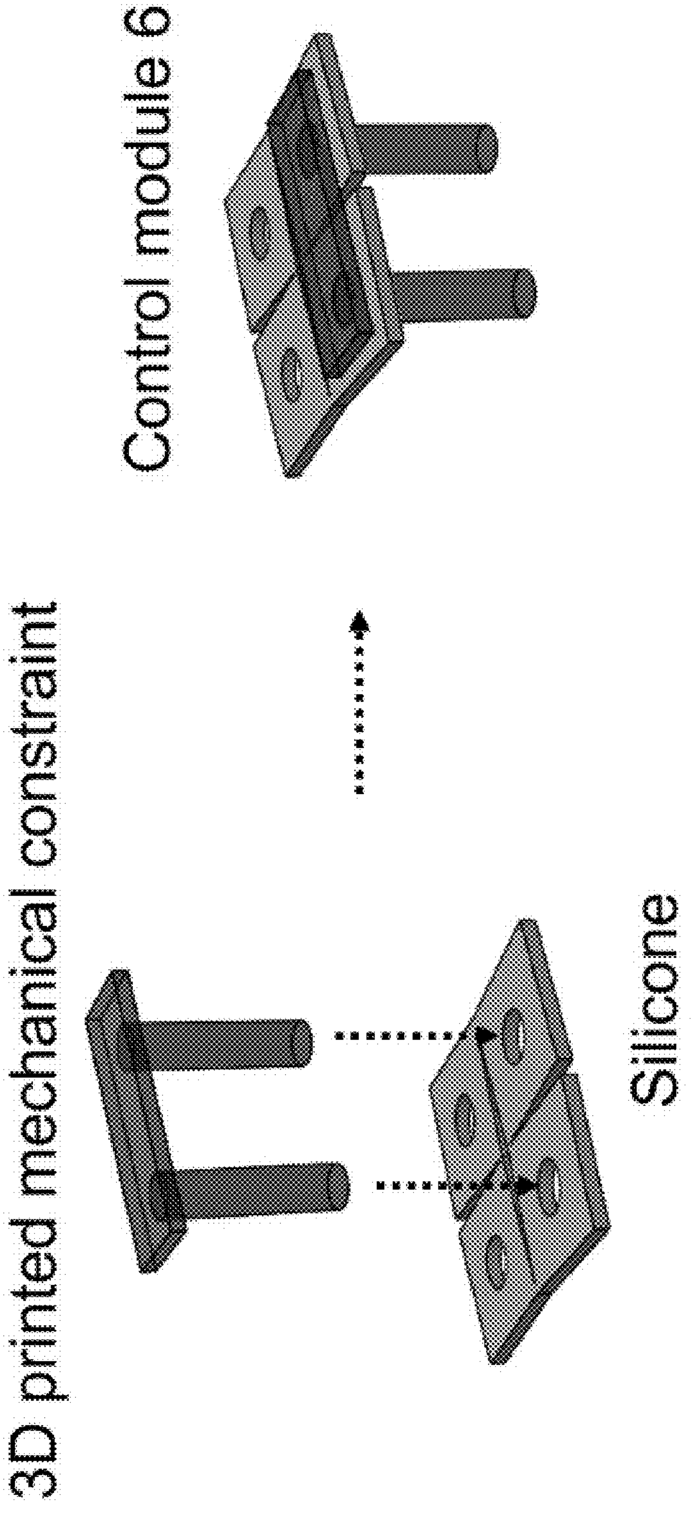

FIG. 66 provides a detailed structure of control module 6. This control module consists of a layer of the silicone kirigami (orange), and a 3D-printed mechanical constraint.

Figure 67:
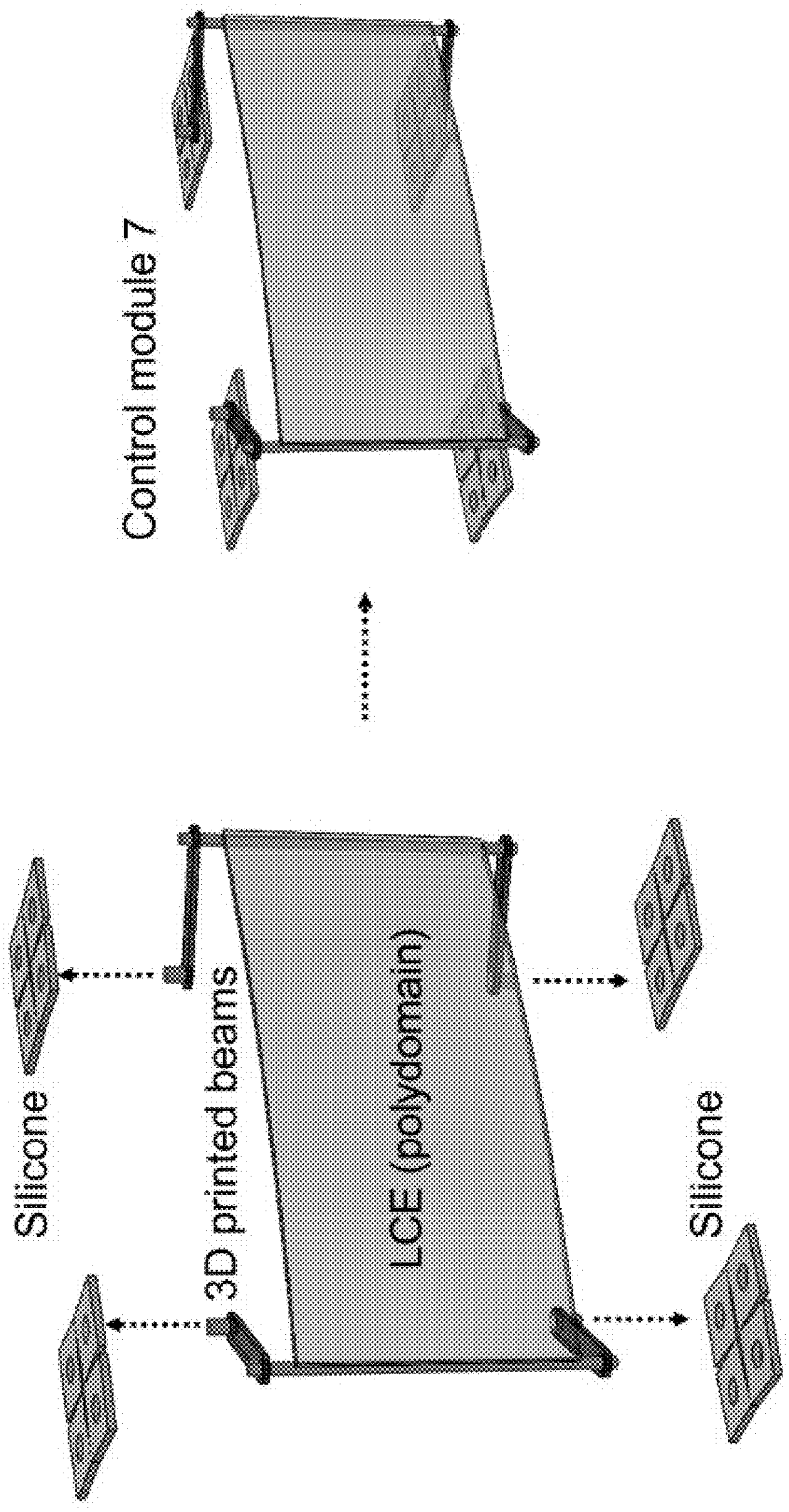

FIG. 67 provides a detailed structure of control module 7. This control module consists of four layers of the silicone kirigami (yellow), and four 3D-printed beams, two rigid rods, and a polydomain LCE.

Figure 68:
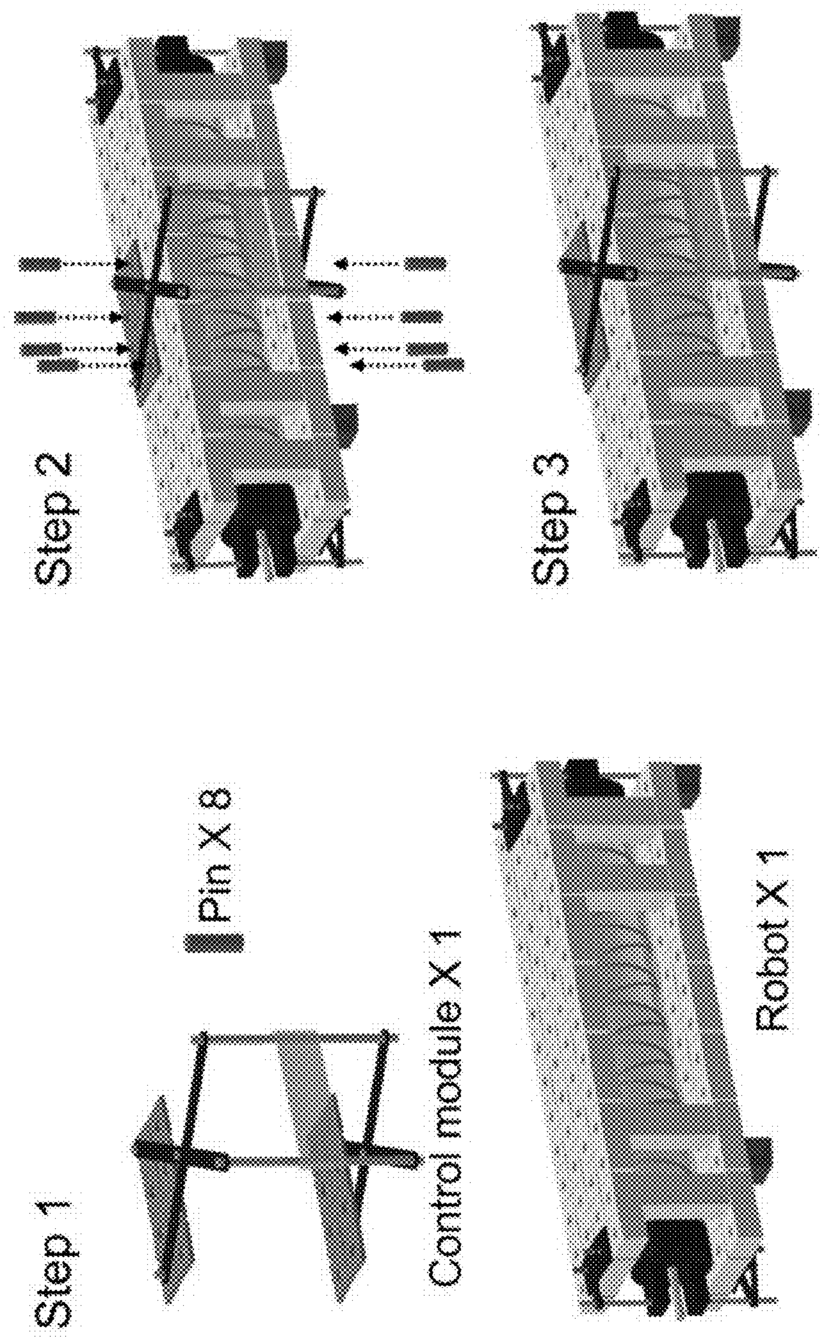

FIG. 68 illustrates integration of control modules. The silicone kirigami of the control module (blue) is attached to the kirigami layers (gray) of the soft robot. Eight pins are inserted into the holes of the kirigami to connect the control module and robot.

DETAILED DESCRIPTION OF ILLUSTRATIVE EMBODIMENTS

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints (e.g., "between 2 grams and 10 grams, and all the intermediate values includes 2 grams, 10 grams, and all intermediate values"). The endpoints of the ranges and any values disclosed herein are not limited to the precise range or value; they are sufficiently imprecise to include values approximating these ranges and/or values. All ranges are combinable.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4. Further, the term "comprising" should be understood as having its open-ended meaning of "including," but the term also includes the closed meaning of the term "consisting." For example, a composition that comprises components A and B may be a composition that includes A, B, and other components, but may also be a composition made of A and B only. Any documents cited herein are incorporated by reference in their entireties for any and all purposes.

Researchers have continued to develop strategies for environmental adaptation and autonomy in soft robots with ever-increasing capabilities. Historically, robots have achieved the ability to interact with their external environment via feedback loops involving multiple sensors, microcontrollers, and actuators constructed from rigid electronic components that can be bulky, complex, and mechanically incompatible with soft materials. In this work, we create a strategy for achieving autonomous path-planning in soft robots, effectively embodying the control system and its feedback loop in the compositional and structural features of the body of the robot. By including responsive materials such as liquid crystal elastomers and distributing these suitably throughout the soft body of the robot, the system can sense and respond to different external stimuli (light, heat, solvent) to produce versatile and autonomous changes to locomotion in response to different environments. Distinct control strategies can be achieved in the same robot by rearrangement of modular structural features. This work provides a new strategy for achieving fully autonomous robots for operation in uncertain environments.

Robots typically interact with their environment via feedback loops consisting of electronic sensors, microcontrollers, and actuators, which can be bulky and complex. Researchers have sought new strategies for achieving autonomous sensing and control in next-generation soft robots. Here, we describe an electronics-free approach for autonomous control of soft robots, embodying the sensing, control, and actuation feedback loop in the compositional and structural features of the soft robot. Specifically, we design multiple modular control units that are regulated by responsive materials such as liquid crystal elastomers. These modules enable the robot to sense and respond to different external stimuli (light, heat, solvents), causing autonomous changes to the robot's trajectory. By combining multiple types of control modules, complex responses can be achieved, such as logical evaluations that require multiple events to occur in the environment before an action is performed. This framework for embodied control offers a new strategy toward autonomous soft robots that operate in uncertain or dynamic environments.

Soft robotics has become a significant area of research in recent years, with the potential to enable robots with a number of promising characteristics [1, 2], such as resilience to large deformation [3, 4], safe human-machine interaction [5, 6], environmental adaptability [7, 8], novel and adaptable locomotion strategies [9, 10], and resistance to impact [11, 12]. Versatile deformable structures and actuating materials have been adopted in the design and fabrication of soft robots, including pneumatic and hydraulic actuators [13, 14, 15], dielectric elastomer actuators (DEAs) [16, 17], liquid crystal elastomers (LCEs) [18, 19, 20], magnetic actuators [21, 22], and hydrogels [23, 24]. Numerous useful functionalities have been demonstrated in soft robots, including gripping [25, 26], crawling [27, 28], jumping [29, 30], and shape adaptability [31, 32].

However, in order to sense and respond to the environment, most soft robotic systems rely heavily on traditional mechatronics (FIG. 16): solid-state sensors capture inputs from the environment; these signals are routed to an electronic processor; and the processor then uses the inputs to make decisions and issue commands to actuators. These sensing, control, and actuation feedback loops require complex integrated systems that may limit the function and form factor of the robot [16, 27, 33, 34]. Typically, these mechatronic devices consist of rigid electronic components and peripheral circuits that can be bulky, expensive, and mechanically incompatible with soft materials [35]. In addition, these electronics may be undesirable for work in certain harsh environments, e.g., due to the potential for spark ignition (mines, nuclear reactors) or in environments in which metal may be incompatible or limiting (magnetic resonance imaging machines, water, solvents) [36]. Moreover, for applications in which the robot is intended to directly change shape or function in response to its environment, an electronic sensing, control, and actuation strategy can be extremely complex and require a large number of transduction steps. The same problems arise for microrobots or other robots with unique form factors that might be incompatible with conventional electronics [37].

Nature provides inspiration for the design of autonomous capabilities based on embodiment rather than traditional electronics. Instead of using electronic components, biological systems interact with the environment via physical intelligence, directly embodying many of the sensing, processing, and actuating functions in spatially-distributed features of the physical body [37, 38]. Embodying physical intelligence provides unique advantages, including simplicity and scalability [38, 39]. This strategy has been recently applied to soft robotic systems [40, 41]. For instance, some developed untethered soft-legged quadruped robots that reverse their direction of motion when a wall is contacted [42]. Other designed and fabricated a mechanical bistable valve that enables simple logic circuits, and demonstrated how these can be applied in soft grippers and crawlers [43]. In parallel, nascent ideas in mechanical metamaterials have been developed that blur the distinction between robotics and materials [44, 45]. These mechanical metamaterials embody transduction and control functions in their engineered architecture, allowing the materials to use environmental inputs for mechanical computation and autonomous adaptation [46, 47, 48, 49, 50]. For example, recent work has demonstrated environmentally-responsive mechanical logic [48, 51, 52], including an artificial "flytrap" that can autonomously actuate when it senses specified environmental stimuli.

Figure 1:
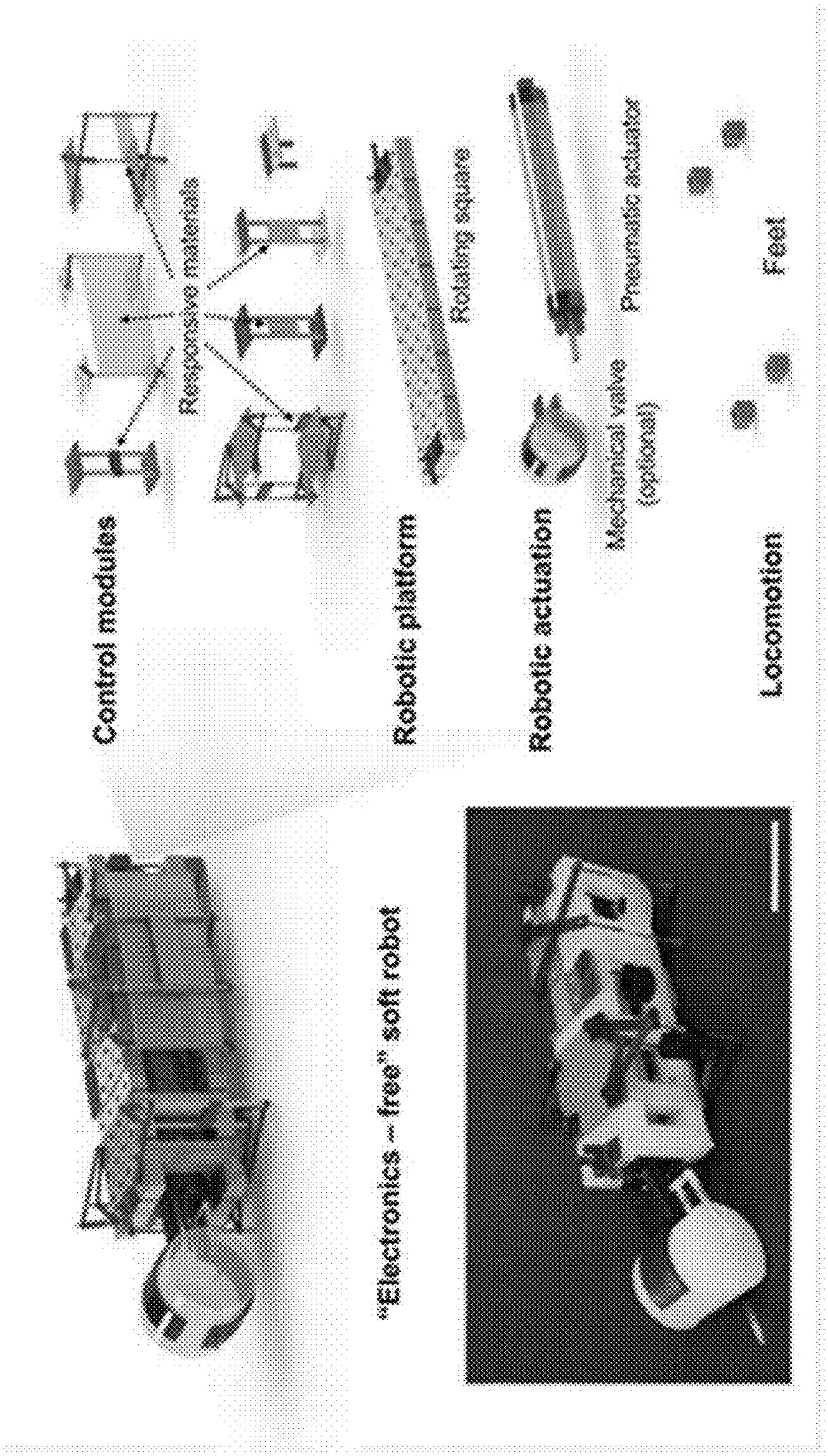
FIG. 1 provides an example electronics-free soft autonomous robot. The soft robot comprises a kirigami-inspired body, a pneumatic actuator (mechanical valve is optional), multiple types of control modules (with responsive materials), and feet (to enable locomotion). Scale bar: 5 cm.

In this work, we build on the above advances in intelligent mechanical metamaterials and embodied logic to create an electronics-free soft autonomous robot (FIG. 1). We accomplish this by designing modular control units that incorporate soft responsive materials, such as LCEs that respond to heat or light (via the photothermal effect), hydrogels, and silicones (poly-dimethylsiloxane, PDMS), and distributing these units throughout the soft body of the robot (FIG. 1). It is the influence of these control modules (which can constrain the local rotation of the kirigami when activated by stimuli-responsive materials) that determines the robot's trajectory as it moves through its environment. The robot body itself consists of a kirigami-inspired architecture based on the rotating squares mechanism [53, 54, 55], which serves as a flexible and convenient platform for the reconfigurable, modular control units (FIG. 1). This platform supports the use of multiple control modules, distributed throughout the robot's body. The behavior of the robot in response to environmental inputs is a function of the spatial distribution (and interactions) of the control modules. The trajectory of the robot is thereby governed by a distributed computational event, comprising a logical combination of distinct environmental in-puts. This framework provides a new strategy for achieving fully autonomous, electronics-free soft robots that can operate in dynamic or uncertain environments following a variety of control objectives.

Results

Design and Operational Principle

Figure 2:
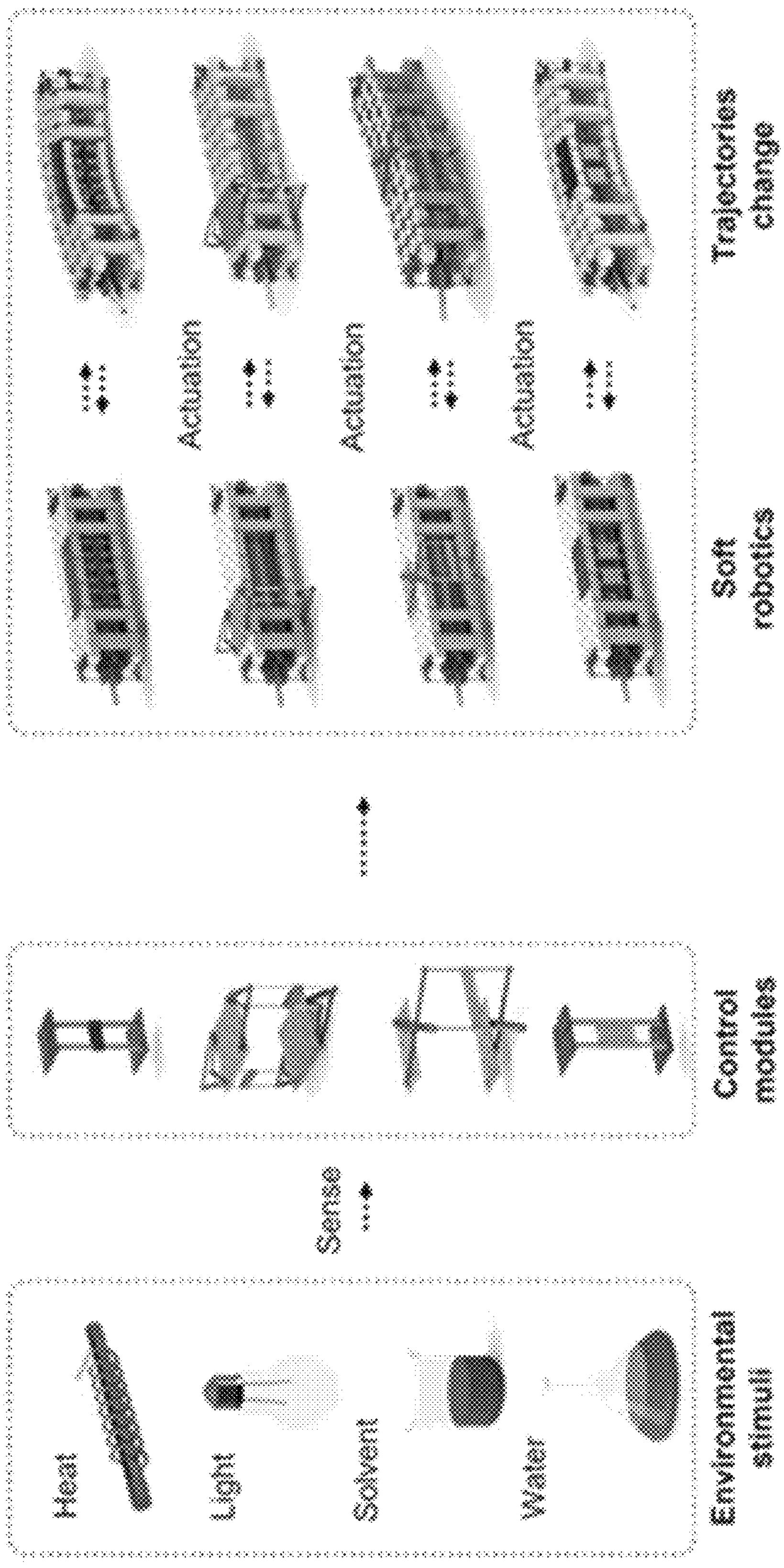
FIG. 2 provides an operating principle of electronics-free soft autonomous robots. Multiple control modules allow the soft robots to respond to their surrounding environments (heat, light, sol-vents). Control modules activate in response to local stimuli, which mechanically constrain the actuating kirigami, causing changes to the curvature of the robot, and, as a result, to its trajectory.
Figure 17:
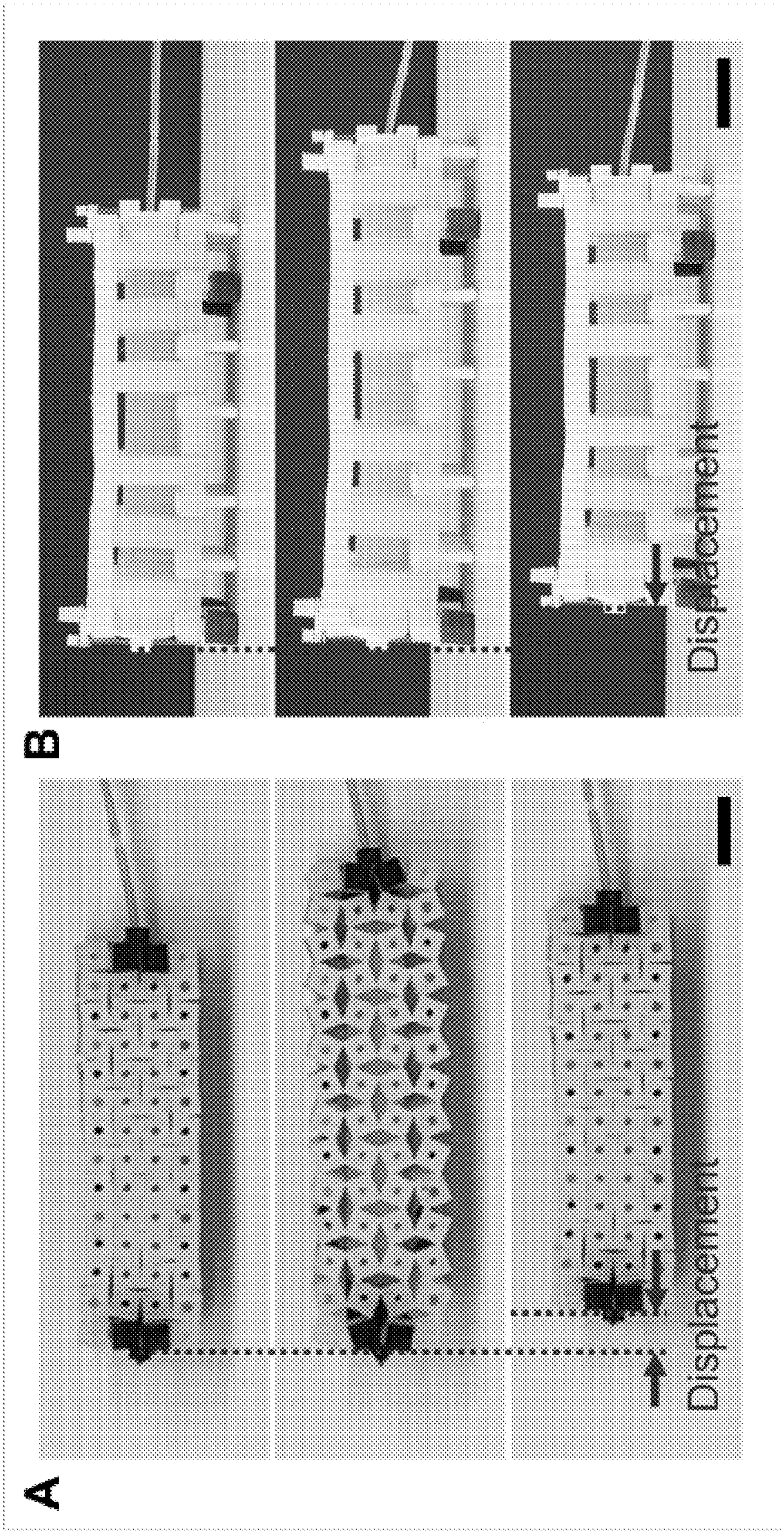
FIGS. 17A and 17B illustrate that feet underneath a robot according to the present disclosure enable it to move forward due to anisotropic friction between the ground and robot. When the pneumatic actuator is inflated, the rear feet act as stationary points and the front of the robot moves forward. Once the pneumatic actuator is deflated, the front feet are stationary, pulling the entire body forward. A displacement (of approximately 1 cm) can be generated after one cycle. Scale bar: 2 cm.

The design of the electronics-free autonomous robot is shown in FIG. 1. This robot comprises four components: a kirigami-inspired body, a pneumatic actuator (equipped with a bistable mechanical valve), multiple types of control modules (with integrated responsive materials), and feet to enable locomotion. The pneumatic actuator is sandwiched between two layers of the kirigami. It can generate periodic extension and contraction when pressurized air is applied, which in turn expands or contracts the kirigami body (which accommodates the changing dimensions of the actuator via the internal rotation of the squares). The bistable valve (FIG. 1) is optional (see discussion later), but it can translate a constant pressure source into a periodic inflation/deflation of the pneumatic actuator [43], hence an electronic pressure controller is not required. The feet underneath the body of the robot enable it to move forward due to anisotropic friction between the robot and ground [43] (FIG. 17). Control modules can be added, moved, or removed from the kirigami body, imparting different functionality to the robot. Each of these modules integrates stimuli-responsive materials, which act as sensors for stimuli such as light, heat, and solvents (FIG. 2). These materials can activate or deactivate control modules, which in turn induce bending in the kirigami during pneumatic actuation. The placement of these control modules in the kirigami thereby enables the robot to sense and respond to these stimuli, and, based on the location and type of control modules, to autonomously change its trajectory of locomotion (FIG. 2). In this work, we mainly focus on the use of LCEs to sense and respond to heat or light. However, the design principle can be applied to a broad range of external stimuli using multiple responsive materials (see SI for examples).

Figure 8:
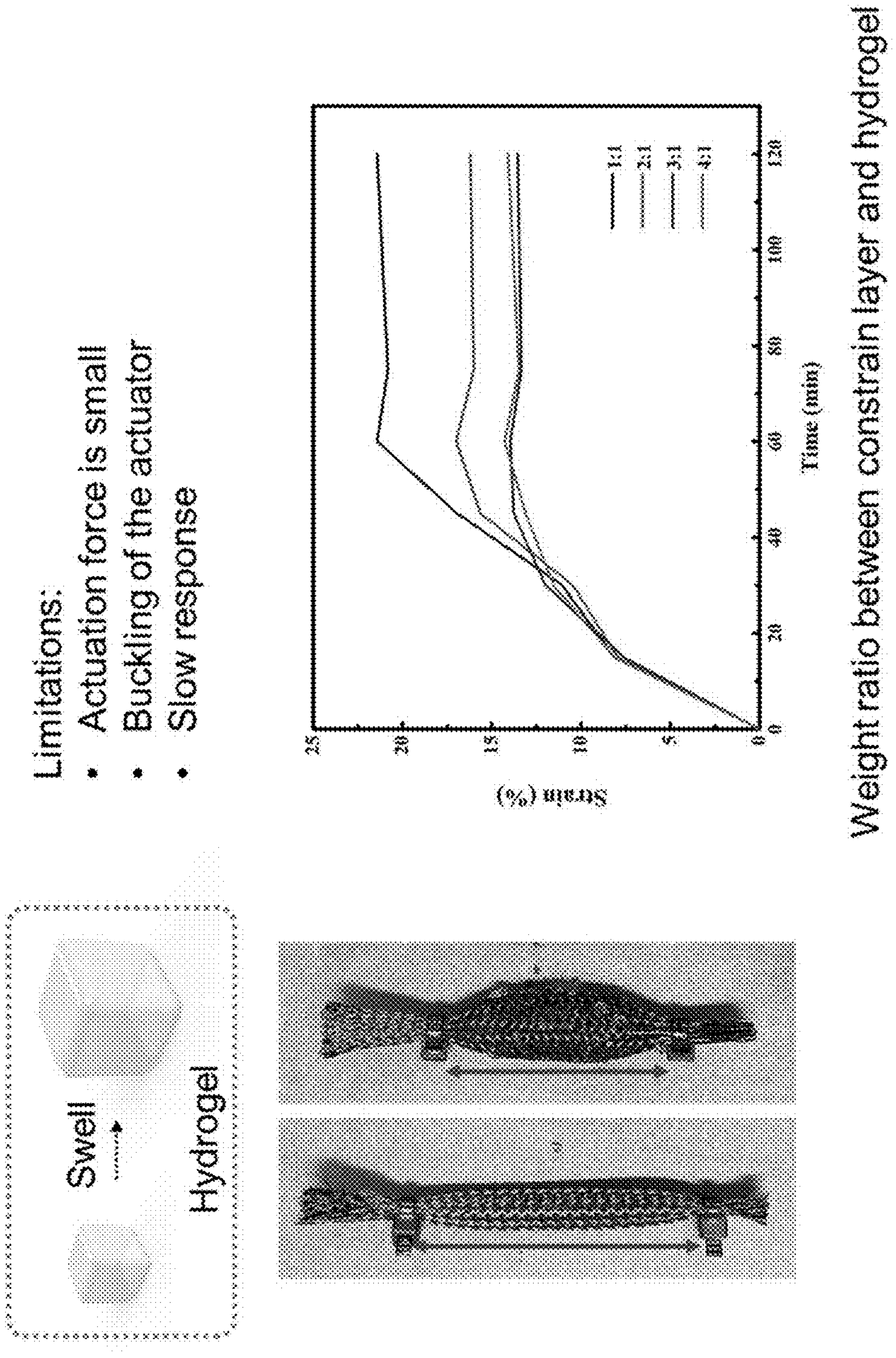
FIG. 8 illustrates the use of a hydrogel as a reactive material.
Figure 18:
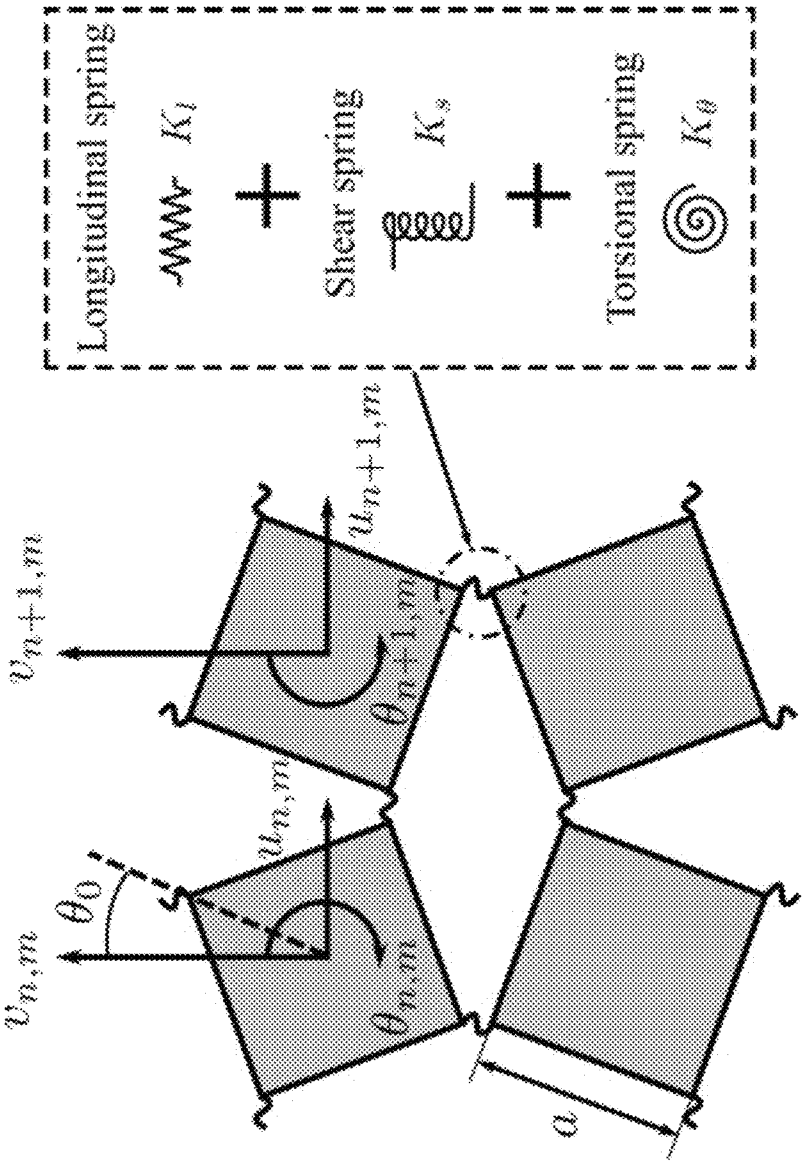
FIG. 18 provides a schematic for discrete model. Each hinge connecting two squares is modeled by three linear springs: a longitudinal spring, a shear spring, and a torsional spring.
Figure 19:
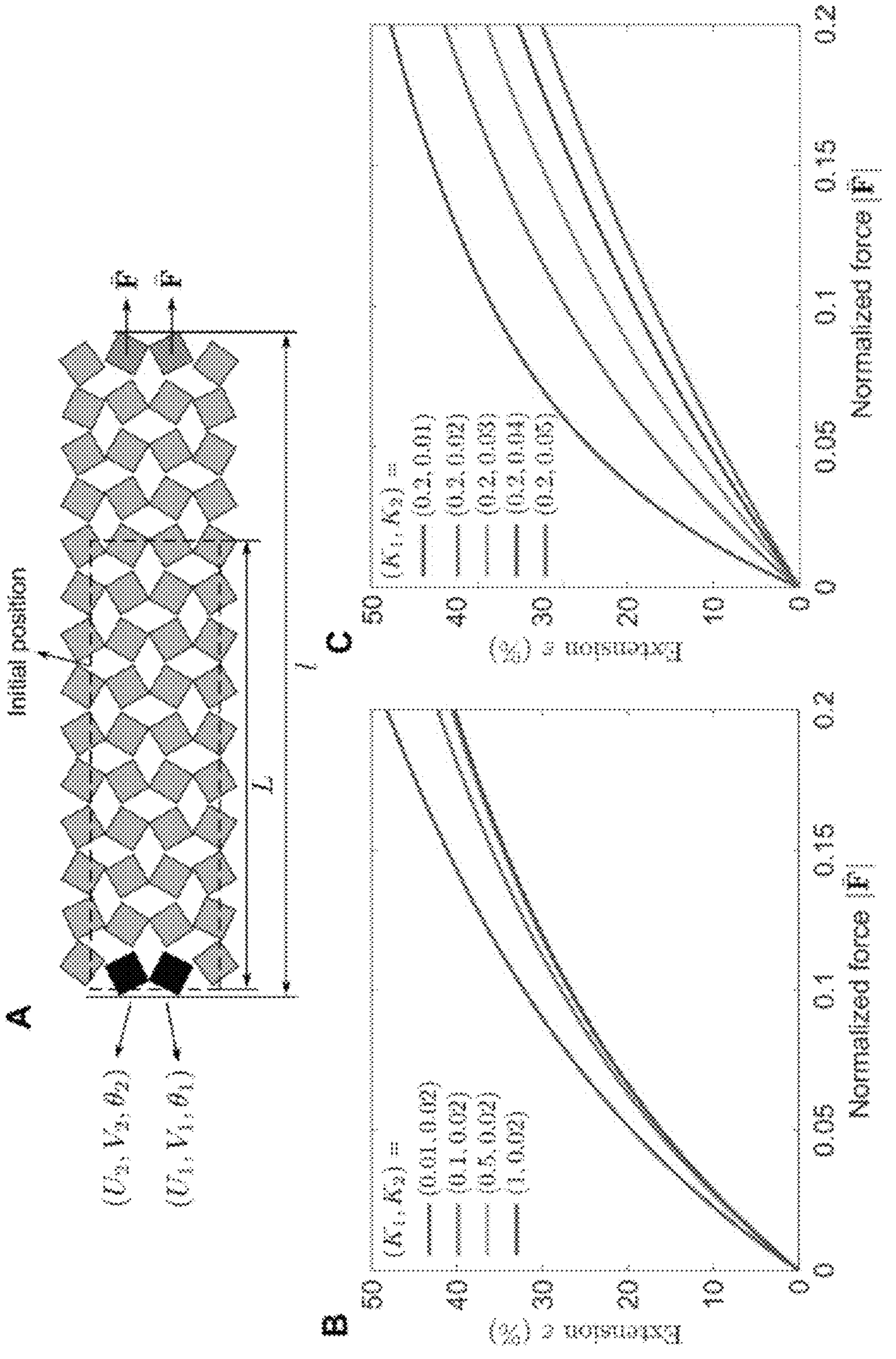
FIG. 19 provides
Figure 21:
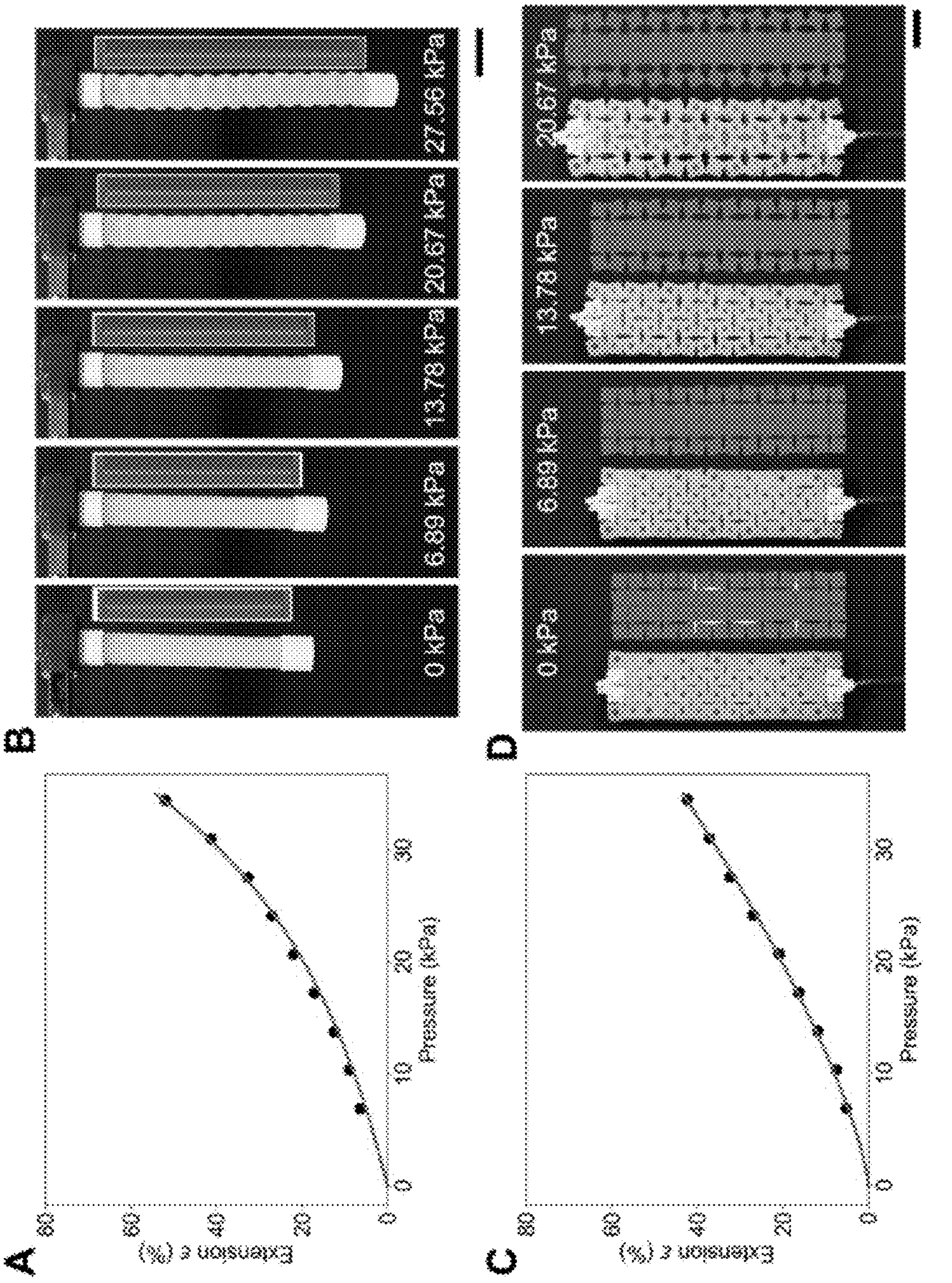

Several important parameters affect the behavior of the kirigami robot and the efficacy of the control modules, including the hinge thickness of the kirigami, the constraints applied to the square units, and the size of the kirigami. Before deciding on a final set of parameters for the robot, we experimentally and numerically characterized the effect of these parameters, with details provided in the SI. In brief, we built a discrete model that treats the kirigami squares as rigid bodies and the thin hinges as elastic springs (FIG. 18). The discrete model is then non-dimensionalized to identify the fundamental parameters that intrinsically dictate the mechanical behavior of the kirigami platform, thus providing useful guidelines for the design of the kirigami body (FIG. 19-5). We also performed finite element analysis (FEA), which has the advantage of validating the experimental data more precisely, but which is computationally expensive, and therefore less efficient than the discrete model for parametric studies (FIG. 21-8). Results from these methods are discussed below.

Figure 25:
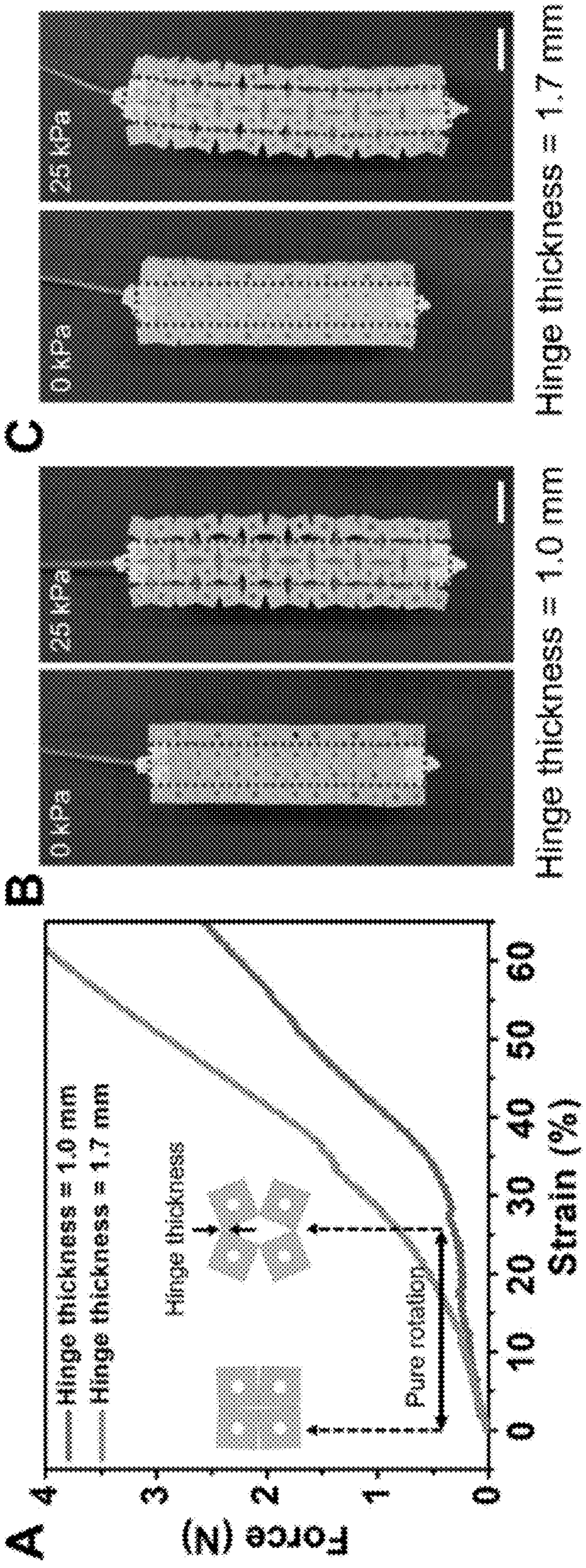

The inflation/deflation cycle of the pneumatic actuator powers the locomotion of the robot. When no relevant stimuli are present, inflation of the pneumatic actuator causes rotation of the kirigami squares and associated lengthening of the robot body. The extension of the platform is dependent on the pressure in the pneumatic actuator. We measure the extension ratio ($\epsilon$) as a function of the applied pressure, both for the pneumatic actuator and for the assembled robot (without any control modules, FIG. 3A). The extension ratio ($\epsilon$) is defined as $(1-L)/L\times100\%$, where L is the length of the initial state and 1 is the length of the pressurized state. To accurately quantify this relationship, in these tests the pressure in the pneumatic actuator is precisely controlled using a custom fluid control system (FIG. 24). The ability of the kirigami to extend with the actuator is a function of hinge thickness. We characterized this effect experimentally and numerically (using both our discrete model and FEA). The experimental results show that smaller hinge thicknesses (1 mm) can generate a large extension ratio (27%) without causing buckling of the pneumatic actuator (FIG. 25). Both the discrete model and FEA agree with experiments, i.e., that the hinge thickness should be as thin as possible to allow efficient extension (e.g., FIG. 25) [56]. As shown in FIG. 3A, when the pressure is below 25 kPa, the extension ratio of the pneumatic actuator is comparable to the robot. Further increasing the pressure may lead to buckling of the actuator, resulting in bending of the robot body. This can cause the robot to turn. The maximum operational pressure of the pneumatic actuator is therefore set to 25 kPa.

The autonomous robot is designed to achieve sensing and control solely from the action of the control modules. The behavior of the robot in response to a particular stimulus depends both on the types of control modules present in the robot and on their location. Multiple types of control modules are developed to provide different moving strategies. They can be easily attached to or removed from the body of a given robot (FIG. 3B, FIG. 26), showing the simplicity of the entire robotic system. It is worth noting that the modularity of the control units enables a robot to achieve different moving strategies in response to a given set of environmental stimuli, without the need of fabricating a new robot. Furthermore, new control modules could be designed, beyond those that we have introduced in this work, which could enable new types of responses or enable responsiveness to additional stimuli. The responsive materials in the control modules sense and actuate when they encounter relevant environmental stimuli. In this way, the control modules that are distributed throughout the robot influence its shape, thereby enabling it to autonomously change its trajectory. For example, one can incorporate a CNT-LCE composite in the control modules, which enables them to activate in the presence of light (via the photothermal effect) or heat.

Figure 23:
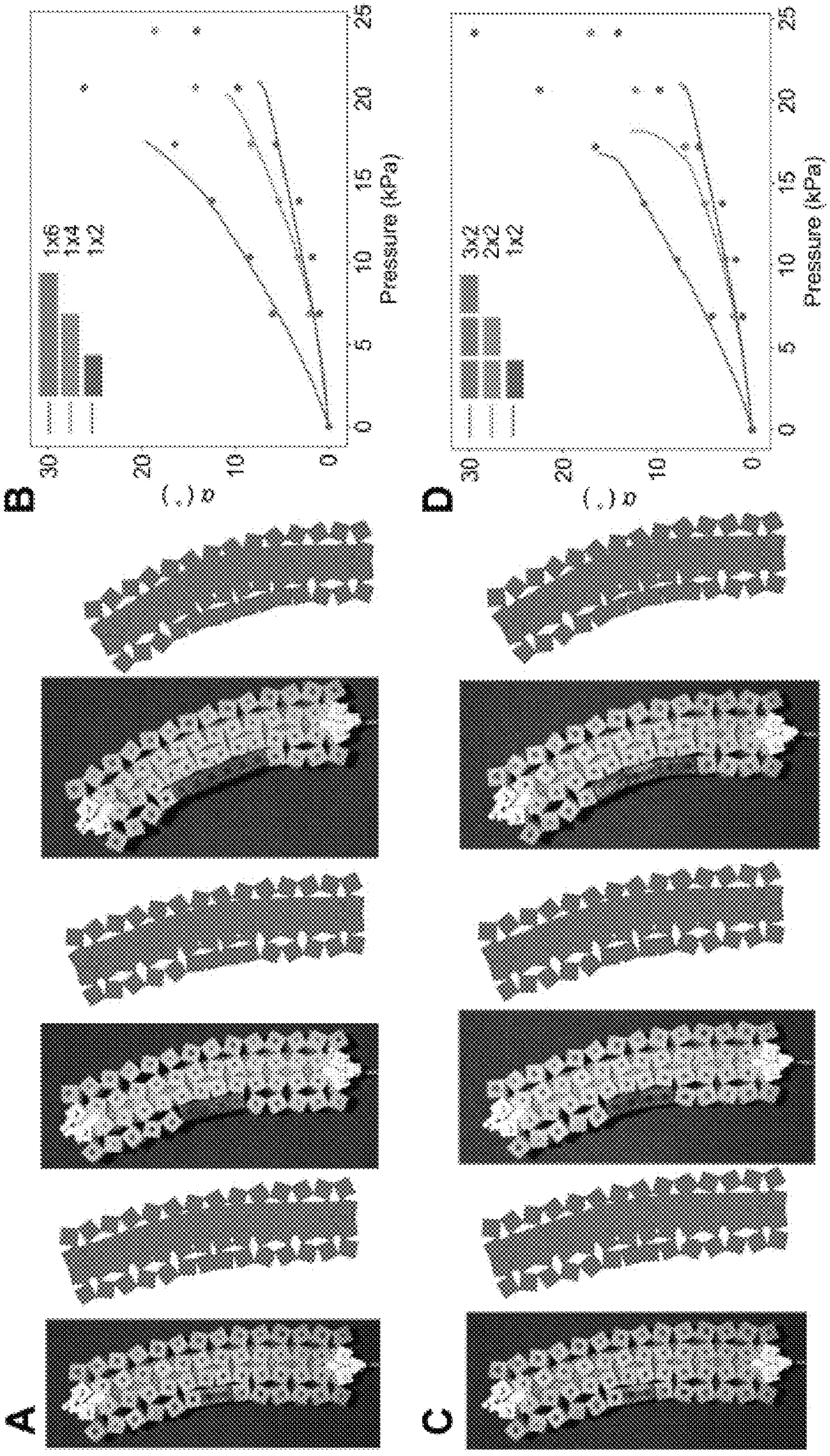
Figure 28:
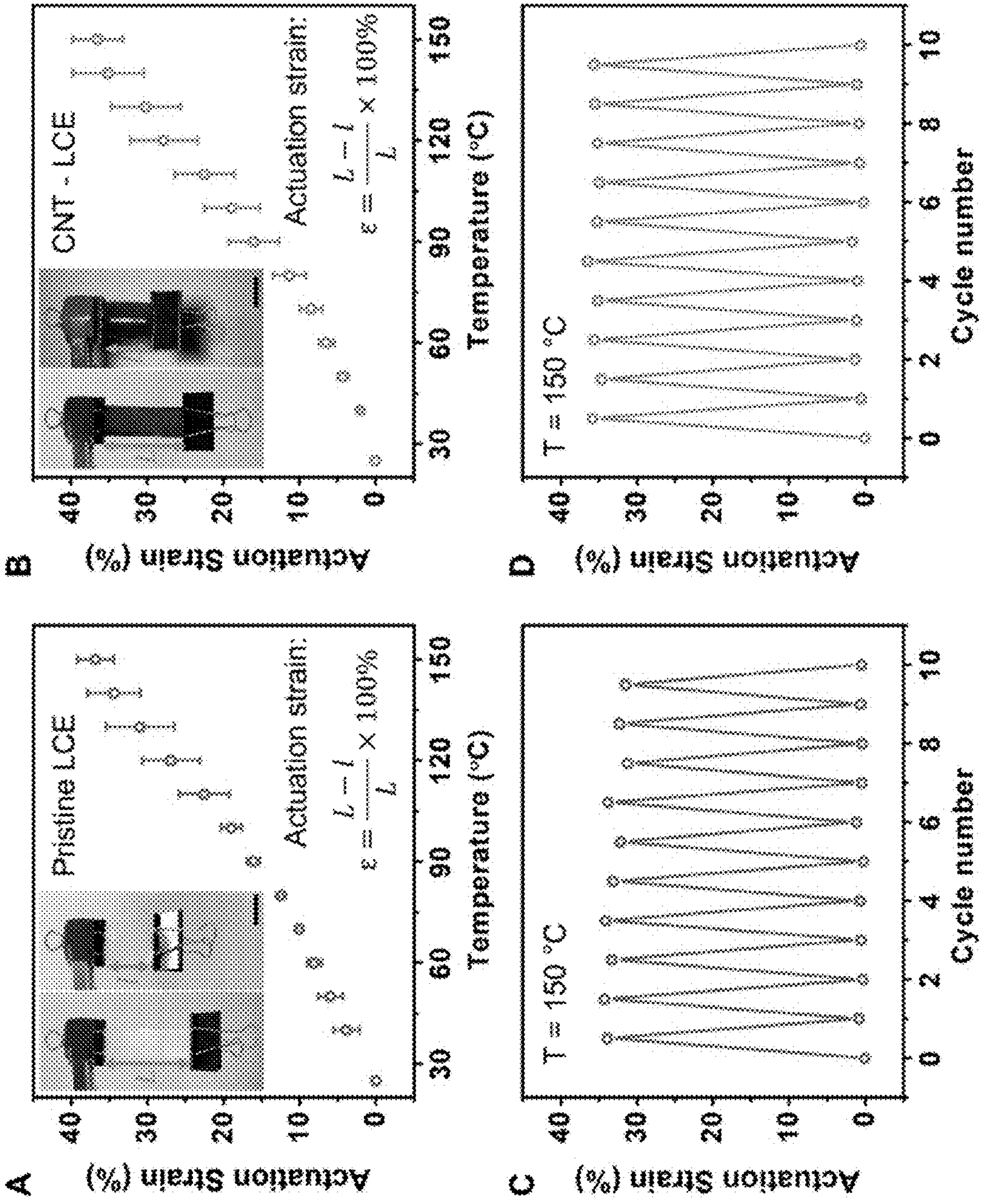
Figure 34:
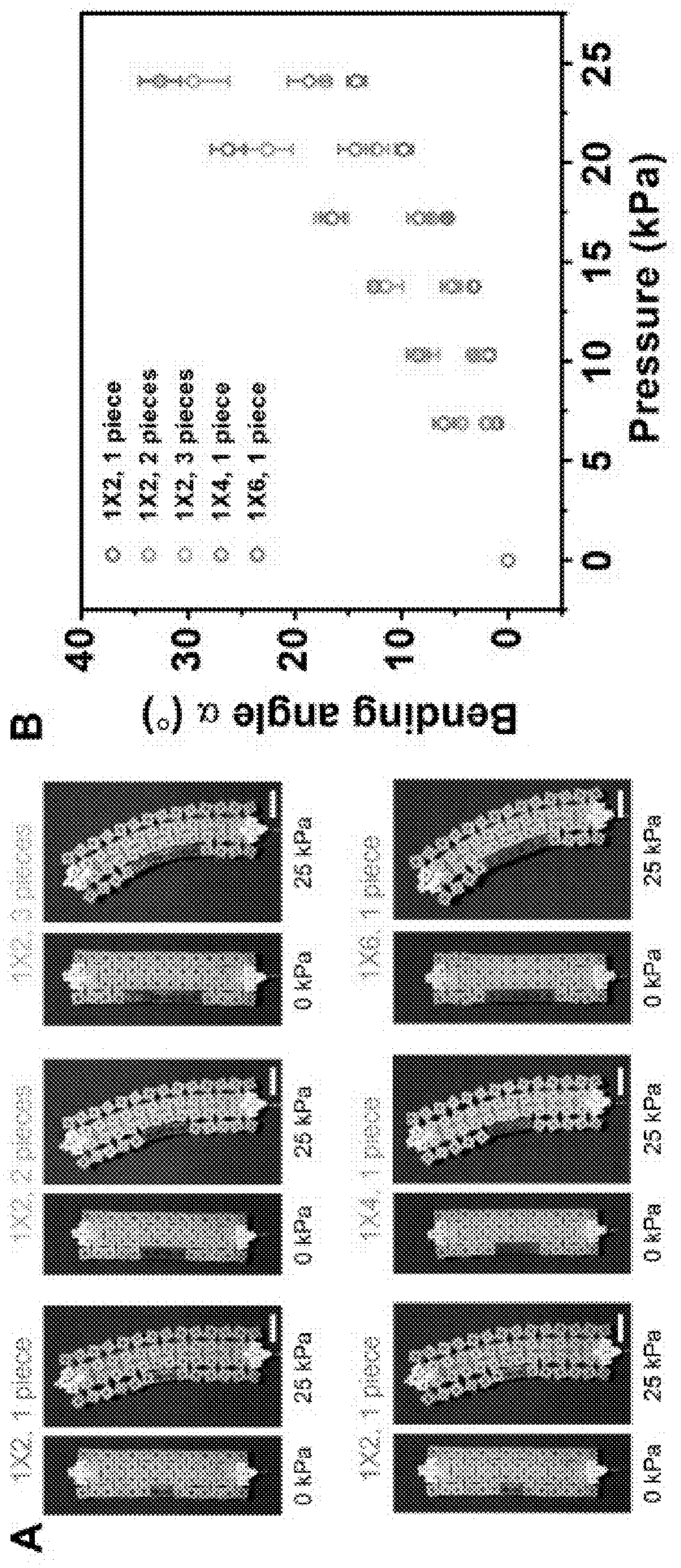
Figure 35:
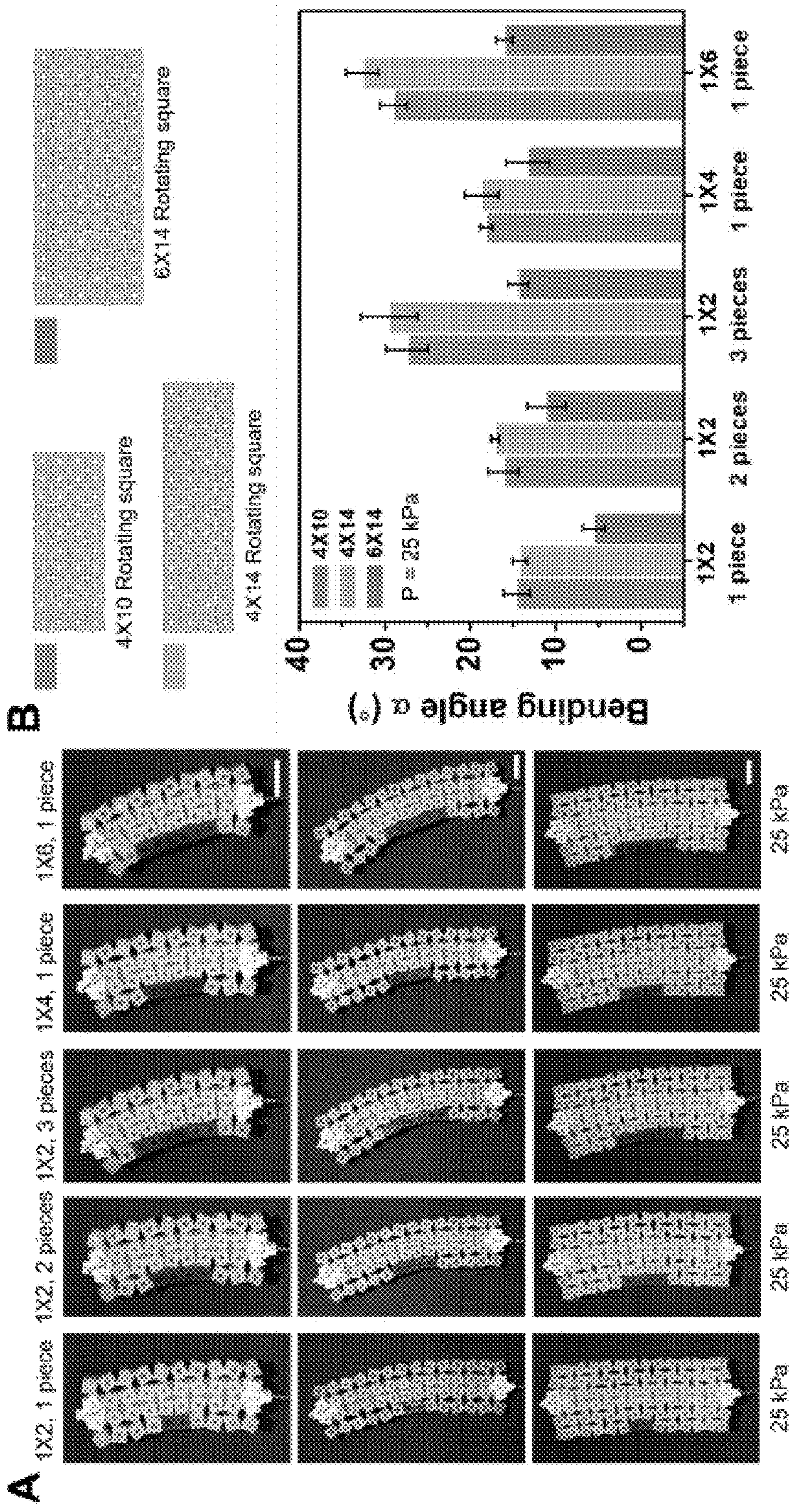
Figure 37:
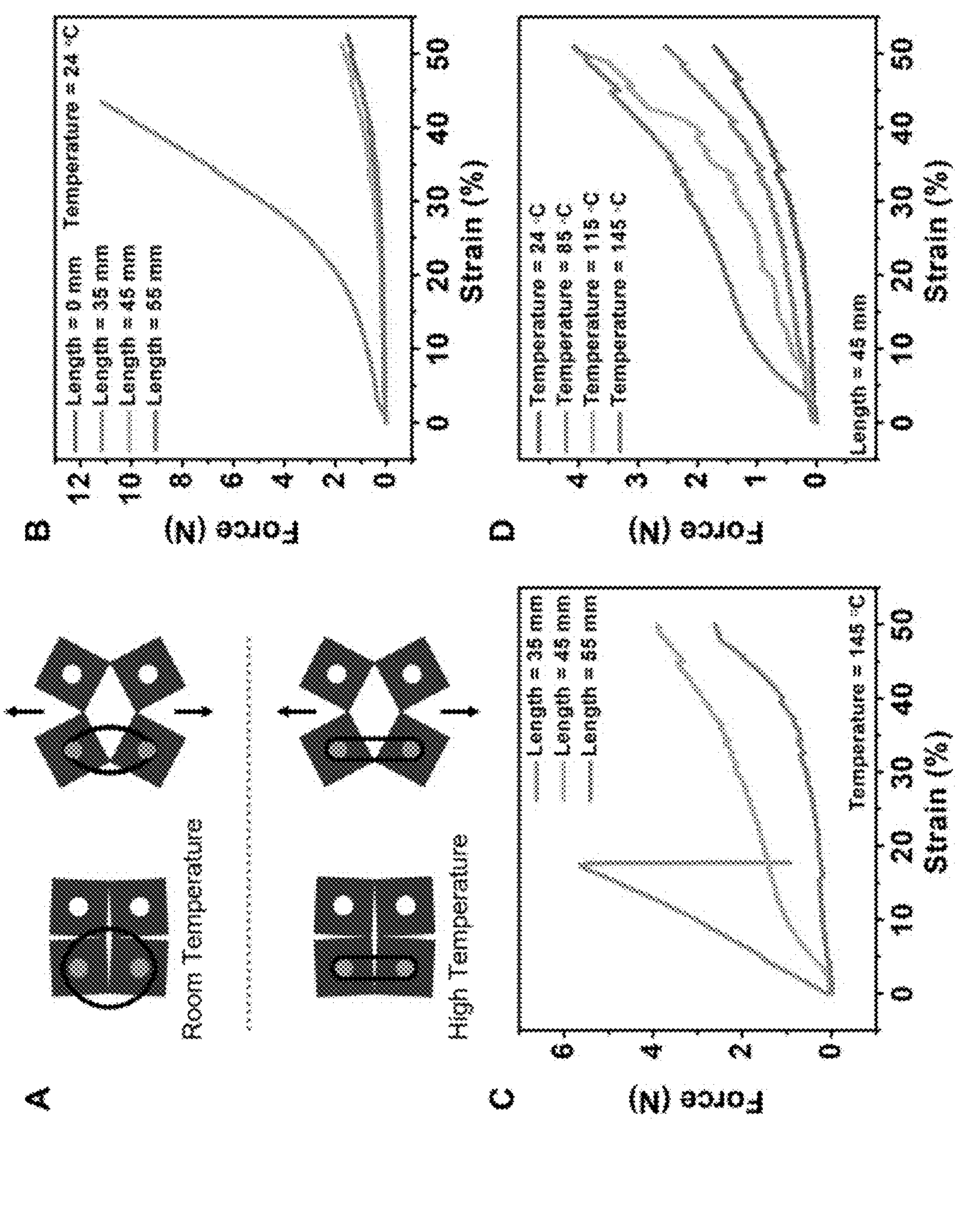

The first example of a control module, shown in FIG. 3C, locally prevents the kirigami from opening if light or heat is applied. This is enabled by a strip of CNT-LCE in the control module, which contracts if heat or light is present above a given threshold (FIGS. 27-13, and 29-15). More detailed characterization of the CNT-LCE strips (including the response time, reversibility, and the dependence of these on the intensity of the input) are provided in FIGS. 28, and 31-18. When the pneumatic actuator inflates, the local inhibition produced by the activated control module causes the robot to bend. In order to design control modules that are most effective at manipulating the bending angle of the robot, we experimentally and numerically characterized how different mechanical constraints on the rotation of the kirigami squares affects the bending angle (FIG. 34-21). The experimental results show that a larger bending angle can be achieved when more squares are constrained (FIG. 34). This agrees well with the discrete model and FEA (FIG. 23). We note also that the bending angle in response to mechanical constraints is dependent on the size of the kirigami layer (FIG. 35). A size of 4×14 squares was selected, since it provides a reasonably large platform for placement of control modules while still bending well in response to mechanical constraints (FIG. 35). As shown in FIG. 3C, if the light and heat in the environment are minimal, the CNT-LCE does not contract (the control module is not active), allowing the kirigami squares to rotate freely everywhere. This leads to uniform extension of the robot body as the pneumatic actuator inflates (no bending). If the temperature is elevated, the CNT-LCE strip contracts, causing the control module to locally inhibit the motion of the squares, producing bending when the robot is actuated. To quantify this effect, we measure the bending angle $\alpha$ as a function of temperature (FIG. 3C). At a given pressure, the bending angle of the robot is larger when the temperature is higher, because the LCE actuates to a larger strain (FIG. 28). The length of the CNT-LCE strip is a critical design parameter (FIG. 37). If the length of the strip is too small (35 mm), the motion of the kirigami squares is locally inhibited even without the presence of stimuli, causing the robot to steer when undesired. Similarly, if the length of the strip is too long (55 mm), the CNT-LCE cannot sufficiently inhibit the motion of the kirigami squares even when the temperature is high. FIG. 37 shows this effect experimentally. As a result of this data, we chose the length of the CNT-LCE strip to be 45 mm. In addition, the bending angle of the robot was measured during repeated inflation/deflation cycles (FIG. 38), showing no obvious degradation of the control module.

Figure 39:
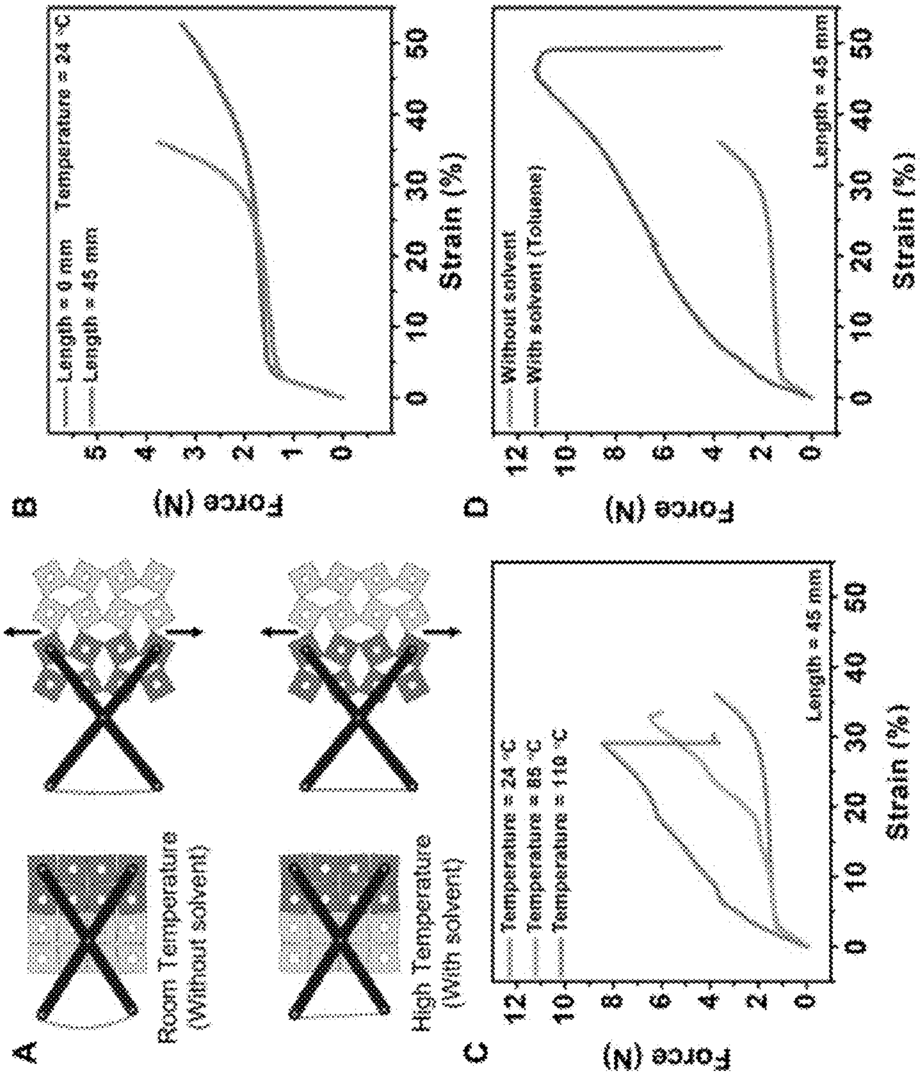

By simply changing the type of control module, the robot can behave entirely differently in response to the same environmental stimulus. For example, FIG. 3D shows a control module that causes the robot to bend in the opposite direction than the previous example. This occurs because the control module includes a lever that constrains the rotation of squares on the opposite side of the robot from where the stimulus occurs (FIG. 39). The relationship between the bending angle $\alpha$ and pressure are plotted in FIG. 3D. In addition to heat, the LCE can contract when exposed to other stimuli, such as the solvent toluene, due to a nematic-isotropic phase transition [57, 58, 59], resulting in bending of the robot when pneumatically actuated (FIG. 3D).

A third type of control module is shown in FIGS. 3E and 3F. Here, two CNT-LCE strips are used in the module and distributed to each side. If the control module is illuminated more on one side than the other, the CNT-LCE strip on that side contracts more than the strip on the other side, inhibiting the motion of the squares on the side where the stimulus is strongest. As a result, the robot bends toward the light source (FIG. 3E). The control module generates a larger bending angle when the temperature difference between the two CNT-LCE strips is larger. If the light is directly in front of the robot (FIG. 3F), the two CNT-LCE strips contract equally, so the robot does not bend. The extension ratio ($\epsilon$) of the robot is measured and shown in FIG. 3F.

Autonomous Changes to Trajectory in Response to Environmental Inputs

Feet are added to the bottom of the robot to translate the cyclic inflation and deflation of the pneumatic actuator into locomotion via anisotropic friction between the robot and the ground. As shown in FIG. 17, when the pneumatic actuator is pressurized, the rear feet act as stationary points and the front of the robot moves forward. When the pneumatic actuator deflates, the front feet are stationary, pulling the entire body forward. Bending and extension of the robot body thereby resolve as a trajectory.

Figures 4A, 4B, 4C:
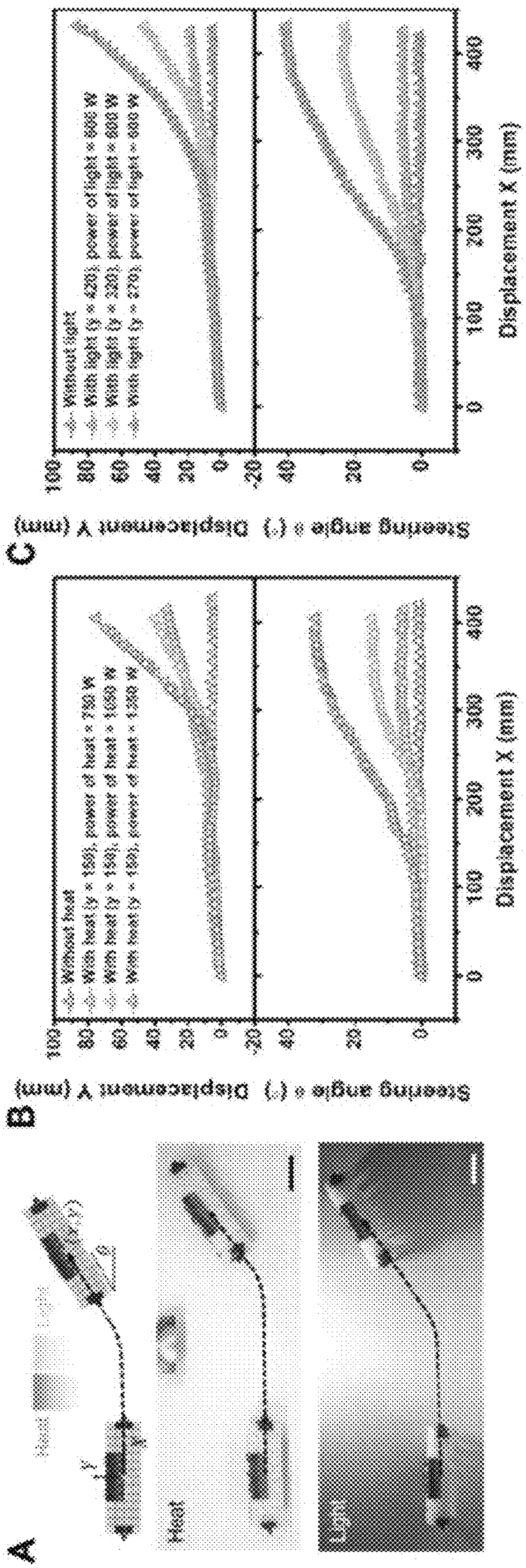

In FIG. 4, we show the effect of the control modules of FIG. 3 on the trajectory of the robot. First, we demonstrate how the robot can autonomously steer its trajectory closer to light or heat (FIG. 4A) using the control module of FIG. 3C. When no appreciable heat or light is present in the local environment, the robot walks straight forward. However, if the control module receives a large flux of heat or light, the CNT-LCE strip contracts, inhibiting the squares in contact with the module from opening when the pneumatic actuator inflates. The rest of the robot body can still expand, however, inducing bending. The trajectory of the robot therefore bends toward the stimulus (FIG. 4A). The trajectory of the robot is shown in FIG. 4B-C as a function of the power of the heat source (FIG. 4B) and as a function of the distance between the robot and the light source (FIG. 4C), respectively. Since the CNT-LCE contracts more at higher temperatures, the bending angle of the robot is larger when the power is higher or the distance is smaller. As shown in FIG. 40, the robot follows very similar trajectories when the scenario is rerun with the same light conditions, showing good repeatability.

Figures 4G, 4H:
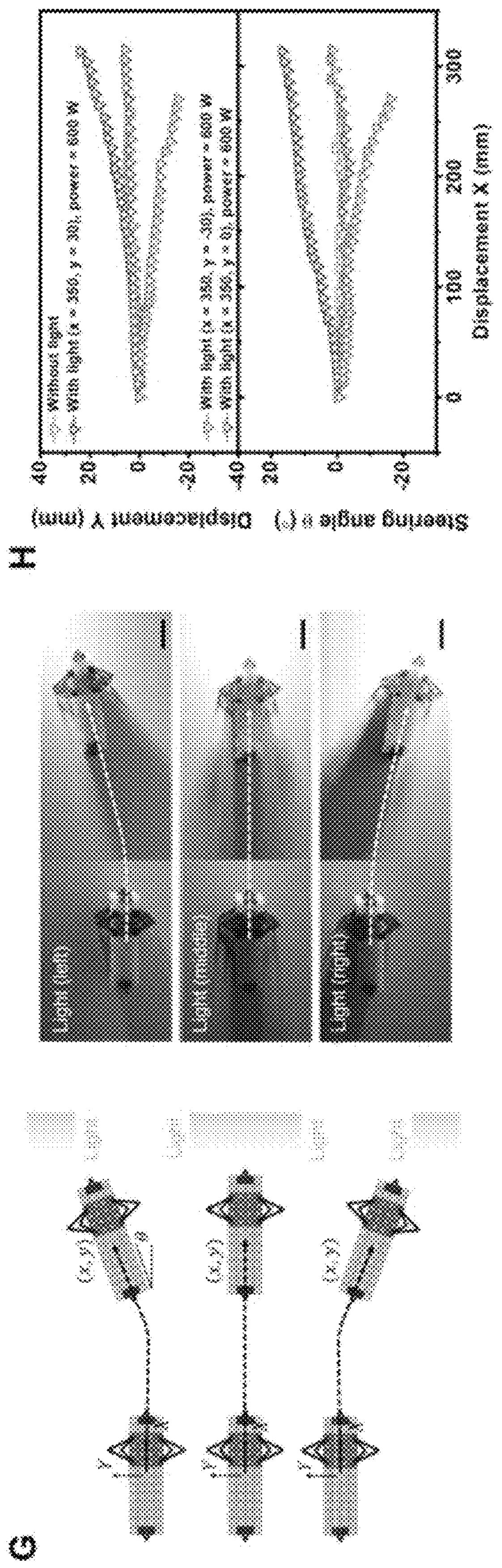
Figure 41:
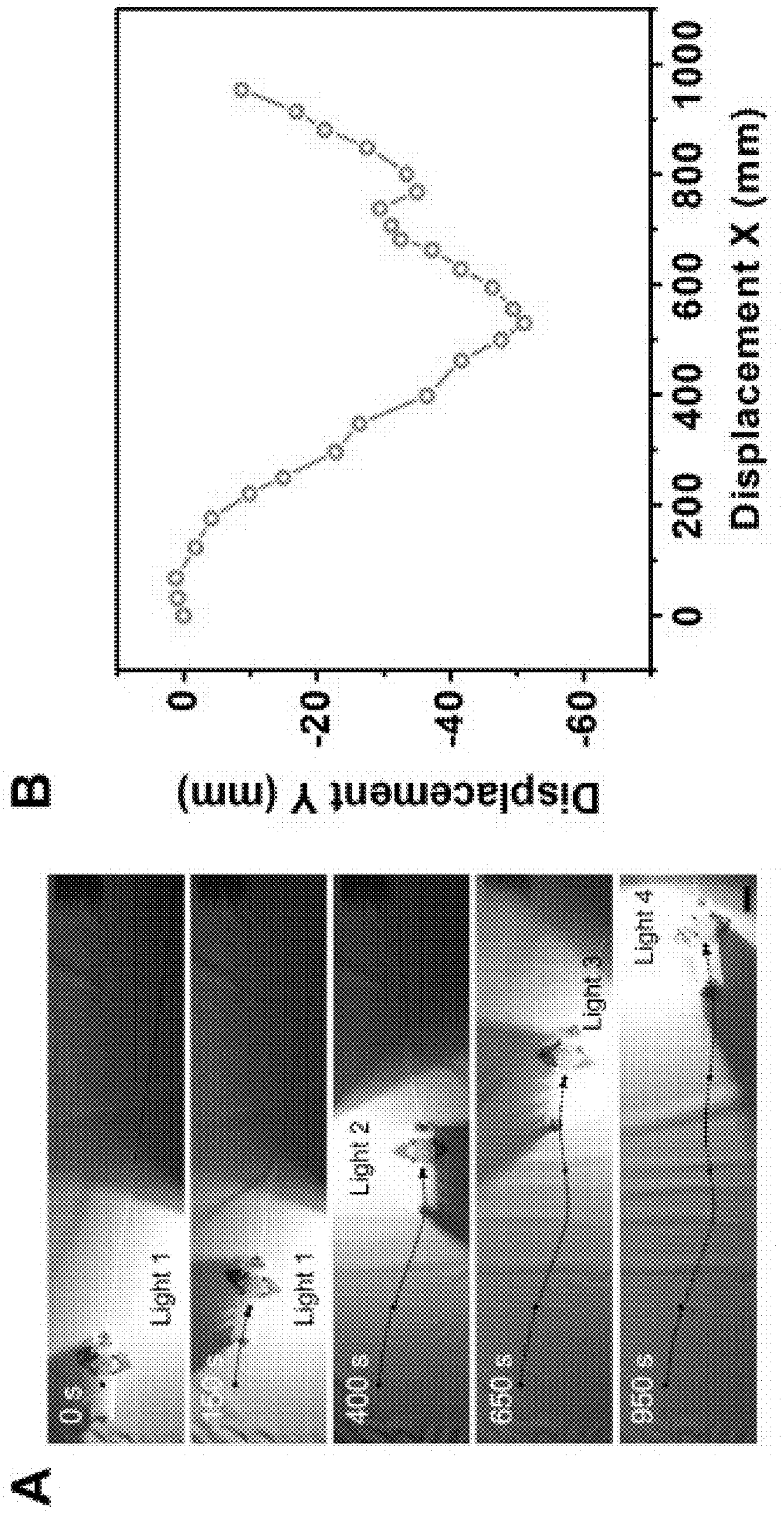

As in FIG. 3, simply by changing the type of control module, we can cause the trajectory to bend away from the stimulus. FIG. 4D-F show trajectories of the robot that occur when the control module of FIG. 3D is used instead of the module of FIG. 3C. This module inhibits the rotation of the squares on the side of the robot that is opposite to the stimuli. This causes the robot to autonomously steer its path away from stimuli such as heat or toluene (FIG. 4D). These trajectory changes are quantified in FIG. 4E-F. The third type of control module, introduced in FIG. 3E-F, allows the robot to steer itself directly toward a stimulus, as demonstrated in FIG. 4G-H. In this example, we incorporate a CNT-LCE composite in the control module, enabling the robot to steer directly toward light. This module is symmetric about the centerline of the robot. If more light is sensed on one side, the CNT-LCE on that side will contract more than the CNT-LCE on the other side, causing the robot to steer more toward the stimulus. However, once the light is directly in front of the robot, both CNT-LCE strips contract equally, causing the robot to continue walking straight (FIG. 4G-H). Note, this same module also enables steering in dynamic environments, e.g., in which the intensity or location of the light sources is changing (FIG. 41).

Figure 42:
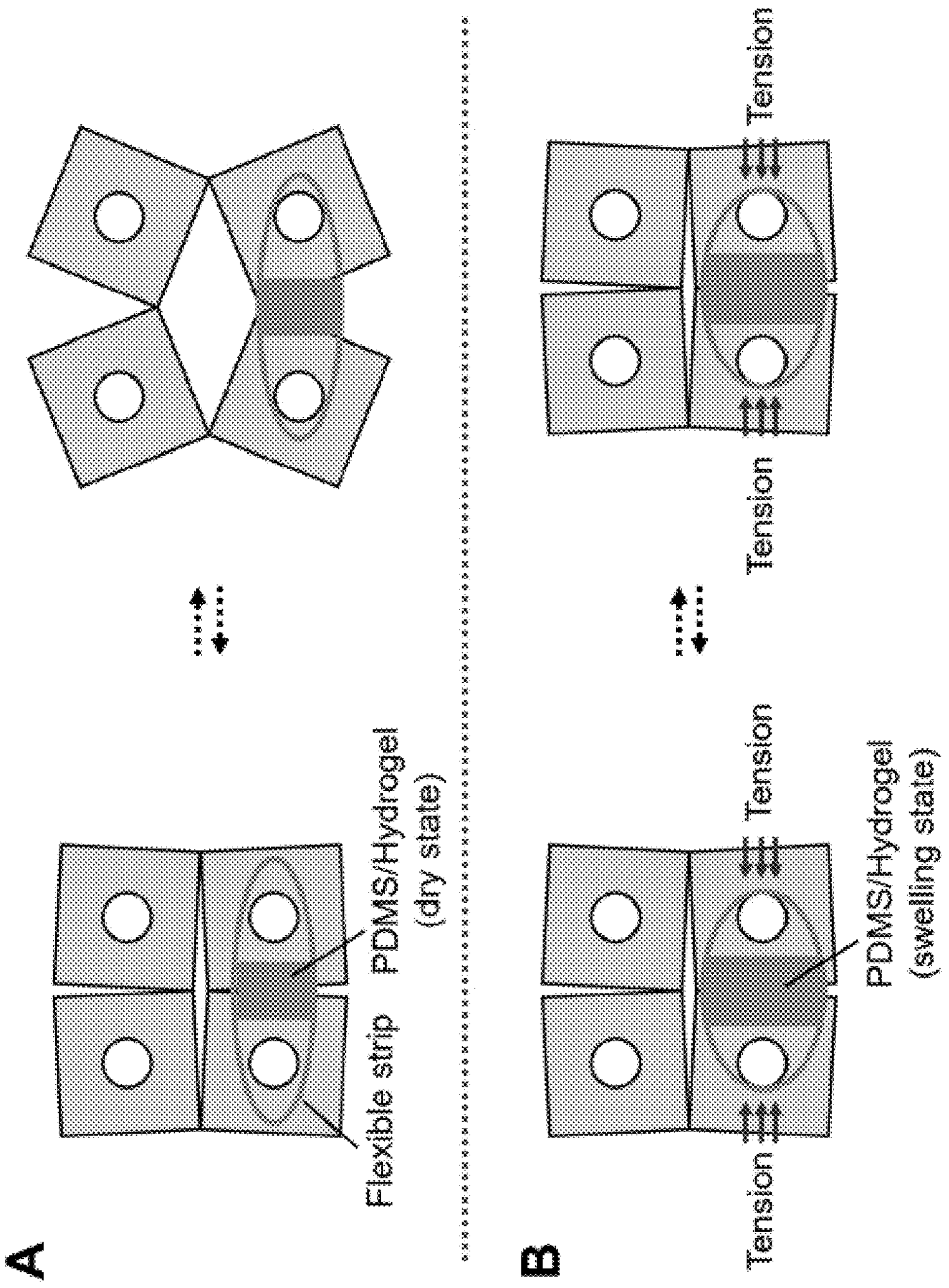
Figure 43:
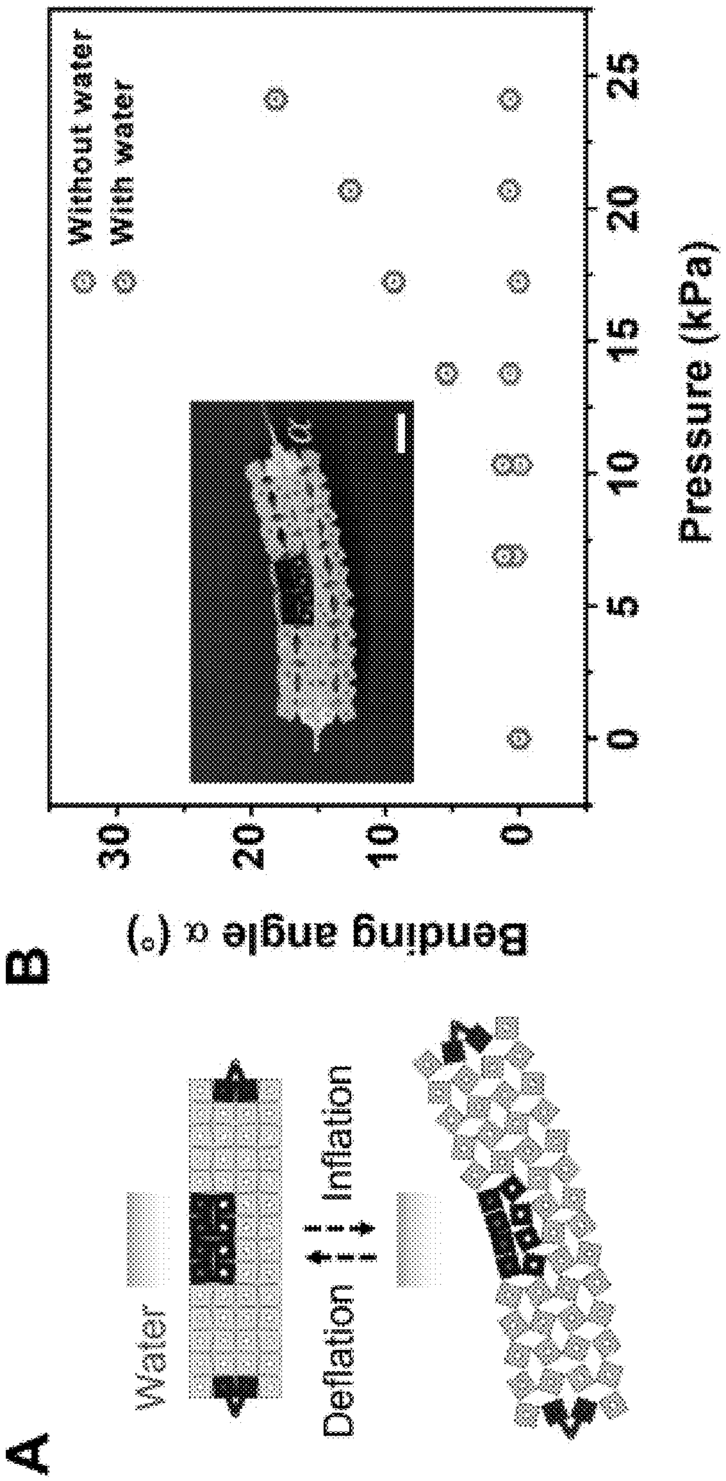
Figure 44:
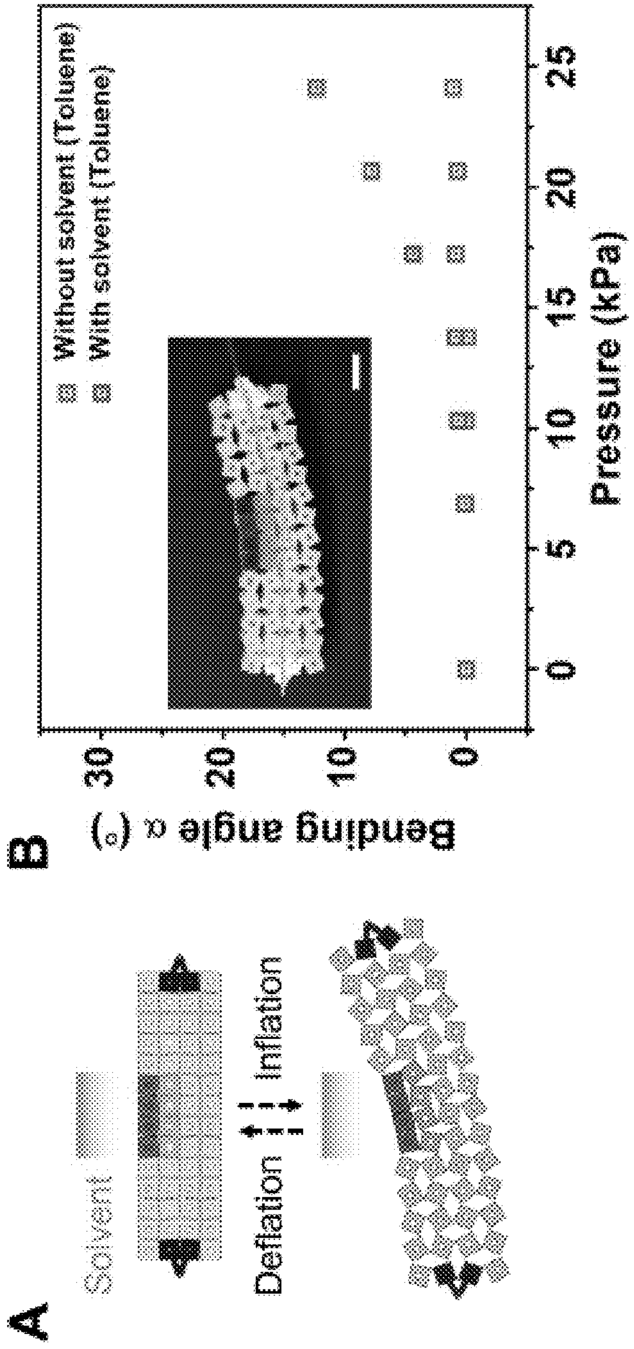

Finally, we note that all of the control modules above have made use of LCEs, which can contract due to a nematic-isotropic phase transition when the environmental input changes. However, in principle, the LCEs in the control modules can be replaced with other responsive materials, such as hydrogels and PDMS, enabling analogous robot responses in the presence of water or solvents, respectively (FIGS. 42-44). In this work, as a simple proof of concept, we made control modules with hydrogels and silicones instead of LCEs. These control modules were submerged in water (hydrogels) or non-polar solvents (silicones) for two hours and 15 minutes, respectively, and then reattached to the robot body. As shown in FIG. 42, the flexible strip generates tension due to the swelling of the materials, which prevents the opening of the kirigami. As a result, the kirigami bends when the actuator is inflated (FIG. 43-44). We demonstrate this behavior in FIGS. 45-46. Given the large number of stimuli-responsive materials that have been developed, the control modules could respond to a large variety of other stimuli, including magnetic fields [22] and pH [60]. It is worth noting that the robot exhibits relatively slow locomotion speed (1 mm/s). This rate was chosen to accommodate the slow response time of the actuating materials that regulate the control modules. For example, at the Mm to cm length scales of this design, the CNT-LCE composites actuate in response to light on the order of 100 s. Hence, at these length scales, the robot should move at a rate such that its immediate environment changes at comparable time scales. Whether or not this time scale is "fast enough" or "slow enough" depends on the application and the intrinsic time scale of the environment. The response time can be changed by patterning the responsive materials, or changing their length scale, potentially down to ms time scales [51]. However, the response time is also coupled with the mechanical properties of the responsive materials. Reducing the length scale of the responsive materials may reduce the force that they can exert on the kirigami. This may, in turn, require that the compliance of the kirigami be structurally increased (e.g., via thinning of the hinges or of the kirigami itself) to maintain mechanical compatibility.

Embodying Multi-Stimuli-Responsive Logic Via Control Modules

As shown above, the control modules are designed to produce mechanical constraints within the robot body, altering how it deforms and thereby its trajectory. The mutual interactions produced by multiple control modules throughout the body can be very complex. However, these interactions also offer a strategy for implementing more nuanced control objectives, despite the lack of electronics in these robots. The competing actions of multiple control units can be viewed as a computational event that is distributed throughout the robot body.

To demonstrate this behavior more concretely, we consider a simplified example in which control modules are only placed along the robot's right or left side (near the center) and only heat or light are used as inputs. Since heat or light can be applied to either side, there are four total environmental inputs: heat applied to the left side ("input A"), light applied to the left side ("input B"), heat applied to the right side ("input C"), and light applied to the right side ("input D"). Boolean values of "1" or "0" for a given input indicate that the input is, or is not, present, respectively. We also define an "output" value, for which "0" indicates that the robot is moving forward along a straight trajectory, while output values of "1" and "−1" indicate that the robot is steering left or right, respectively.

With four boolean inputs there are a total of 16 possible combinations of input values. The output associated with each combination of inputs is determined by the choice of control modules placed at the input sites. The aggregate effect of all control modules determines the map from the inputs to the outputs. These relationships can be summarized in "truth tables", as shown, for example, in FIGS. 47A-47E.

Figure 49:
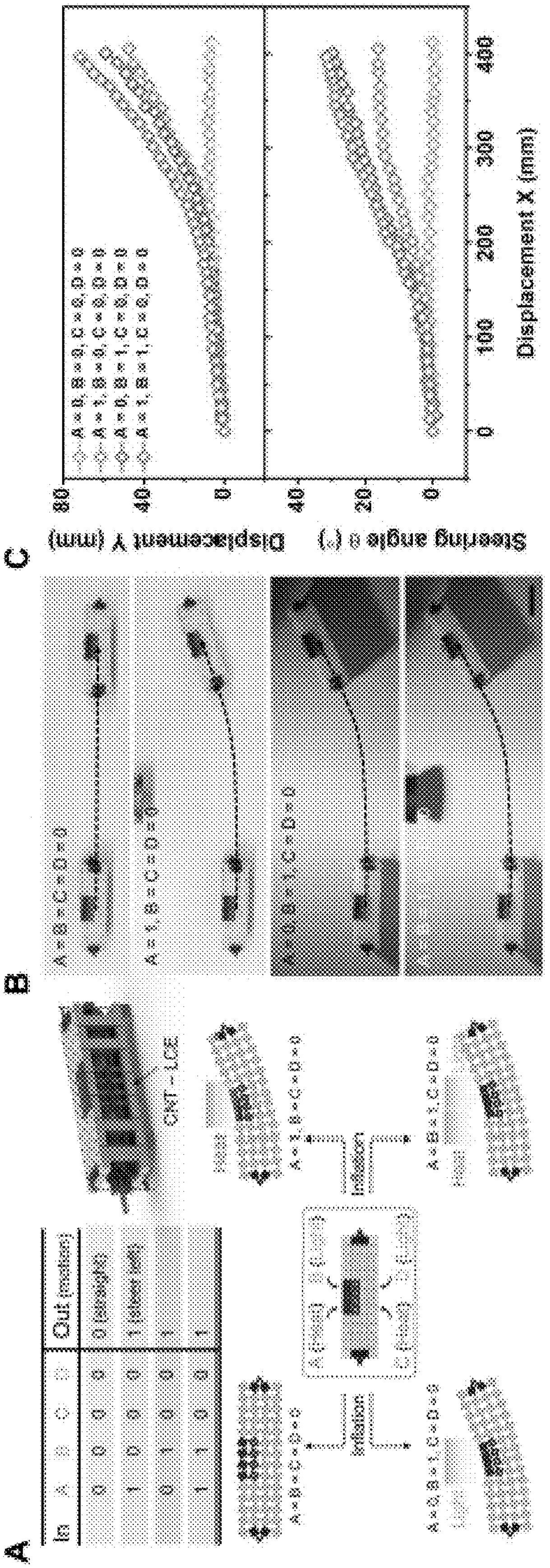

As a first simple example, we configure the robot using only one control module (the module of FIG. 3C), placed on the left side of the robot. The complete truth table for this configuration (for all 16 combinations of inputs) is shown in FIG. 47A. Heat and/or light can be sensed on the left side of the robot (e.g., inputs A and B are allowed to be either 0 or 1). However, since there is no control module on the right side of the robot, changing the values for inputs C and D has no effect on the robot. Hence, we can use an abbreviated truth table to fully define the response of the robot (see FIG. 48). When the robot is exposed to heat or light from the left side (i.e., input A and/or input B are non-zero), the robot bends due to the contraction of the CNT-LCEs, causing it to steer left (FIG. 49).

Figure 50:
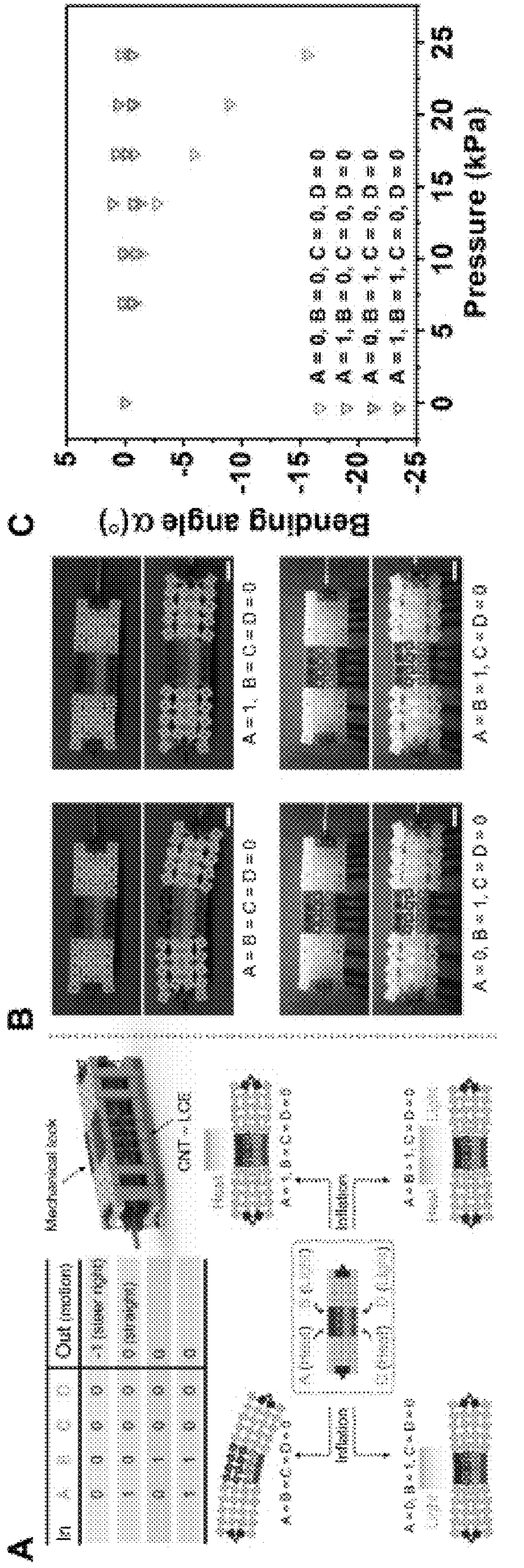

Next, we add a second control module to the robot, as shown in FIG. 5A. The new module is a passive control module that acts like a mechanical lock on the right side of the robot. It does not sense or respond to stimuli, but instead causes the robot to bend right by default when the pneumatic actuator inflates, even without environmental stimuli (i.e., the output is −1 even when the inputs A=B=C=D=0). Consequently, the robot steers right when heat or light are below the threshold. The complete truth table for all possible inputs is shown in FIG. 47B. However, as in the previous example, since the inputs on the right side are not sensed, the values of input C and D have no effect. The abbreviated truth table is shown in FIGS. 5A and 50. If the control module on the left side is exposed to heat and/or light (i.e., input A and/or input B are non-zero) the squares across from the lock are also inhibited from opening when the pneumatic actuator inflates. In this case, the mechanical constraints on the two sides cancel one another, causing the robot to remain straight when the pneumatic actuator is pressurized, giving a straight trajectory (FIG. 5B-C).

Figures 5D, 5E, 5F:
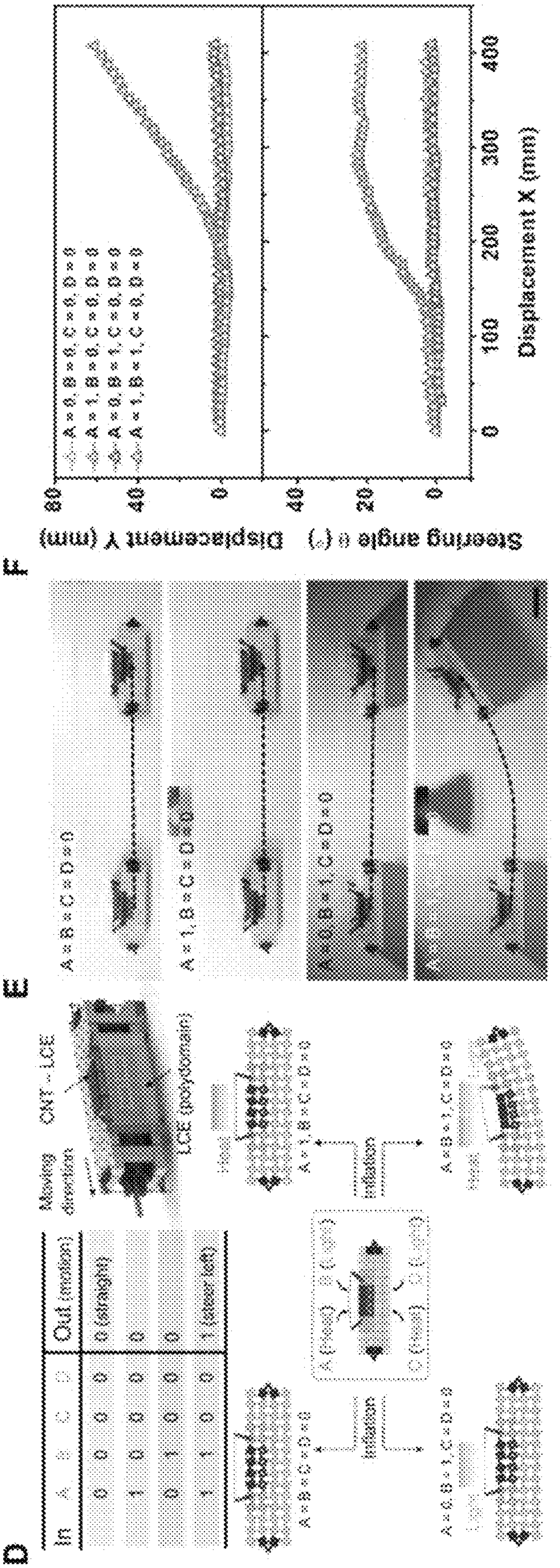
Figure 51:
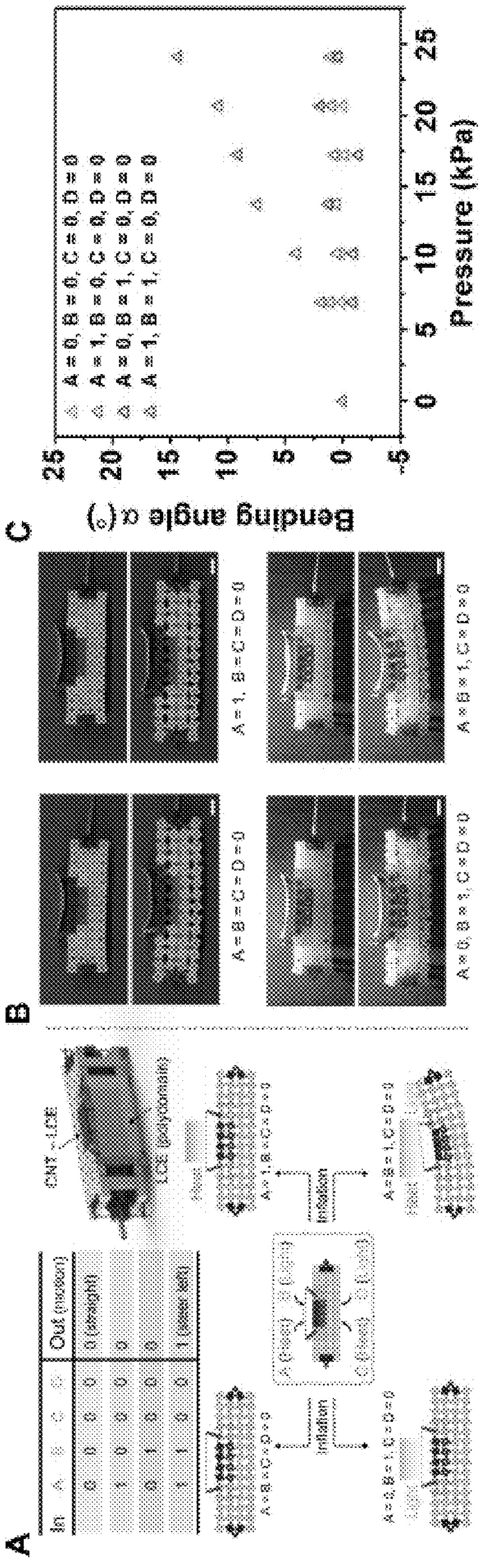

More complex examples of mechanical logic can be achieved with other combinations of control modules. For example, the decision for the robot to turn can obey AND logic by adding a mask module (an opaque polydomain LCE) exterior to the CNT-LCE control module used in the previous examples, as shown in FIGS. 5D, 47C and 51. When the temperature is greater than 150° C., the mask layer (opaque polydomain LCE) becomes transparent (FIG. 52), as demonstrated previously [61]. If only heat is applied to the left side of the robot (i.e., inputs A=1, B=0), the mask layer becomes transparent, but also blocks enough of the heat that the CNT-LCE module inside does not activate. Consequently, the robot walks forward along a straight trajectory (FIG. 5E-F). The same thing occurs if only light is applied (A=0, B=1), since the mask layer remains opaque. Only when heat and light are both present on the left side (A=B=1) will the robot steer left (see FIG. 5D-F), since the heat causes the mask module to become transparent, allowing the light to reach and activate the inner control module. As with all active materials, there is a particular timescale and intensity range that defines their operational relevance. In this case, we have to tune the distance between the robot and light source to prevent "overheating" from occurring too rapidly. Note, in this example, inputs C and D have no effect, since no control modules are present on the right side of the robot. However, if the two control units on the left were duplicated on the right side, the same AND logic with respect to inputs C and D would govern whether the robot steers right (and in the case in which all inputs A=B=C=D=1, the two sides would cancel, allowing the robot to proceed straight ahead). Moreover, the AND response of FIG. 5D-F can be made into a NAND response by adding a mechanical lock to the right side (as demonstrated in FIGS. 47D and 53-54). In this case, the robot will only move straight ahead if both heat and light are present on the left side, otherwise it will turn right.

Figures 5G, 5H, 5I:
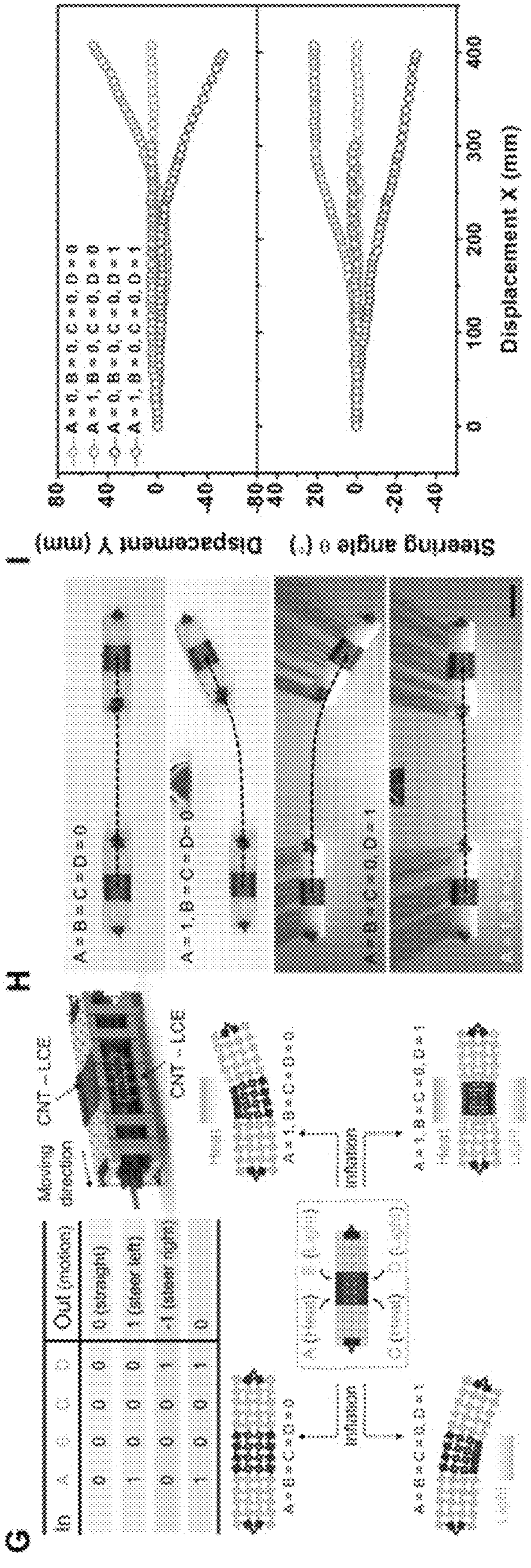
Figure 55:
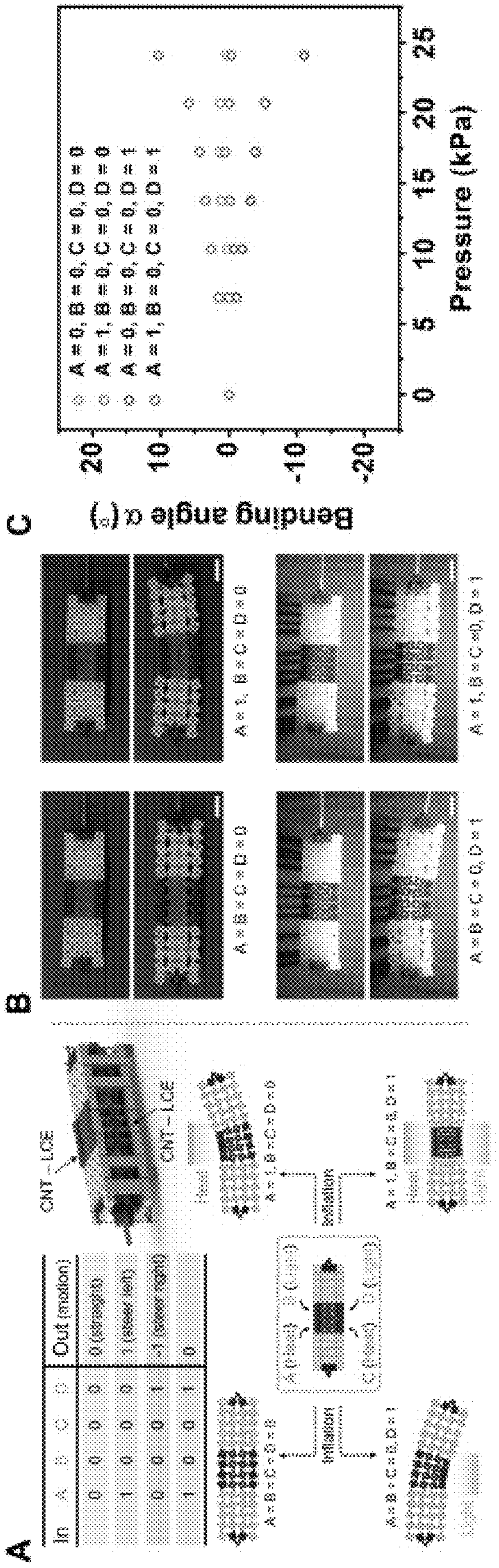

As a final example, we consider using two of the CNT-LCE control modules of FIG. 3C, one on each side of the robot (FIGS. 5G and 55). The robot bends only when exactly one side of the robot is subjected to light or heat (for example, A=1, B=C=D=0 or A=B=C=0, D=1), causing the robot to steer left or right (FIG. 5H-I). If the control modules on both sides are actuated (e.g., A=1, B=C=0, D=1), the two effects cancel, and the robot continues to move straight forward. The complete truth table for this system is shown in FIG. 47E.

We again note that all of the different behaviors described above were obtained using the same robot. Only the type and locations of the modular control units were varied.

Figures 6A, 6B, 6C, 6D:
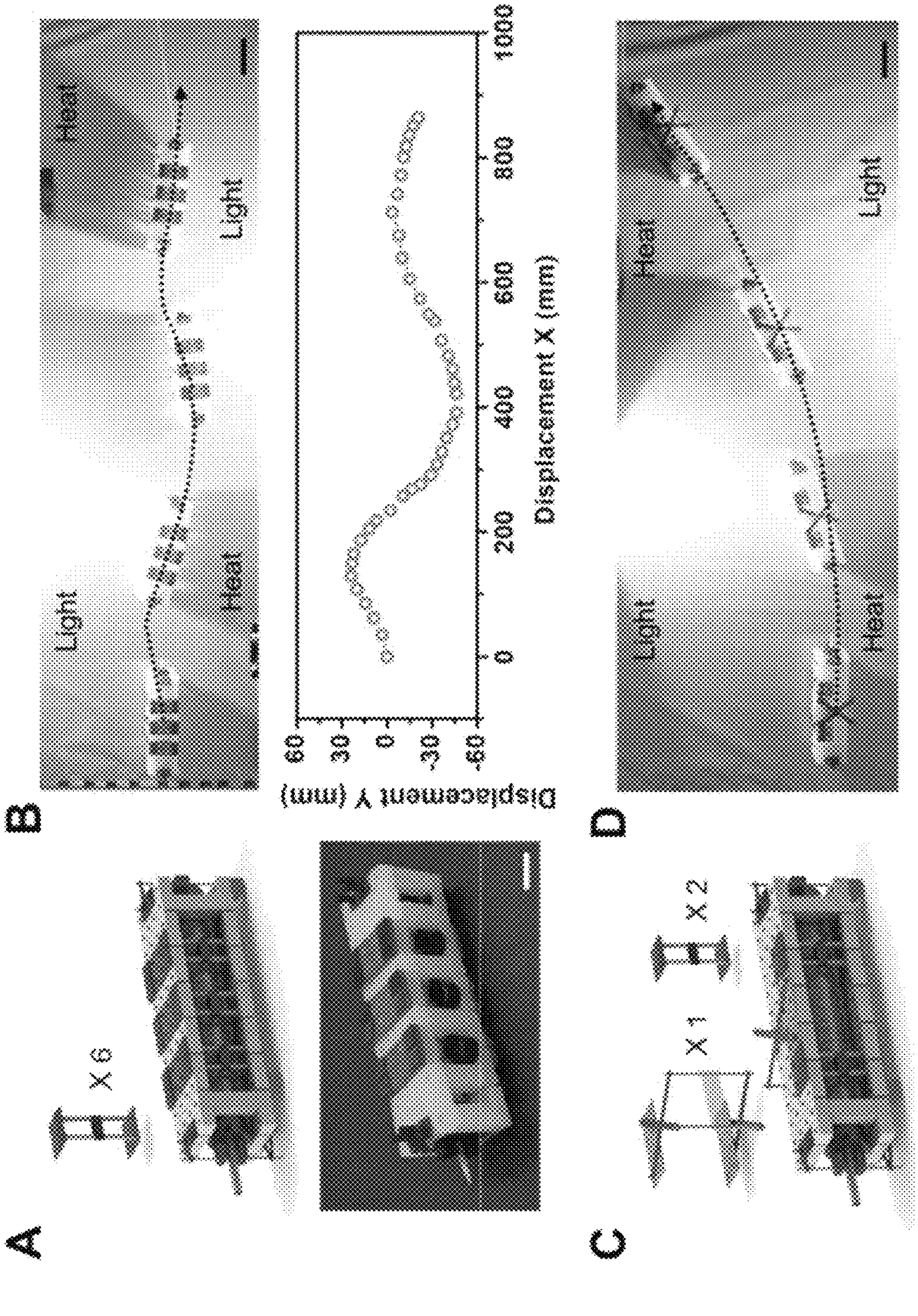

Examples of autonomous trajectory changes in robots integrated with multiple control modules Finally, we demonstrate autonomous trajectory changes of the electronics-free robot as it passes through a more complex environment. Light and heat sources are placed along both sides of the robot's path. In the first example, we evenly distribute control modules (with CNT-LCE strips) throughout the soft body of the robot, as shown in FIG. 6A. This specific design causes the robot to be "attracted" by the heat and light sources. This results in a "zigzag" trajectory, as shown in FIG. 6B. A different moving strategy can be achieved by rearranging the control modules, as shown in FIG. 6C. In this case, the control modules are only placed along one side of the robot, including modules that bend the trajectory toward stimuli (i.e., FIG. 3C) and a module that bends the trajectory away from stimuli (i.e., FIG. 3D). This design causes the robot to steer left whenever heat or light are encountered (FIG. 6D). Next, we use three different modules to give the robot an "AND" response, as shown in FIG. 6E. These include control modules that bend the trajectory toward stimuli (i.e., FIG. 3C), a mask module (i.e., the polydomain LCE of FIG. 5D), and the module that causes the robot to steer directly toward stimuli (i.e., FIG. 3E-F). When this configuration is used, the robot first moves toward the light, causing the body to steer left. Then the robot moves straight forward, due to the effects of the mask module. As the robot begins to sense the light source to the right, the trajectory begins to turn right (see FIG. 6F). The autonomous motion of the robot can be reprogrammed simply by changing the distribution and types of control modules in the kirigami robot body.

Figure 7:
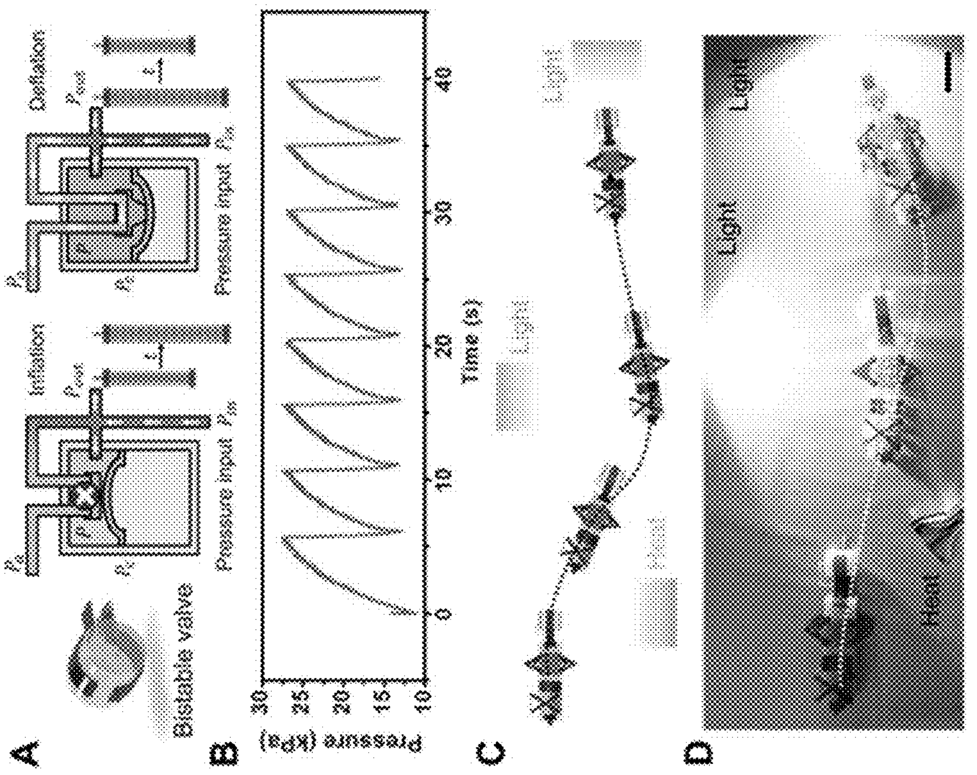
FIGS. 7A-7D illustrate integration of a bistable valve with an autonomous robot.

Finally, we note that while the robot itself does not have onboard electronics, it is tethered to a pneumatic device that is electronically controlled. However, as has been previously demonstrated by others [42], the pneumatic controller can be eliminated by integrating a bistable valve with the robot (FIG. 7). When the membrane of the valve bends upward, it blocks the pneumatic tube inside the top chamber. As a result, the pressurized air flows into the actuator, inflating the pneumatic actuator. Once the pressure of the top chamber reaches a critical pressure Pc, the membrane snaps, the air tube in the top chamber is no longer blocked, and the pressurized air can flow out to the atmosphere, deflating the pneumatic actuator (FIG. 7A). This bistable valve thereby converts a constant pressure input to a periodically-varying pressure output, pro-viding the necessary sequential inflation-deflation of the pneumatic actuator (FIG. 7B). With the bistable valve and the control modules, this robot can autonomously change its trajectory in a complex manner without any electronics (FIG. 7C, 7D, 56-42).

Discussion

In this work, we have shown how a kirigami-based soft robot can autonomously navigate through an environment using modular control units distributed throughout its body. These control modules can make use of different types of responsive materials, enabling the robot to sense and respond to stimuli such as light, heat, water, and solvents. Different control responses can be imparted to the robot simply by changing the positions and types of control modules. We also showed that simple computational capabilities (e.g., "turn toward heat, but only if light is also present") can be embodied in the robot via the interactions of multiple control units. Finally, by also incorporating a mechanical bistable valve, the robot can autonomously navigate without any electronic components. Previous work has demonstrated the use of a similar bistable valve to autonomously reverse the moving direction of a robot when it walks into a wall [42], a clear example of an autonomous interaction of a robot with its environment. In our work, we develop a collection of modular control units that enable the robot to sense and respond to multiple environmental stimuli (light, heat, water, and solvent). These control modules are interchangeable, providing a wide variety of robot-environment interaction inputs and programmable moving strategies. Our framework opens up a new strategy for working toward full autonomy in soft robotic systems.

The current version of the soft robot is tethered to an external pneumatic source. We note, however, that the robot could be made untethered, following strategies already outlined in the literature, especially since the robot only requires a constant pressure source thanks to the bistable valve. The robot could provide its own pneumatic source via a chemical reaction, such as hydrogen peroxide or by carrying a small compressed gas source [42]. Another current limitation of this robot is its large physical size (the squares in the kirigami are centimeter scale), which is the practical result of our current manufacturing technique. We note, however, that the mechanical response of the kirigami body and the basic control strategy (i.e., using variable mechanical constraints to manipulate that mechanical response) are scale-independent. Hence, similar robots could, in principle, be scaled to smaller length scales using advanced manufacturing methods such as photolithography, two-photon polymerization, etc., which may broaden the application of the proposed control strategy to biomedical engineering and other areas making novel use of small soft robots. Future work can also investigate the use of the proposed control strategy under a broader range of environmental stimuli. Additionally, we note that most of the analysis, modeling, and experimentation assumed that the robot exists in a 2D world (i.e., stimuli are in the same plane as the robot body). However, in principle, there is no such restriction, and 3D effects could certainly be included in the future. For example, FIG. 58 illustrates one mechanism that could translate out-of-plane phenomena into trajectory changes of the robot. Finally, although we only demonstrate control of trajectory in this work, such electronics-free sense-control-act response loops could be readily adopted to change the function, morphology, or other behaviors of robots.

Materials and Methods

Fabrication of the Pneumatic Actuator

The fabrication process of the pneumatic actuator is based on Ref. [62] (see FIG. 59). Briefly, we design a mold using Solidworks and print it using a MakerGear M3 3D printer. The uncured silicone precursor (Ecoflex 30, Smooth-On, Inc.) is poured into the mold and cured for 24 hours. This results in a silicone elastomer tube with a helix concave fiber groove. Then, we wrap a kevlar fiber following the pre-designed helix trace on the tube to constrain the radial expansion of the actuator resulting in axial extension. The two ends of the kevlar fiber are fixed to the silicone using Sil-poxy (Smooth-On, Inc.). Using this approach, the fiber angle can be precisely controlled. The total height of the helix is 120 mm, the pitch is 8 mm, and the diameter is 19 mm. This corresponds to a total length of 1806 mm for the kevlar fiber. After that, the silicone tube (wound with fiber) is reinserted into the mold. Additional uncured precursor is injected into the mold to seal the kevlar fiber. After 24 hours, the silicone tube is taken out and sealed with two caps using Sil-poxy. Finally, a fitting is inserted into the cap, which is connected to the external pneumatic source.

Fabrication of Rotating Kirigami Square Platform

As shown in FIG. 60, the uncured silicone precursor (Dragonskin 10, Smooth-On, Inc.) is poured into the 3D-printed mold. Then, we ensure all excess silicone is removed. After 24 hours, the cured specimens are taken out and prepared for further use.

Assembly of the Electronics-Free Soft Autonomous Robot

Figure 61:
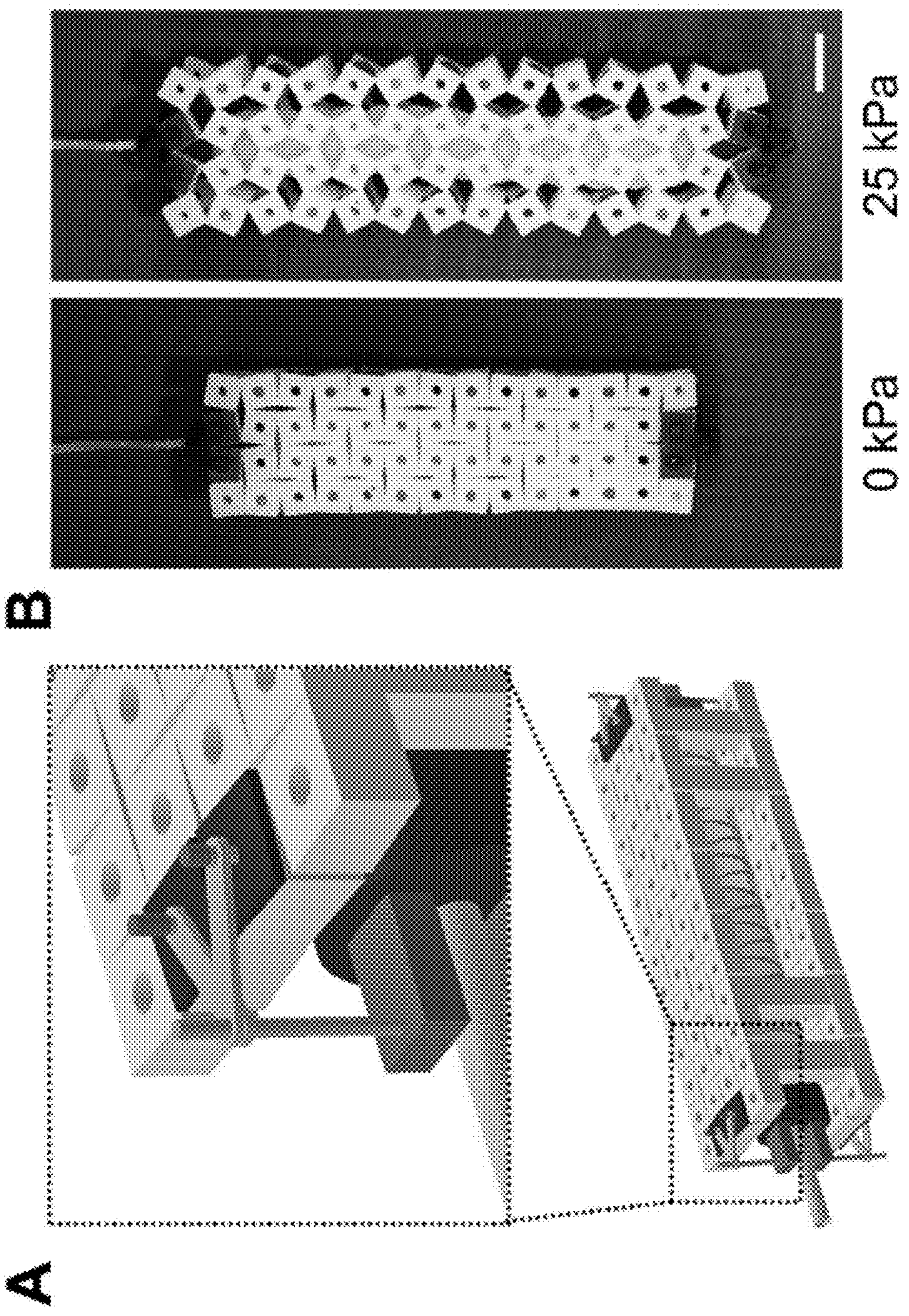

The entire structure of the soft robot is shown in FIG. 61. The pneumatic actuator is sandwiched between two layers of kirigami. The vertical columns (made from silicone) are placed at both sides of the pneumatic actuator to constrain the actuator during extension. For the connection between the kirigami and the pneumatic actuator, 3D printed parts (R11, EnvisionTec) are de-signed and fabricated (FIG. 61). All the squares can freely rotate and open when pressurized air is applied to the pneumatic actuator.

Fabrication of the Control Modules

The control modules include silicones, responsive materials (LCEs, hydrogels, and/or PDMS), rigid rods, and 3D-printed parts. The silicone layer of the kirigami is fabricated by pouring the mixture of silicone precursor and dye (Ecoflex 30, Smooth-On, Inc.) into the mold. The silicone is peeled off from the mold after 24 hours. For the 3D printed part, we use a DLP printer (EnvisionTec) to fabricate the rigid parts. The detailed fabrication and assembly of each control module can be found in FIG. 62-67. The control modules can be repeatedly switched on and off by suitable inputs in the environment, with no discernible change in performance (FIGS. 38 and 40). The practical maximum operational temperature of the control module is set to 150° C. Further increasing the temperature will cause softening of the 3D-printed parts. Other materials can be substituted to increase this operational temperature, if that were necessary for a particular application.

Mechanical Integration of the Control Modules With the Soft Autonomous Robot

Integration of the control modules with the soft robot is shown in FIG. 68. The top and bottom layers of the control module (blue color in FIG. 68) are attached to the kirigami body of the robot. Eight cylindrical pins (diameter=4 mm) are used to connect the control module and kirigami robot. The process can be easily performed in reverse to remove a module.

Fabrication of the Mechanical Bistable Valve

The mechanical bistable valve receives a constant pressure as input and outputs a periodic pressure variation due to an internal instability, as reported previously [43]. We fabricate the bistable valve based on Ref. [42]. We pour the silicone precursor (Dragonskin 10, Smooth-On, Inc.) into a 3D printed mold and cure. Air tubes are glued to the membrane in the middle of the valve using Sil-poxy (Smooth-On, Inc.). The cap of the valve is subsequently glued to the main body of the bistable valve. Finally, we connect the air pathway.

The measurement of the elongation, bending angle, and trajectory of the soft robot The pneumatic actuator of the robot is pressurized using a custom fluid control system to precisely control the pressure (FIG. 24). To measure the elongation e and bending angle $\alpha$ of the robot, we use a digital camera (Canon 80D) to capture images of the robot during its inflation. We characterized the bending angle of the robot at each pressure by analyzing the images, using ImageJ. The results are shown in FIG. 3.

To measure the trajectory of the soft robot, we use a digital camera to record the video. We extract the video frames images from the video after one cycle. We track the center point of the robot to keep track of its location (using ImageJ). The results are shown in FIGS. 4, 5, and 6.

Synthesis of Liquid Crystal Elastomers 1,4-Bis-[4-(3-acryloyloxypropyloxy)benzoyloxy]-2-methylbenzene (RM257) (Wilshire company; 95%), (2-hydroxyethoxy)-2-methylpropiophenone (HHMP; Sigma-Aldrich; 98%), 2,2-(ethylenedioxy) diethanethiol (EDDET; Sigma-Aldrich; 95%), pentaerythritol tetrakis (3-mercaptopropionate) (PETMP; Sigma-Aldrich; 95%), dipropylamine (DPA; Sigma-Aldrich; 98%), and multi-walled carbon nanotubes (MWCNT, Sigma-Aldrich, >98%) are used as received without purification. We use a glass mold and VHB (3M, 4905, 4910) as spacer for controlling the thickness of the LCE sample. We prepare the LCE film following Ref. (63) with a few modifications. 10 g liquid crystal mesogen RM257 and 0.078 g photoinitiator HHMP are added to toluene. The mixture is dissolved in an oven at 85° C. 0.03 g MWCNTs can also be added into the mixture to make the LCEs light-responsive. 1.9017 g chain extender EDDET, 1.52 g crosslinker PETMP, and 0.0324 g catalyst DPA are added to the mixture. The mixture is stirred and degassed and poured into a glass mold (1 mm thickness). After 24 hours of curing, the solvent (toluene) is evaporated from the LCE in an oven set to 85° for 12 hours. This results in a loosely-crosslinked, polydomain LCE thin film. To align and fix the alignment of the liquid crystal mesogen, the loosely-crosslinked LCE is stretched to λ=2 and exposed to UV irradiation for 1 hour. This results in a monodomain LCE. LCE strips can be made by cutting the monodomain LCE sheet. The actuation performance of the LCE is shown in FIG. 28. If a polydomain LCE is desired (e.g., as in the mask control module) it is placed under the UV light for one hour without stretching, finishing the second crosslinking step.

Synthesis of Hydrogels

Acrylamide (>99%; Arcos, USA), alginate (FMC Biopolymer, LF 10/60, USA), N,N'-methylenebis (acrylamide) (MBAA) (Sigma Aldrich, USA), ammonium persulfate (>98%; Sigma Aldrich, USA), N, N, N', N'-tetramethylethylenediamine (TEMED) (>99%; Sigma Aldrich, USA), and calcium sulfate dihydrate (98%; Sigma Aldrich, USA) are used without further purification.

The double network hydrogel is synthesized following Ref. (64) with some modification (65). 8 g Acrylamide, 1 g Alginate, 0.0048 g crosslinker MBAA, and 0.02 g thermal initiator are dis-solved into 51 g deionized water. The mixture is stirred for 2 hours until all the components are fully dissolved. The mixture is marked as solution 1. Then, 0.02 g initiator accelerator TEMED and 0.1328 g ionic crosslinker calcium sulfate dihydrate are dissolved into 5 g deionized water. The mixture is sonicated for 2 minutes and marked as solution 2. After that, solution 1 and solution 2 are mixed and poured into a 3D printed PLA mold with dimensions 5 mm×4 mm×10 mm. The specimen is left at room temperature (24° C.) for 24 hours, covered by a glass slide, to polymerize the gel.

The Measurement of the Actuation Strain of the CNT-LCE and LCE Film

A hot plate is used to measure the actuation strain of the CNT-LCE and LCE film at different temperatures. At each temperature, we wait 3 minutes to ensure the length of the LCEs has reached an equilibrium. The length is measured by taking an optical image (Canon 80D) then using ImageJ. The results of the actuation strain are shown in FIG. 28.

The Response Speed of the CNT-LCE Film

The actuation strain of the CNT-LCE film versus time is shown in FIG. 31A for different light intensities. In the experiment, we change the distance between the light source and the CNT-LCE film. When the light is switched on, the actuation strain of the CNT-LCE gradually increases, eventually reaching a steady-state plateau value after 100 seconds. After the light is switched off, the actuation strain drops to 0 within 160 seconds. During these tests, we also measure the maximum surface temperature of the CNT-LCE film using an IR camera (FLIR E54), as shown in FIG. 31B. When the light is turned on, the surface temperature increases, and reaches steady-state within 100 seconds. After the light is switched off, the temperature gradually decrease to room temperature (24° C.) within 160 seconds.

The Mechanical Properties of the CNT-LCE and LCE Film at Different Temperatures

The force-displacement relationship of the CNT-LCE and LCE films are measured using an Instron Model 5564. At room temperature (24° C.) the sample size of the films are 45 mm×15 mm×1 mm. In the experiment, we use light and heat to increase the temperature of the films. The IR camera (FLIR E54) is used to capture the surface temperature. Stretching is begun once the temperature reaches the intended steady-state target temperature.

The force-displacement relationship of the CNT-LCE film is shown in FIG. 32A. After the temperature is sufficiently increased, the material undergoes a nematic-isotropic phase transition. At this point, the CNT-LCE become softer, causing the maximum force to decrease from 50 N to 10 N. FIG. 32B shows the stress-strain relationship of the CNT-LCE film at different temperatures. Both the mechanical strength and the stretchability of the CNT-LCE decreases as a function of temperature. The mechanical strength decreases from 3 MPa to 0.4 MPa when the temperature is increased from 24° C. to 145° C., while the stretchability decreases from 62% to 28% when the temperature is increased from 24° C. to 145° C.

Figure 33:
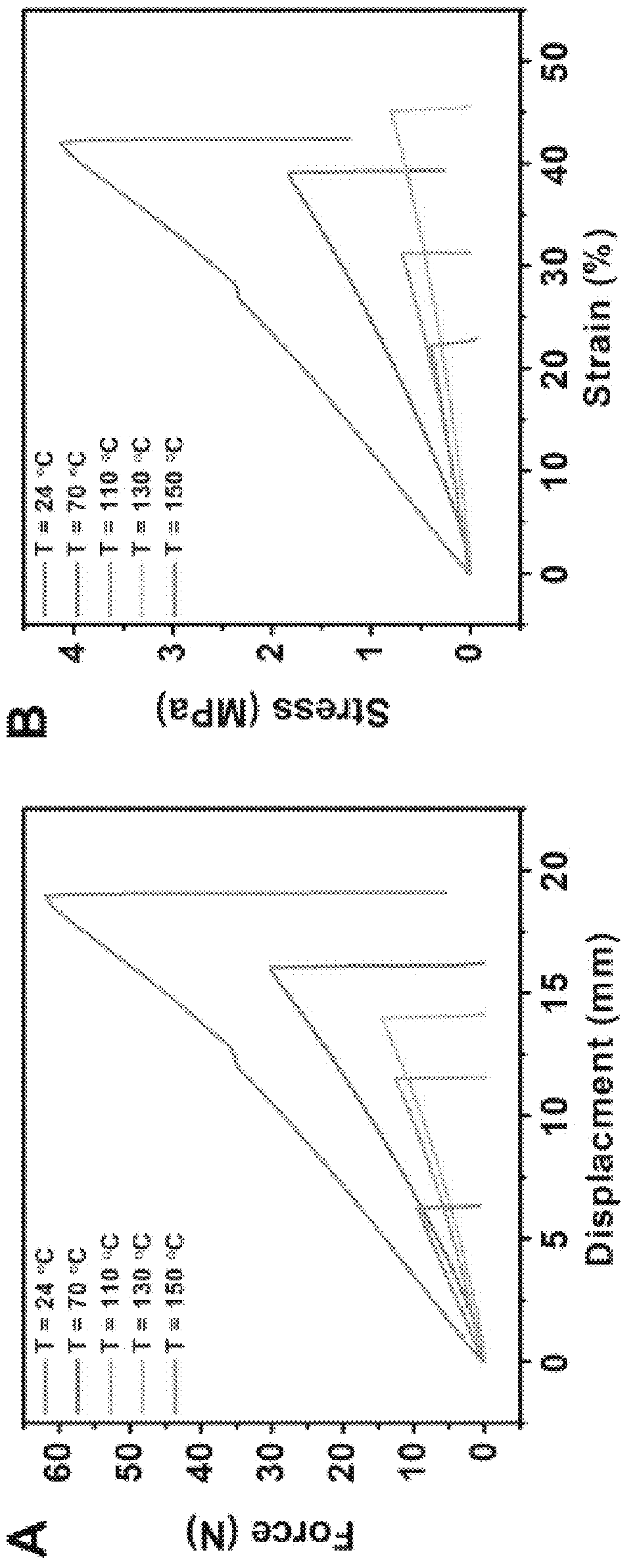

Similarly, the force-displacement and stress-strain relationship of the LCE film is shown in FIG. 33.

Characterization of the Force-Strain Relationship of the Kirigami

The force-strain relationship of the kirigami is measured using an Instron Model 5564. The loading speed is set to 1 mm/s. The force-strain relationships are shown for different hinge thicknesses in FIG. 25. The initial length of one set of squares is 20 mm.

Additional Disclosure

Here, we propose a discrete model to better understand the mechanics of the kirigami structures. A schematic of the discrete model is shown in FIG. 18. In the discrete model, each square (side length a) is considered to be a rigid body with mass M and moment of inertia J. Each square has three degrees of freedom: two translational displacements, u and v, and one rotational angle, θ. Note, θ0 is the initial angle. Each hinge (connecting two squares) is modeled by three linear springs: a longitudinal spring with stiffness K1, a shear spring with stiffness Ks, and a torsional spring with stiffness Kθ. Based on the discrete model, the equations of motion of a square at site (n, m) are $$M\frac{\partial^2 u_{n,m}}{\partial t^2} = K_l(u_{n-1,m} + u_{n+1,m} - 2u_{n,m}) + K_s(u_{n-1,m} + u_{n+1,m} - 2u_{n,m}) + K_l\frac{a}{2\cos\theta_0}[\cos(\theta_{n-1,m}+\theta_0) - \cos(\theta_{n+1,m}+\theta_0)] + (-1)^{n+m}K_s\frac{a}{2\cos\theta_0}[\sin(\theta_{n,m+1}+\theta_0) - \sin(\theta_{n,m-1}+\theta_0)] + F_u^{ext} \quad (1)$$

$$M\frac{\partial^2 v_{n,m}}{\partial t^2} = K_s(v_{n-1,m} + v_{n+1,m} - 2v_{n,m}) + K_l(v_{n,m-1} + v_{n,m+1} - 2v_{n,m}) + K_l\frac{a}{2\cos\theta_0}[\cos(\theta_{n,m-1}+\theta_0) - \cos(\theta_{n,m+1}+\theta_0)] + (-1)^{n+m}K_s\frac{a}{2\cos\theta_0}[-\sin(\theta_{n+1,m}+\theta_0) + \sin(\theta_{n-1,m}+\theta_0)] + F_v^{ext} \quad (2)$$

$$J\frac{\partial^2 \theta_{n,m}}{\partial t^2} = -K_\theta(\theta_{n-1,m} + \theta_{n+1,m} + \theta_{n,m+1} + \theta_{n,m-1} + 4\theta_{n,m}) - K_l\frac{a}{2\cos\theta_0}\sin(\theta_{n,m}+\theta_0)(u_{n+1,m} + v_{n,m+1} - u_{n-1,m} - v_{n,m-1}) - K_l\frac{a^2}{4\cos^2\theta_0}\sin(\theta_{n,m}+\theta_0)[\cos(\theta_{n+1,m}+\theta_0) - \cos(\theta_{n,m-1}+\theta_0) - \cos(\theta_{n,m+1}+\theta_0) - \cos(\theta_{n,m-1}+\theta_0) - 4\cos(\theta_{n,m}+\theta_0) + 8\cos\theta_0] + (-1)^{n+m}K_s\frac{a}{2\cos\theta_0}\cos(\theta_{n,m}+\theta_0)(u_{n,m+1} - u_{n,m-1} + v_{n-1,m} - v_{n+1,m}) + K_s\frac{a^2}{4\cos^2\theta_0}\cos(\theta_{n,m}+\theta_0)[\sin(\theta_{n+1,m}+\theta_0) + \sin(\theta_{n,m+1}+\theta_0) - 4\sin(\theta_{n,m}+\theta_0) + \sin(\theta_{n-1,m}+\theta_0) + \sin(\theta_{n,m-1}+\theta_0)] + M^{ext}, \quad (3)$$

where $$F_u^{ext} \text{ and } F_v^{ext}$$

are the external forces along the x and y axes, respectively, and $M^{ext}$ is the external moment.

To investigate the static behavior of the system, we remove the inertial terms on the left side of the governing equations. By introducing the normalized displacements U=u/a and V=v/a, and stiffnesses $K_1=K_s/K_l$ and $K_2=K_\theta/(K_l a^2)$, we obtain the dimensionless governing equations of the (n, m)$^{th}$ square:

$$0 = (U_{n-1,m} + U_{n+1,m} - 2U_{n,m}) + K_1\,(U_{n,m-1} + U_{n,m+1} - 2U_{n,m}) + \frac{1}{2\cos\theta_0}[\cos(\theta_{n-1,m}+\theta_0) - \cos(\theta_{n+1,m}+\theta_0)] + (-1)^{n+m}\frac{K_1}{2\cos\theta_0}[\sin(\theta_{n,m+1}+\theta_0) - \sin(\theta_{n,m-1}+\theta_0)] + \frac{F_u^{ext}}{K_l a} \equiv \overline{F}_u^{int} + \overline{F}_u^{ext} \tag{4}$$

$$0 = K_1(V_{n-1,m} + V_{n+1,m} - 2V_{n,m}) + (V_{n,m-1} + V_{n,m+1} - 2V_{n,m}) + \frac{1}{2\cos\theta_0}[\cos(\theta_{n,m-1}+\theta_0) - \cos(\theta_{n,m+1}+\theta_0)] + (-1)^{n+m}\frac{K_1}{2\cos\theta_0}[-\sin(\theta_{n+1,m}+\theta_0) + \sin(\theta_{n-1,m}+\theta_0)] + \frac{F_v^{ext}}{K_l a} \equiv \overline{F}_v^{int} + \overline{F}_v^{ext} \tag{5}$$

$$0 = -K_2(\theta_{n-1,m} + \theta_{n+1,m} + \theta_{n,m+1} + \theta_{n,m-1} + 4\theta_{n,m}) - \frac{1}{2\cos\theta_0}\sin(\theta_{n,m}+\theta_0)\,(U_{n+1,m} + V_{n,m+1} - U_{n-1,m} - V_{n,m-1}) - \frac{1}{4\cos^2\theta_0}\sin(\theta_{n,m}+\theta_0)[\cos(\theta_{n+1,m}+\theta_0) - L\cos(\theta_{n-1,m}+\theta_0) - \cos(\theta_{n,m+1}+\theta_0) - \cos(\theta_{n,m-1}+\theta_0) - 4\cos(\theta_{n,m}+\theta_0) + 8\cos\theta_0] + (-1)^{n+m}\frac{K_1}{2\cos\theta_0}\cos(\theta_{n,m}+\theta_0)\,(u_{n,m+1} - u_{n,m-1} + v_{n-1,m} - v_{n+1,m}) + \frac{K_1}{4\cos^2\theta_0}\cos(\theta_{n,m}+\theta_0)[\sin(\theta_{n+1,m}+\theta_0) + \sin(\theta_{n,m+1}+\theta_0) - 4\sin(\theta_{n,m}+\theta_0) + \sin(\theta_{n-1,m}+\theta_0) + \sin(\theta_{n,m-1}+\theta_0)] + \frac{M^{ext}}{K_l a^2} \equiv \overline{M}^{int} + \overline{M}^{ext}, \tag{6}$$

The assembly of Eq. (4)-(6) for all (n, m) yields the dimensionless governing equation of the whole system $$\overline{F}^{int}(u) + \overline{F}^{ext} = 0 \tag{7}$$

where $\overline{F}^{int}(u)$ and $\overline{F}^{ext}$ are two vectors obtained by assembling the normalized internal and external forces of all the squares in the system, respectively. Since $F^{int}(u)$ nonlinearly depends on the displacement vector $u=[u_1\ v_1\ \theta_1 \ldots u_N\ v_N\ \theta_N]^T$, we employ the Newton-Raphson method to numerically solve Eq. (7). To this end, we first define a function $G(u)=F^{int}(u)+F^{ext}$. Then, the solution of Eq. (7) can be approximated using the following algorithm:

$$u_{j+1} = u_j - \left[\nabla G|_{u_j}\right]^{-1} G(u_j) \tag{8}$$

where $\nabla G|_{u_j}$ is the gradient of G evaluated at $u=u_j$, corresponding to the global stiffness matrix.

Static Behavior of Kirigami Squares: a Parametric Study

We perform the following analysis to further reduce the number of design parameters for the actual kirigami body. From fundamental structural mechanics, the equivalent longitudinal, shear, and torsional springs of a thin hinge can be described invoking classical rod and cantilever beam models as follows $$K_l = EA/L_h \qquad K_s = 3EI/L_h^3 \qquad K_\theta = EI/L_h, \tag{9}$$

where E is the Young's modulus, $L_h$ is the length of the hinge, and A and I are the area and second moment of area of the hinge's cross section, respectively. Considering a rectangular cross section with base b and height h, we have A=bh and $I=bh^3/12$. Substituting them into Eq. (9) and recalling the definition of $K_1$ and $K_2$, the two normalized stiffnesses can be rewritten as $$K_1 = h^2/(4L_h^2) \qquad K_2 = h^2/(12a^2). \tag{10}$$

Based on Eq. (10), the normalized stiffnesses are purely linked to the geometrical properties of the kirigami structure, including the length of the hinge $L_h$, the height of the hinge's cross section h, and the side length of the square a. This result indicates that the mechanical behavior of the kirigami structures can be tuned via a few geometrical properties. In the following, we will rely on the Newton-Raphson algorithm (i.e., Eq. (8)) to investigate the static deformation of kirigami structures, which will be exploited to provide useful guidelines for the design of the kirigami soft robot.

We now consider a kirigami structure consisting of 4×14 squares with $\theta_0=\pi/4$ (i.e., initially closed), which is under tensile stretching as shown in FIG. 19A. The external forces $\overline{F}$, remaining in the positive a direction, are applied to the two squares located in the last column and highlighted in green. Boundary conditions are imposed on the two squares located in the first column and highlighted in black. with degrees of freedom denoted as $(U_1, V_1, \theta_1)$ and $(U_2, V_2, \theta_2)$. Specifically, a boundary condition is imposed by setting $U_1=V_1=U_2=0$. The extension of the structure is defined as $$\varepsilon = \frac{l-L}{L} \times 100\% \tag{11}$$

where l and L are the original and deformed lengths of the structure, respectively. In FIGS. 19B-C, we plot the extension ε as functions of the normalized force $|\overline{F}|$ for various pairs of the normalized stiffnesses $(K_1, K_2)$.

Specifically, we set $K_2$=0.02 and vary $K_1$ from 0.01 to 1 in FIG. 19B, while we set $K_1$=0.2 and vary $K_2$ from 0.01 to 0.05 in FIG. 19C. From a visual inspection, we observe that, under the same leading conditions, ε increases significantly as $K_2$ decreases. However, ε varies much less in response to the change in $K_1$, especially when $K_1$ is in the range of [0.1, 0.5] (a realistic range to achieve in experiments). As a result, if our goal is to maximize the extension, we need to set $K_2$ as low as possible, which implies a short height of the hinge cross section h and a large side length of the square a.

Figure 20:
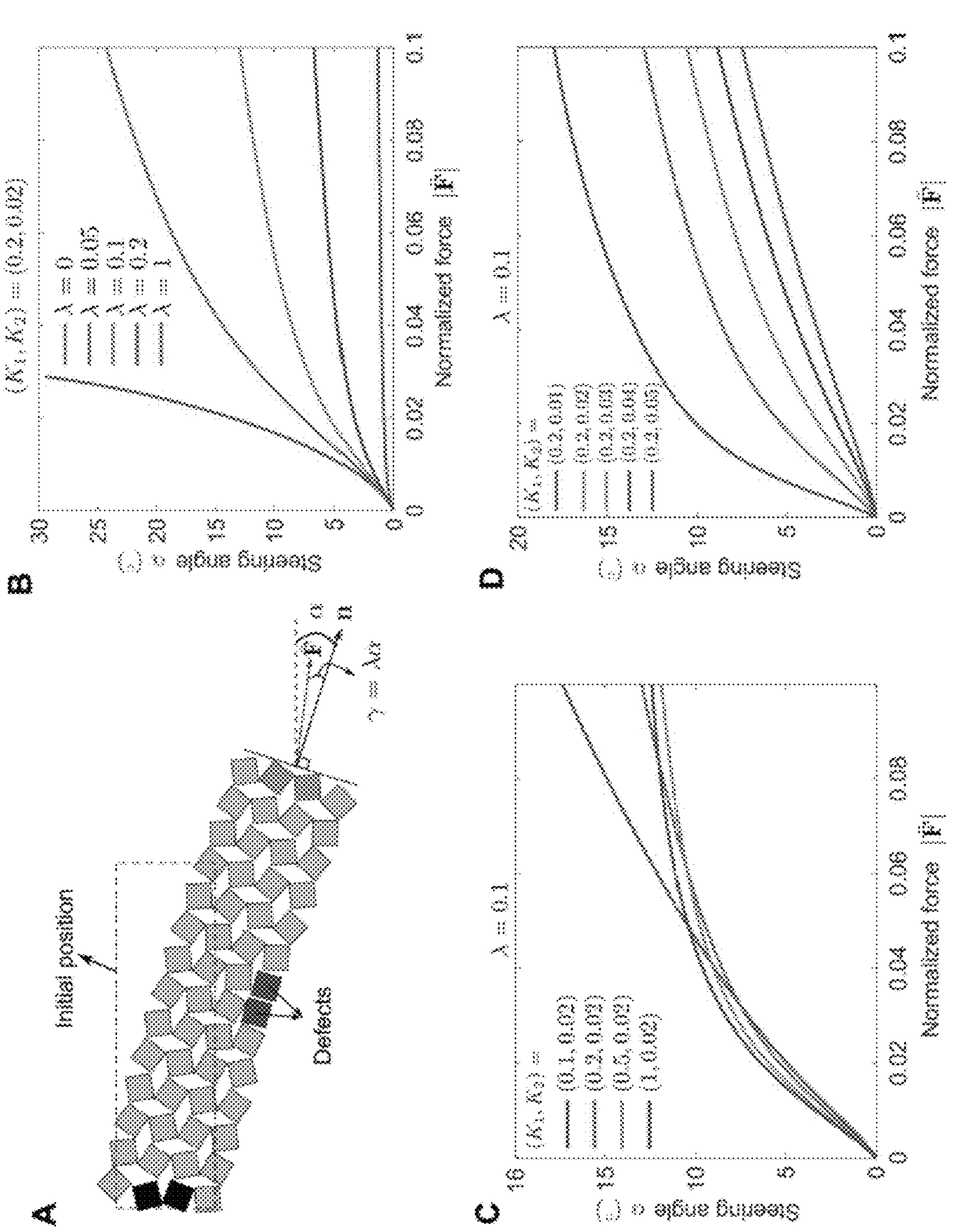

We now introduce two mechanical constraints in the structure, which are located at the center of the bottom row and highlighted in red, as shown in FIG. 20A. The "Mechanical constraints" refers to the local constraints provided by responsive materials that locally inhibit the opening of the kirigami squares, causing the kirigami to bend. In the simulation, the torsional stiffness of the hinge connecting the two mechanical constraints are set to a very high value, i.e., 1000 times larger than the torsional stiffness of the other hinges. This effectively prevents the rotation of the squares associated with the mechanical constraints. We consider the same boundary conditions, but the external force $\overline{F}$ is allowed to change its direction during deformation. For simplicity, we introduce a single parameter λ to control the direction of $\overline{F}$, which relates α to γ by a linear relation; γ=λα, where α is the angle between the horizontal line and a line perpendicular to the deformed last column (denoted as n), and γ is the angle between $\overline{F}$ and n. Clearly, λ=0 corresponds to the case where $\overline{F}$ remains horizontal, and λ=0 corresponds to the case where $\overline{F}$ is always perpendicular to the last column during deformation. We also define α as the steering angle of the structure. In FIG. 20B-C, we show the effects of three different parameters ($K_1$, $K_2$, γ) on the steering angle α. We observe that α increases dramatically as $K_2$ and γ decrease, while it is less affected by $K_1$. As a result, if our primary goal is to achieve large steering angles for a given $\gamma_1$ we need to design the kirigami body with a small $K_2$, which again implies a short height of the hinge cross section h and a large side length of the square a.

We conducted finite element analysis using ABAQUS to understand the bending of the robots when subjected to an inflated pneumatic actuator. Numerical simulations were conducted with ABAQUS static analysis with a symmetric model with respect to the plane parallel to the kirigami layer.

First, we set up a model with a half tube simulating the behavior of the pneumatic actuator. We modeled a capped cylindrical tube with wall thicknesses using the same parameters in the experiments. The wall of the tube is modeled as an HGO hyperelastic anisotropic material which is used to model similar actuators in previous work (66). The strain energy density of HGO materials is defined as:

$$W = C_{10}(I_1 - 3) + \frac{k_1}{2k_2}\left[\exp\left[k_2(I_4 - 1)^2\right] - 1\right] \tag{12}$$

where $I_1$ is the first invariant of a given deformation gradient F and $I_4$ is the forth invariant. with respect to a fiber direction a. $I_4$ can be computed using the Cauchy-Green tensor $C=FF^T$:

$$I_4 = a\cdot(C\cdot a) \tag{13}$$

$C_{10}$, $k_1$, and $k_2$ are fitting parameters for the model with $k_2$ having very little impact on the results of the fitting and is taken as $k_2$=0.01. Here, $C_{10}$ represents the modulus of the matrix material, which in our pneumatic actuator is just a silicone rubber, while $k_1$ represents the degree of anisotropy, which arises due to the fibers (kevlar). The parameters for the pneumatic actuator are calibrated by comparing the extension of the actuator under various applied pressures, using both simulations and experiments. As shown in FIG. 21A, the best fit uses parameters $C_1$0=14 kPa and $k_1$=350 kPa. Note, the value for $C_1$0 is consistent with previous reported values for Ecoflex 30 using a hyperelastic material model. In FIG. 21B, we place the actuated tube at the indicated pressure in the finite element model together with the experimental images to compare their length.

The two ends of the pneumatic actuator are rigidly constrained to a kirigami layer comprising rotating squares. In FIG. 21, we show the finite element results of the robot inflating as pressure is applied. Here the kirigami layer is modeled as neo-Hookean material with one fitting parameter, $C_{10}$. Since the silicone rubber for the kirigami layer is different from the pneumatic actuator, we need to recalibrate the material constant for the kirigami layer. To do so, we extract the extension of the entire robot in both experiments and simulations and find the best fit is achieved using $C_{10}$=20 kPa. Using these parameters, the FEA matches experimental data well, as shown in FIG. 21C. In FIG. 21D, we compare experimental images of the robot FEA results at indicated pressures. The finite element analysis is seen to match the deformation of the entire robot accurately.

After calibrating the material parameters for each component of the robot, control modules are simulated as mechanical constraints in the FEA as rigid plates restricting rotation of various squares, similar to experiments. A rigid plate (E=10 GPa) is placed in rigid contact with the squares that are restricted. We also place vertical columns under the kirigami layer (same as experiments). Friction between the pneumatic actuator and the columns are defined using hard contact and standard Coulomb friction. The contact and friction from the columns constrain the pneumatic actuator close to the center line of the actuated kirigami layer, representing the bending behavior of the entire robot under mechanical constraints. FIG. 23A shows snapshots of both experimental and FEA data under the same applied pressure (15 kPa). FIG. 23B shows that the bending angle predicted by FEA agrees closely with experiments up to 15 kPa. After 15 kPa, there is significant contact and deformation in the finite element model and convergence becomes difficult in the static model. Experiments and FEA are shown in FIGS. 23C and D.

The kirigami robot body can be constructed of any number of squares along its length ($N_L$) and width ($N_w$). The initial angle of opening of the squares $\theta_{lin}$ and the hinge thickness t also influence the mechanical response of the system. During actuation, the pneumatic actuator extends, forcing the squares in the kirigami to rotate and open. This opening consists of two stages: The first stage is rotation dominated. The extension of the kirigami can be found as (56):

$$\delta = 2l(\cos\theta - \cos(\theta_{lin} - \theta)) \tag{14}$$

with each square in the system being rotated by $\theta$.

In a system with $N_w \times N_L$ squares (as illustrated in FIG. 22A), the initial width and length of the robot are:

$$w = (N_w - 1)\,2l\cos\theta_{lin} \tag{15}$$

$$L_1 = L_2 = (N_L - 1)\,2l\cos\theta_{lin} \tag{16}$$

When a mechanical constraint with a size of $N_d$ is inserted in the robot, it constricts the rotation of $N_d$−1 squares along one edge during opening of the kirigami layer. As illustrated in FIG. 22B, for a prescribed rotation of all other squares in the system, the width w', length of the side with the mechanical constraint $L'_1$, and length of the side without the mechanical constraint $N'_2$ can be found as:

$$w' = (N_w - 1)\,2l\cos(\theta_{lin} - \theta) \tag{17}$$

$$L'_1 = (N_L - N_d - 2)\,2l\cos(\theta_{lin} - \theta) + (N_d - 1)\,2l\cos\theta_{lin} \tag{18}$$

$$L'_2 = (N_L - 1)\,2l\cos(\theta_{lin} - \theta) \tag{19}$$

By observing both experimental images and numerical simulations (FIGS. 23A and B), the robots when bent can be approximated as an annular sector. With this assumption, we derive the bending angle $\alpha$ as:

$$\alpha = \frac{L'_2 - L'_1}{w'} = \frac{N_d - 1}{N_w - 1}\,\frac{\cos(\theta_{lin} - \theta) - \cos\theta_{lin}}{\cos(\theta_{lin} - \theta)} \tag{20}$$

$$\alpha = \frac{N_d - 1}{N_w - 1}\left(1 - \frac{1}{\lambda}\right)$$

The extension $\lambda$ of the kirigami is related to the rotation of the squares $\theta$ (56):

$$\lambda = \frac{\cos(\theta_{lin} - \theta)}{\cos\theta_{lin}} \tag{21}$$

Figure 22:
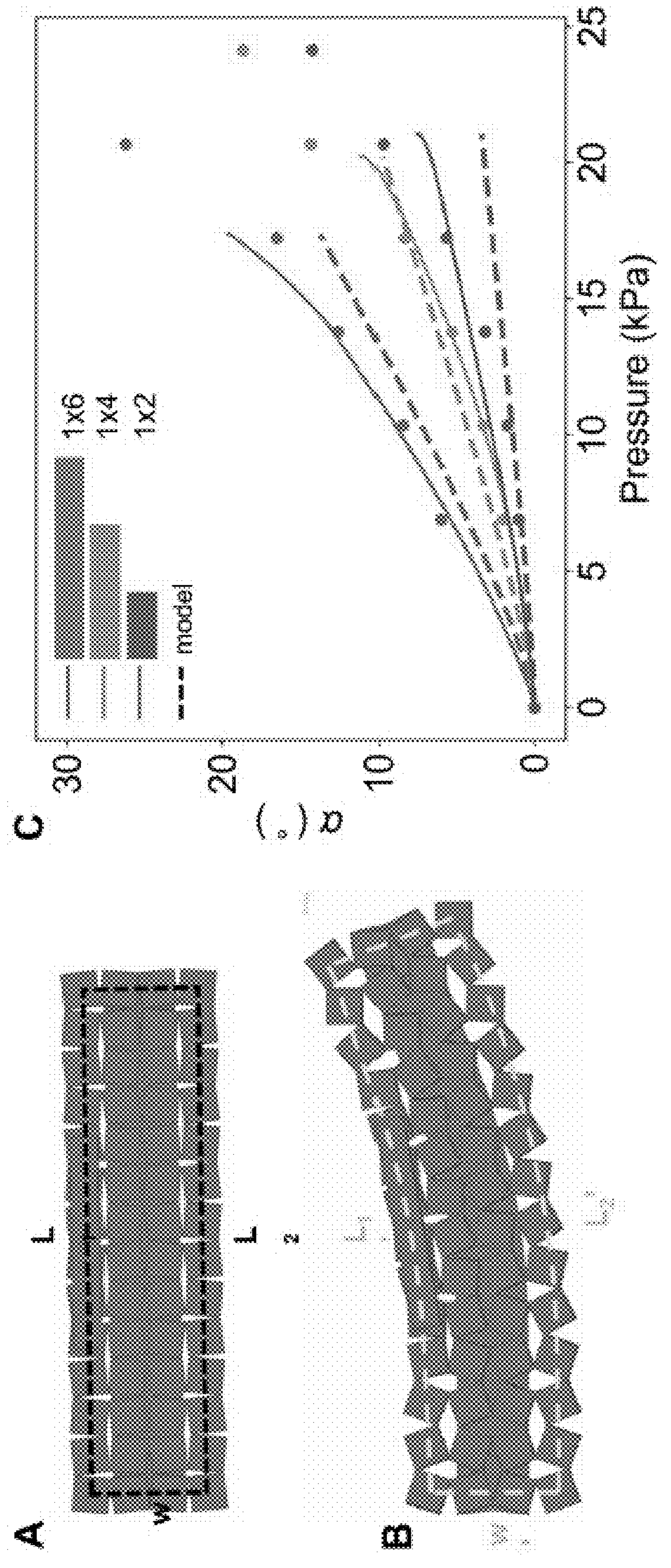

We plot the prediction using the annular sector model of bending angle with various lengths of mechanical constraints as shown in FIGS. 22 and 23. The experimental results are shown in FIG. 34. Our model can quantitatively predict the bending angle at low pressure for different constraint sizes, and qualitatively describe the effect of other geometric parameters.

Figure 36:
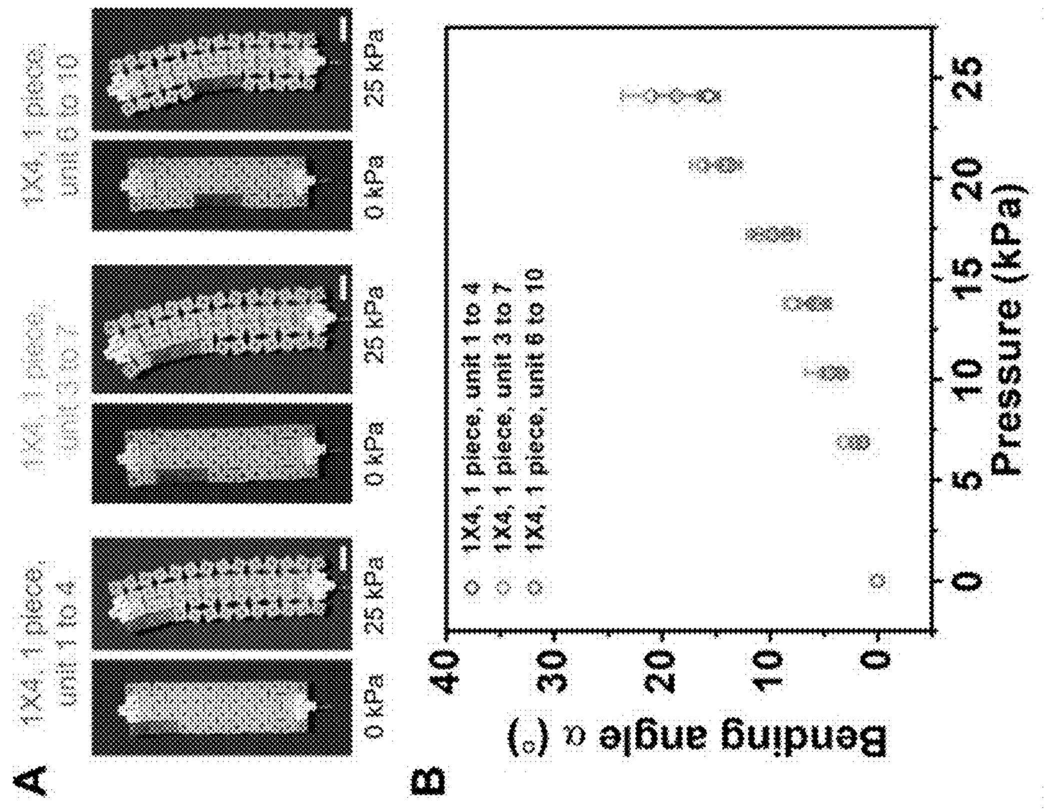

In order to maximize the bending angle of the robot, the robot should minimize the number of squares in the width direction $N_w$, maximize the number of mechanical constraints along an edge, and maximize the extension of the robot. In the experiment, we fabricate kirigami squares with three different sizes (4×10, 4×14, 6×14). We attach rigid mechanical constraints, which mechanically constrain the rotation and opening of the kirigami platforms (FIG. 35). In practice, the minimum number of squares we can have along the width of the robot is 4, in order to attach the pneumatic actuator to the kirigami robot. The experimental results show that the kirigami with a size of 4×14 can generate the largest bending angles (FIG. 35). We therefore choose these dimensions for the robot. It is also worth noting that the number of squares in the length direction, $N_L$, has little effect on the bending angle (FIG. 36).

The last consideration is to maximize the strain. For the rotating square system, the force-displacement curve has two distinct region: an initial rotation-dominated region and later an extension-dominated region. The force increases drastically in the extension region. During both experiments and numerical simulations, we observe buckling of the pneumatic actuator at larger air pressures. This buckling behavior is undesired, since the robot should walk straight when no mechanical constraints are present. However, limiting the actuation to lower air pressure means less extension of the robot is achieved each actuation cycle, providing less bending with mechanical constraints. To maximize the extension and bending of each cycle, the parameters of the kirigami are chosen to maximize the strain at which the deformation transitions from rotation dominated to extension dominated. In order to maximize the critical strain, the initial rotation of the rotating squares needs to be minimized ($\theta_{lin}$ being close to zero) and the hinge thickness needs to be as small as possible (56). In this work, $\theta_{lin}$ is chosen to be 5° to make molding of the rotating squares possible. We also confirm the effect of the hinge thickness by testing two samples with hinge thickness of 1.0 mm and 1.7 mm. The force-strain curves of the two samples are measured using a universal testing machine as shown in FIG. 25. The system with smaller hinge thickness has a much larger critical strain: The critical strains for the two samples with hinge thickness of 1.0 mm and 1.7 mm are 27% and 12.5%, respectively.

Effect of the Length of LCE Strips in the Control Modules

For the control module (integrated with CNT-LCE) shown in FIG. 3C, which enables the robot to steer closer to stimuli, the length of the CNT-LCE strip is a critical parameter. When no external stimuli (heat or light) are present, the square units can freely rotate and open (e.g., room temperature). The CNT-LCE strip should not constrain the rotating and opening of the squares. However, when the control module is subjected to the stimuli (e.g., high temperature), the CNT-LCE strip contracts, and the contractile force should constrain the rotation of the squares, causing the kirigami body to bend. In the experiments, we design CNT-LCE strips with three lengths, 35 mm, 45 mm, and 55 mm (FIG. 37). The force-strain relationship of the square units (integrated with a CNT-LCE strip) is measured at different temperatures from 24° C. to 145° C. As shown in FIG. 37B, at room temperature (24° C.), the square units with a 35 mm length CNT-LCE strip are undesirably constrained. The 35 mm length is too short for this type of control module. In contrast, even at high temperatures (e.g., 145° C.), the 55 mm CNT-LCE strip cannot generate a sufficient constraint on the motion of the squares (FIG. 37C). We therefore select the CNT-LCE strip with 45 mm length (FIG. 37D), which appropriately generates mechanical constraints at high temperatures but not at low temperatures.

Similarly, for the control module that causes the robot to steer away from external stimuli (FIG. 3D), we choose the LCE strip with 45 mm length (FIG. 39).

Operational Principle of the Mechanical Bistable Valve

The operating principle of the bistable valve is shown in FIG. 7A. In the initial state, the membrane blocks the air tube inside the top chamber, preventing the flow of air. As a result, the pressurized air flows into the pneumatic actuator, causing it to extend. The pressure in the top chamber gradually increases. When the pressure in the top chamber reaches the critical value Pc, the membrane snaps. When this occurs, the air in the tube is no longer blocked, enabling it to flow out of the device and into the atmosphere. The pneumatic actuator therefore deflates. The pressure of the actuator versus time (measured experimentally) is plotted in FIG. 7B, showing the desired periodic pressure variation in the actuator. Note, the minimum pressure is 12 kPa, because a small amount of air is still pumped into the actuator during the deflation process. The elongation of the robot at this pressure is small (10%).

Fluid Control System

In some of the experiments (e.g., the pressure-extension measurements of FIG. 3), it is important to precisely control the pressure of the pneumatic actuator as a function of time. For this purpose, a customized fluid control system was built (FIG. 24), following the design of Ref. (67). The system includes a microcontroller (Arduino Mega 2560), solenoid valves and manifold, compact air pump, pressure sensors, MOSFET (metal oxide semi-conductor field-effect transistor), power regulators, switches, and a linear potentiometer. The pressurized air is generated by the air pump, regulated via pulse-width modulation (PWM), and measured by the pressure sensors. For the static experiments (measurement of the extension of actuator and the bending angle of the kirigami body), the fluid control system is used manually (i.e., the air pressure is changed via the linear potentiometer).

Figures

The appended figures are illustrative only and do not limit the scope of the present disclosure or the appended claims.

FIG. 1 provides an example electronics-free soft autonomous robot. The soft robot comprises a kirigami-inspired body, a pneumatic actuator (mechanical valve is optional), multiple types of control modules (with responsive materials), and feet (to enable locomotion). Scale bar: 5 cm. As shown, a robot can include an actuator (e.g., a pneumatic actuator or other extensible actuator) and an electronic-free control unit; the control unit can also engage with an arrangement of structural units, which structural units can be, e.g., a kirigami platform as shown in FIG. 1. Such a platform can include an array of structural units that are connected, e.g., via hinges, so as to allow movement (bending, expansion) of the array in response to movement by the pneumatic actuator and/or a force exerted by a control unit.

FIG. 2 provides an operating principle of electronics-free soft autonomous robots. Multiple control modules allow the soft robots to respond to their surrounding environments (heat, light, solvents). Control modules activate in response to local stimuli, which mechanically constrain the actuating kirigami, causing changes to the curvature of the robot, and, as a result, to its trajectory.

FIGS. 3A-3F illustrate physical shape changes of soft autonomous robots in response to environmental inputs. FIG. 3A. The extension ratio e of the pneumatic actuator and the robot (without any control modules) as a function of applied pressure. FIG. 3B. Multiple types of modular control units are developed. They can be easily attached to or removed from the body of the robot. FIG. 3C. As one example, A control module can sense and respond to heat or light. FIG. 3D. In this example, a different control module design causes the robot to bend away from stimuli (in this case, heat or solvents). FIGS. 3E and 3F. In another example, a control module is designed to bend the robot so that its end will align toward a stimulus (in this case, light). Scale bar in FIGS. 3A, C, D, E and F: 2 cm.

FIGS. 4A-4H illustrate autonomous changes to trajectory in response to environmental inputs. FIG. 4A. The schematic and experimental images show that the robot can autonomously steer its trajectory closer to light or heat. FIG. 4B. The trajectories (displacement and steering angle) of the robot as a function of the power of the heat source. FIG. 4C. The trajectories (displacement and steering angle) of the robot as a function of the distance y (in mm) between the light source and the initial trajectory of the robot. FIG. 4D. The second type of control module causes the robot to autonomously steer away from a heat source or the solvent toluene. FIGS. 4E and 4F. The trajectories (displacement and steering angle) of the robot under different stimuli (heat or toluene). FIG. 4G. The third type of control module causes the robot to autonomously steer directly toward a light source. FIG. 4H. The trajectories (displacement and steering angle) of the robot in environments with different locations of the light source. Scale bar in FIGS. A, D and G: 5 cm. As shown, application of light or heat to an exemplary robot results in the robot bending. Such bending can, as described elsewhere herein, allow the robot to steer toward and/or away from a stimulus. As the robot moves (e.g., in an inchworm-type fashion) driven by the expansion and contraction of the actuator, the curvature of the robot can act to steer its movement. As shown, such a robot can include light-sensitive control units on both sides of the robot, which light-sensitive control units act to bend the robot toward the light source, thereby steering the robot head-on toward the light source.

FIGS. 5A-5I illustrate distributed, multi-stimuli-responsive logic via interaction of multiple control modules. Interactions of multiple control modules can be complex (see complete truth tables in FIGS. 47A-47E). Here are a few simplified examples: FIG. 5A. The combination of a "mechanical lock" control module and the CNT-LCE module of FIG. 3C causes the robot's steering to obey a NOR response. FIGS. 5B-C. Experimental images and trajectories, respectively, of the robot with different heat/light inputs. FIG. 5D. In another example, a "mask" control module is used in con-junction with the CNT-LCE module of FIG. 3C to steer in accordance with an AND strategy (for the environment shown in panel E). FIGS. 5E-F. Experimental images and trajectories, respectively, of the robot with different heat/light inputs. FIG. 5G. In another example, two identical control modules (actuated by heat or light) are distributed symmetrically along the two sides of the robot body, Which enable the robot to realize XOR response. FIGS. 5H-I. Experimental images and trajectories, respectively, of the robot with different heat/light inputs. Scale bar in FIGS. 5B, E and H: 5 cm.

FIGS. 6A-6F illustrates autonomous trajectory changes for the robot configured with different control modules moving through environments with multiple stimuli. FIGS. 6A, C and E. show the robot configured with different modular control units. FIGS. 6, D and F. show experimental images and trajectories that result from these designs. Scale bar in FIGS. A, C and E: 2 cm. Scale bar in FIGS. 6B, D and F: 5 cm.

FIGS. 7A-7D illustrate integration of a bistable valve with an autonomous robot. FIG. 7A. The working mechanism of the mechanical bistable valve. When the membrane bends upward, it blocks the pneumatic tube inside the top chamber. As a result, the pressurized air flows into the actuator, inflating the pneumatic actuator. Once the pressure of the top chamber reaches a critical pressure Pc, the membrane snaps, the air tube in the top chamber is no longer blocked, and the pressurized air can flow out to the atmosphere, deflating the pneumatic actuator. FIG. 7B. The bistable valve translates a constant pressure input to a periodically varying pressure output (supplied to the pneumatic actuator). FIGS. 7C, FIG. 7D Demonstration of autonomous motion in response to various light and heat sources. Scale bar in FIG. 7D: 5 cm FIG. 8 illustrates the use of a hydrogel as a reactive material; hydrogel beads are embedded into a braided mesh. When the hydrogels are submerged into the water and swell, the geometry of the mesh translates the volume expansion of the hydrogel into a contraction of the mesh.

Figure 9:
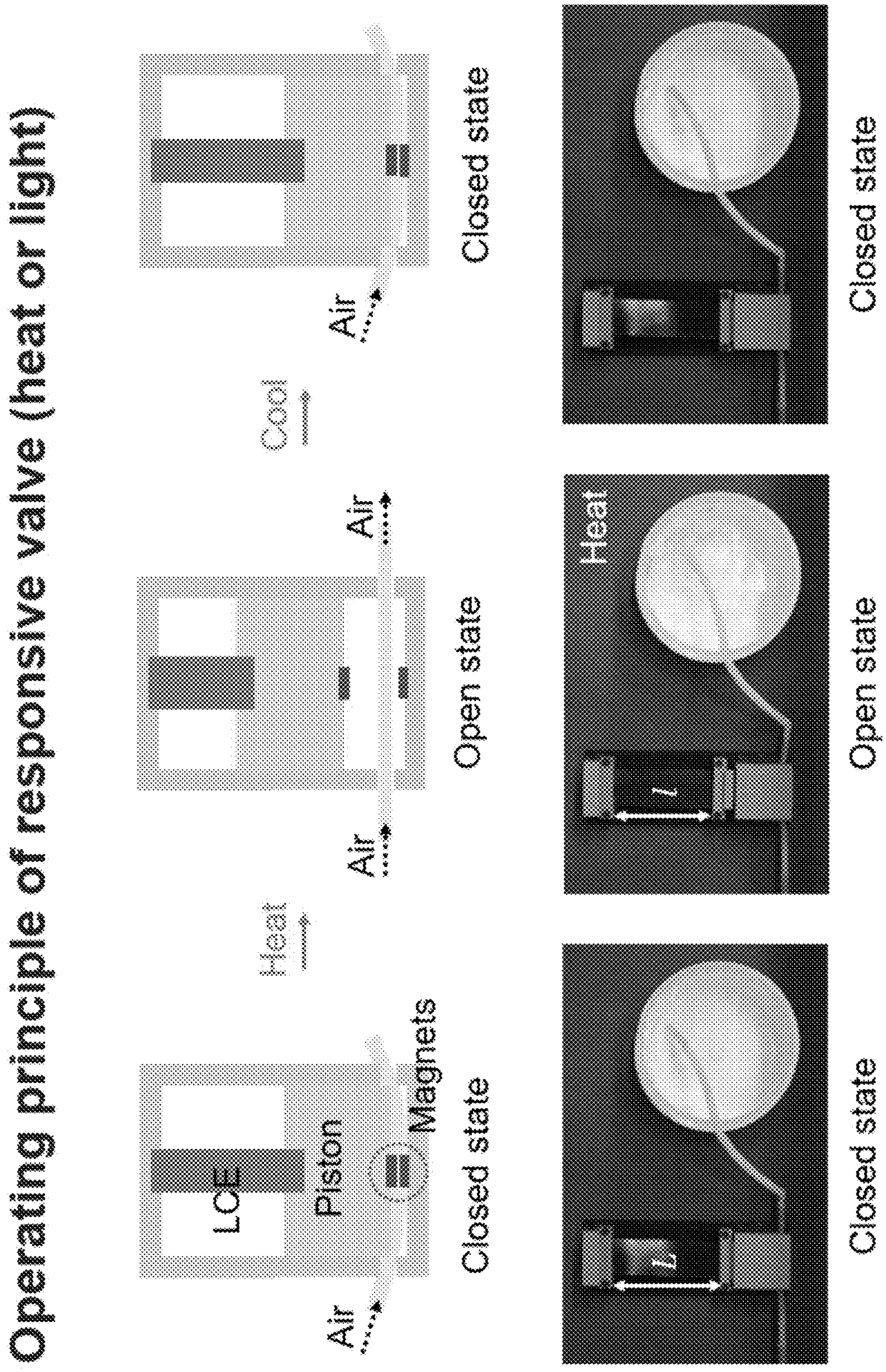
FIG. 9 illustrates the operating principle of a heat- or light-sensitive valve that has a resting closed state.

FIG. 9 illustrates the operating principle of a heat- or light-responsive valve that has a resting closed state. As shown, application of heat to an LCE results in contraction of the LCE and lift the piston, which in turn changes the valve from a closed state to an open state. Removal of the heat results in the return of the valve to its closed state. As shown, magnets can be used to speed the closure of the valve after removal of the heat stimulus.

Figure 10:
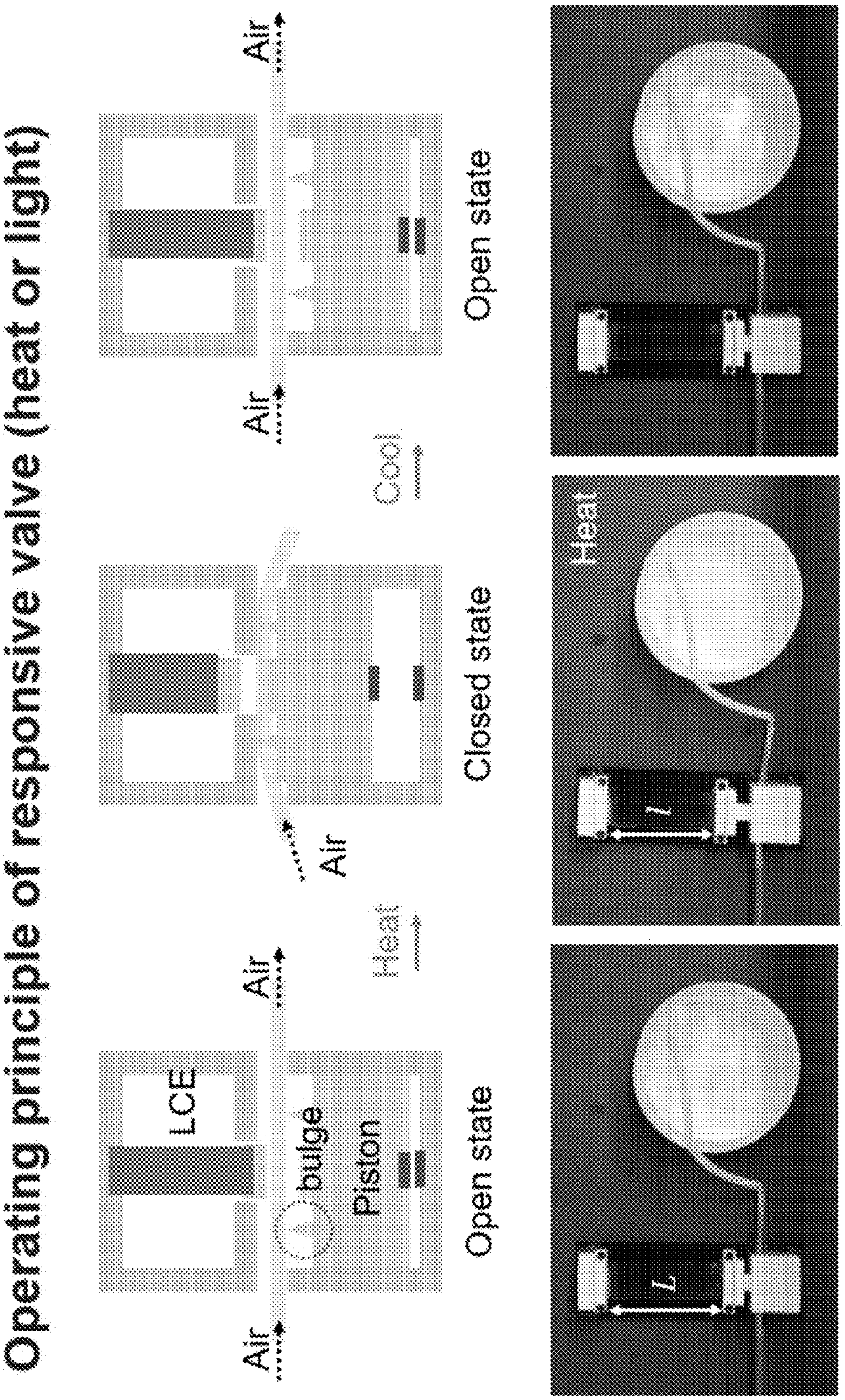
FIG. 10 illustrates the operating principle of a heat- or light-sensitive valve that has a resting open state.

FIG. 10 illustrates the operating principle of a heat- or light-sensitive valve that has a resting open state. As shown, application of heat to an LCE results in contraction of the LCE, which contraction in turn changes the valve from an open state to a closed state as the bulges formed in the piston are exerted against the air-carrying tube, thereby compressing the tube. Removal of the heat results in the return of the valve to its open state. As shown, magnets can be used to speed the closure of the valve after removal of the heat stimulus.

Figure 11:
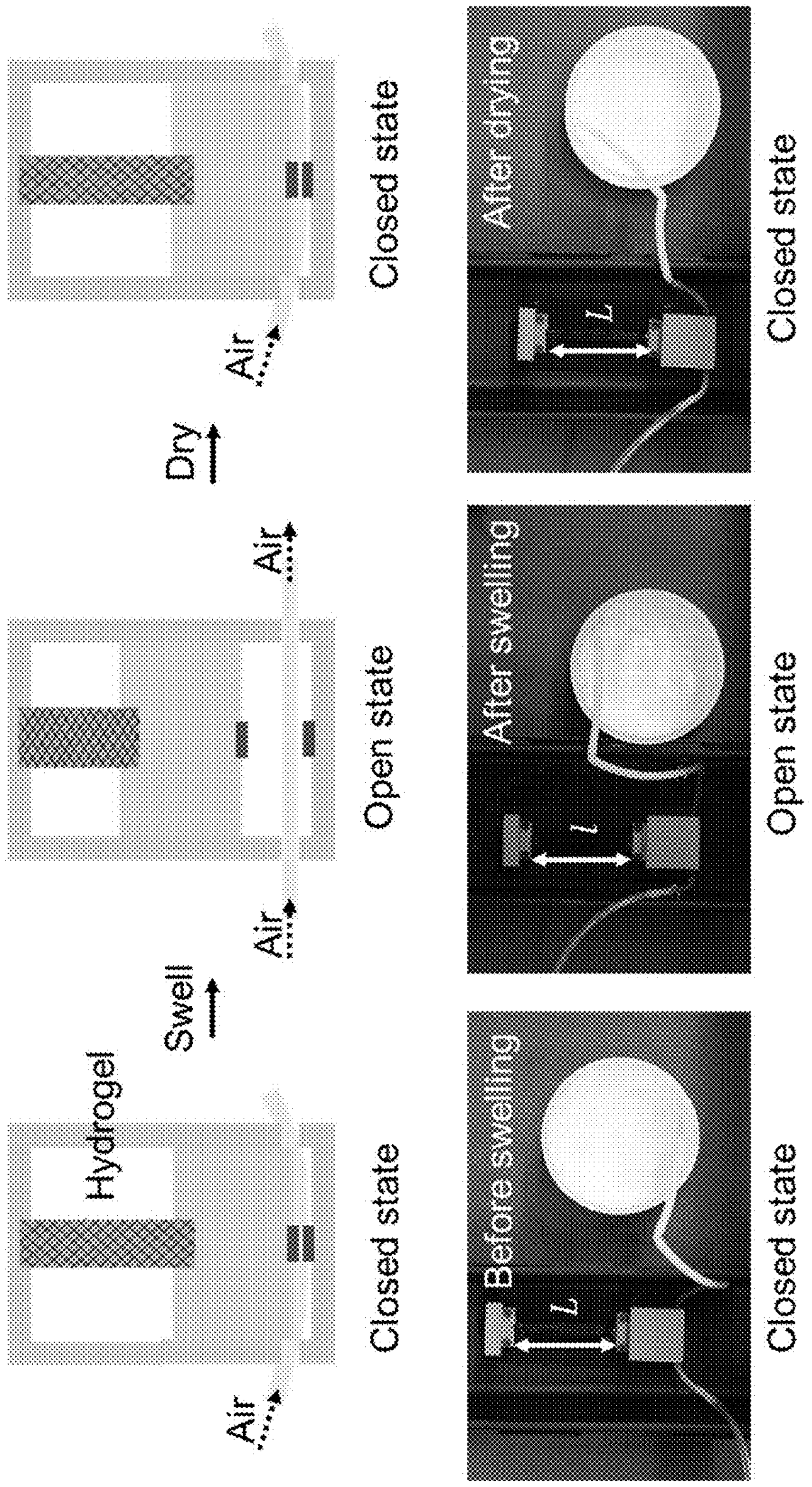
FIG. 11 illustrates the operating principle of a hydrogel-based valve that has a resting closed state.

FIG. 11 illustrates the operating principle of a hydrogel-based valve that has a resting closed state. As shown, swelling of the hydrogel results in contraction of the hydrogel-bearing structure, which contraction in turn changes the valve from a closed state to an open state. Drying or de-swelling of the hydrogel results in the extension of the hydrogel-bearing structure, which cause the return of the valve to its closed state. As shown, magnets can be used to speed the closure of the valve after removal of the heat stimulus.

Figure 12:
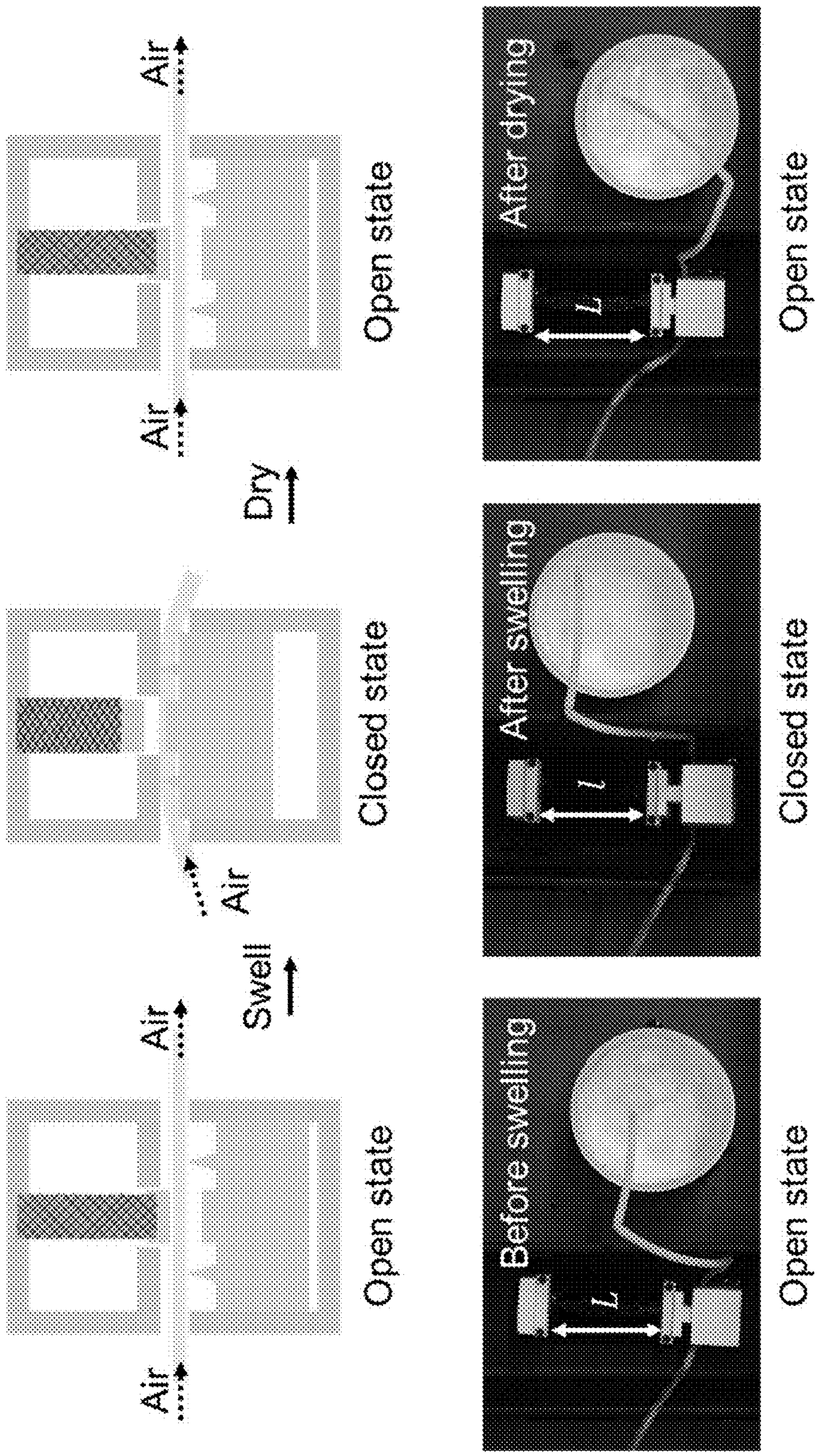
FIG. 12 illustrates the operating principle of a hydrogel-based valve that has a resting open state.

FIG. 12 illustrates the operating principle of a hydrogel-responsive valve that has a resting open state. As shown, swelling of the hydrogel results in contraction of the hydrogel, which contraction in turn changes the valve from an open state to a closed state as the bulges formed in the piston are exerted against the air-carrying tube, thereby compressing the tube. Drying or de-swelling of the hydrogel results in the extension of the hydrogel-bearing structure, which cause the valve to change to its open state. As shown, magnets can be used to speed the closure of the valve.

Figure 13:
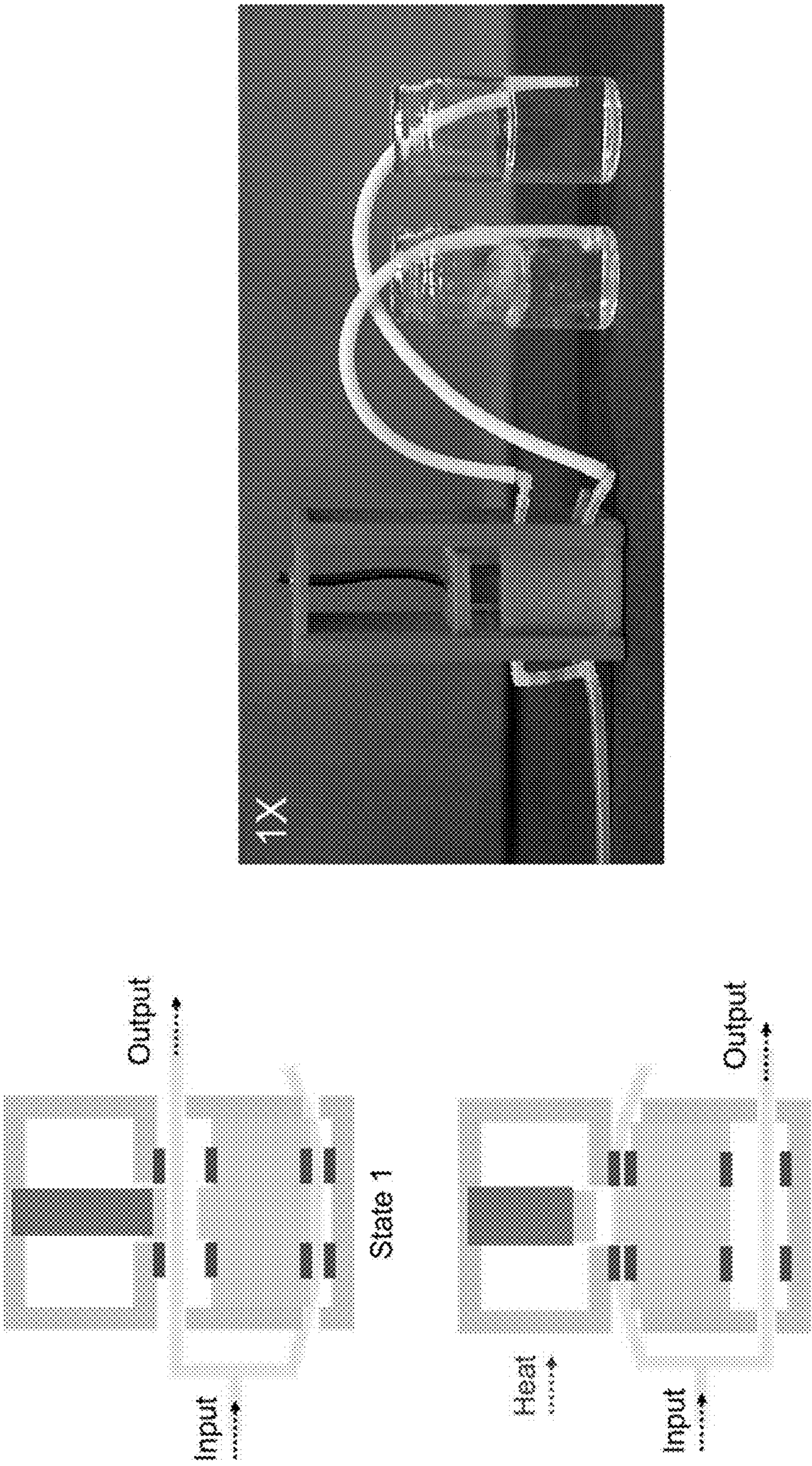
FIG. 13 illustrates the operating principle of a valve that is configured to deliver an input to different output locations, depending on the valve's state and the stimulus applied to the valve.

FIG. 13 illustrates the operating principle of a valve that is configured to deliver an input to different output locations, depending on the valve's state and the stimulus applied to the valve. As shown, application of heat to the valve can contract the LCE, which in turn lift a piston that closes the first output tube (formerly open) and effects opening of the second output tube (formerly closed). As shown, magnets can be used to maintain the piston in a closed or open position. In this way, the change from one state to another can be permanent and can be recovered with manual intervention.

Figure 14:
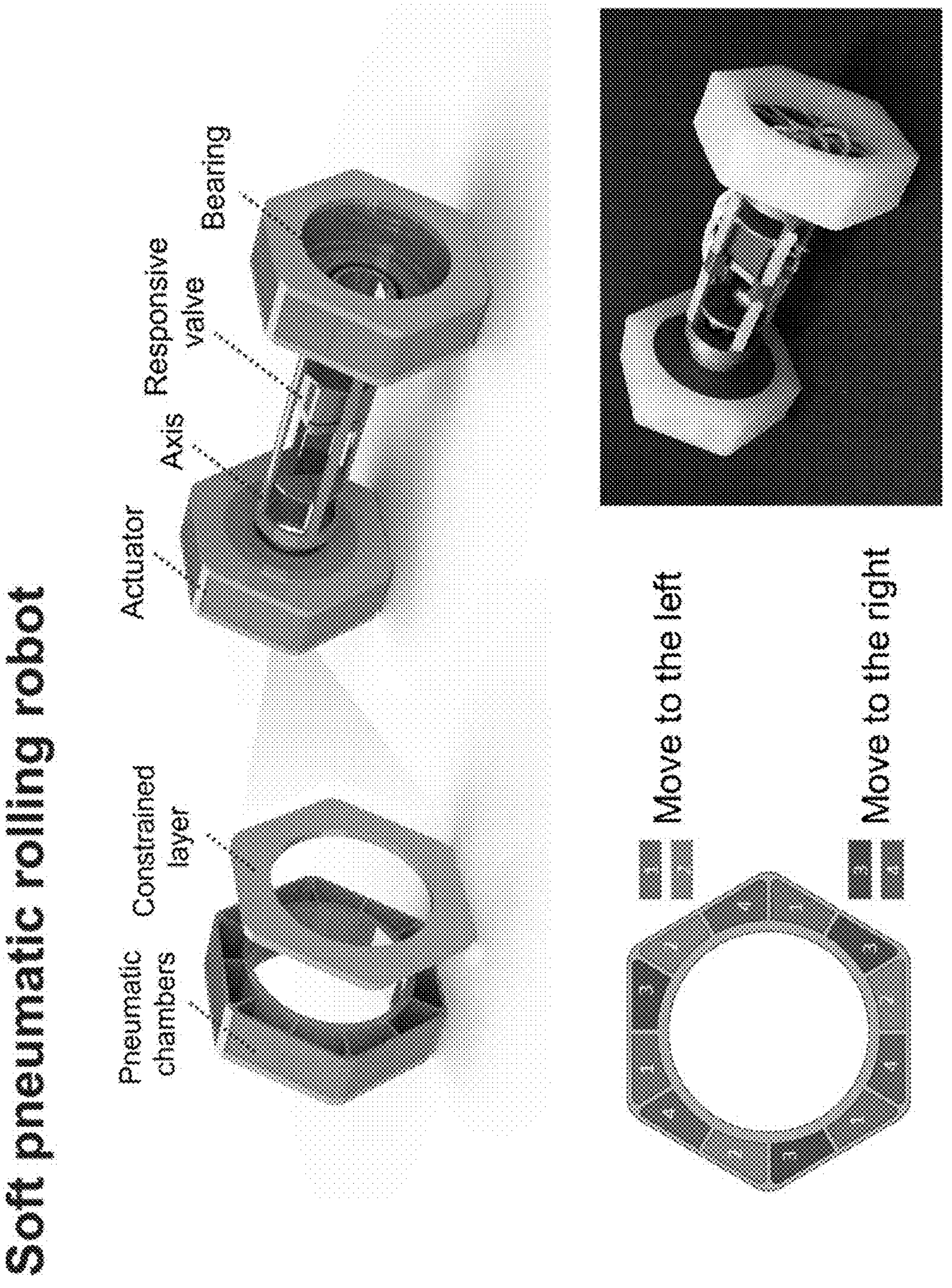
FIG. 14 illustrates an example rolling robot according to the present disclosure.

FIG. 14 illustrates an example rolling robot according to the present disclosure. As shown, periodical inflation of the pneumatic chambers distributed around the actuator can produce rolling of the robot. As but one example, a responsive valve can be actuated so as to actuate (via inflation) chamber no. 1 s and chamber no. 2 s, in an alternating fashion. In this way, the actuator (hexagonal, in this illustrative embodiment) will bulge out in the appropriate location following actuation, thee center of gravity of the actuator shifts, which bulging in turn causes the actuator to tip over. Following each tip-over, the appropriate chamber in the actuator is inflated, causing the actuator to again tip-over, thereby effecting a rolling motion of the robot. A robot can be constructed such that the responsive valve blocks or allows passage of fluid from a fluid source into and out of the appropriate chamber. A robot can be constructed to include one or more valves that mediate fluid transport into and out of the chambers in the actuator.

Figure 15:
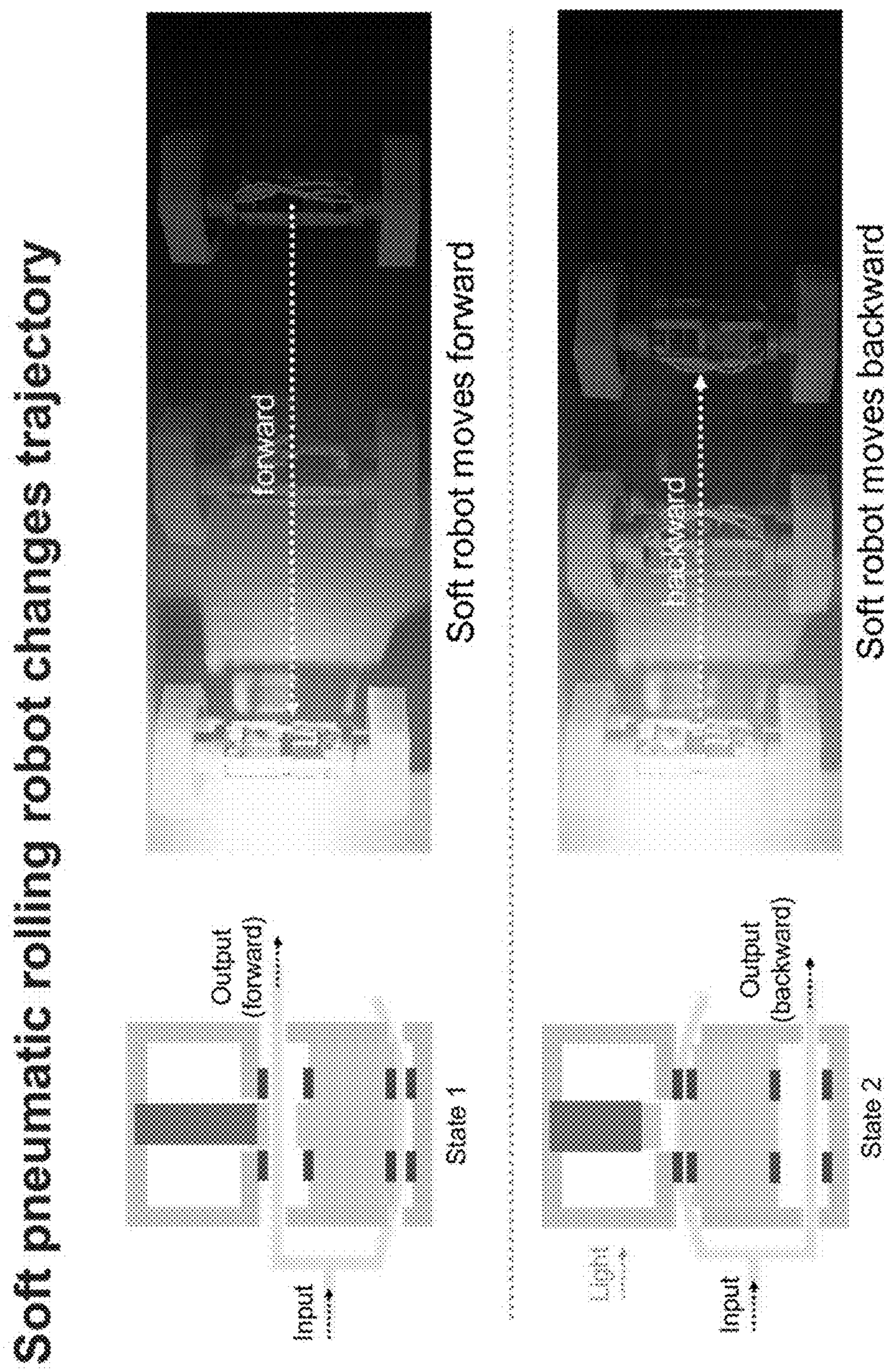
FIG. 15 illustrates an example rolling robot according to the present disclosure, which robot changes its trajectory according to the applied stimulus.

FIG. 15 illustrates an example rolling robot according to the present disclosure, which robot changes its trajectory according to the applied stimulus.

Figure 16:
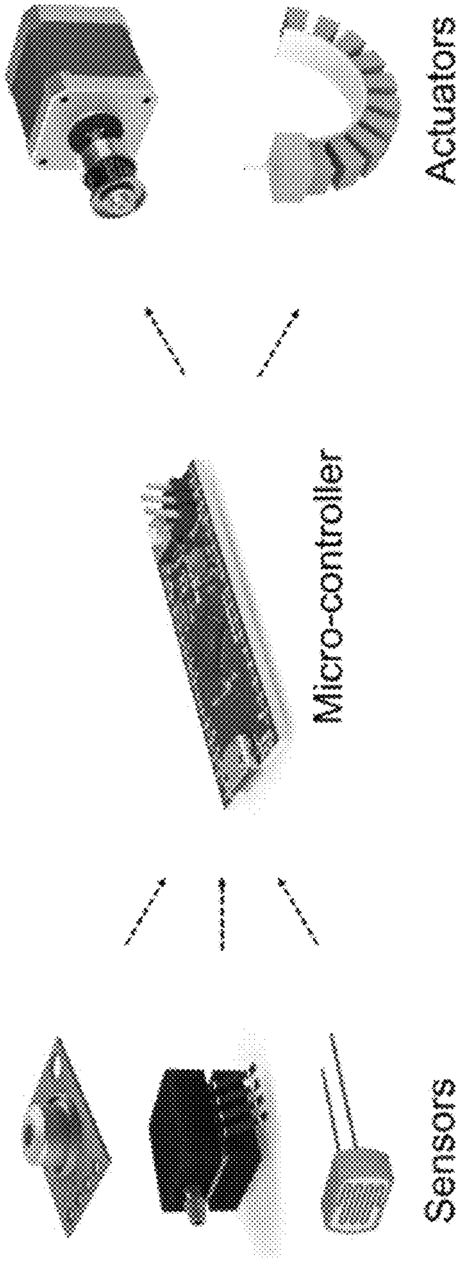
FIG. 16 provides a conventional sensing, control and actuation feedback loop. In order to sense and respond to the environment, most robots use multiple traditional mechatronic devices that can be rigid, bulky, expensive and incompatible with soft materials.

FIG. 16 provides a conventional sensing, control and actuation feedback loop. In order to sense and respond to the environment, most robots use multiple traditional mechatronic devices that can be rigid, bulky, expensive and incompatible with soft materials.

FIGS. 17A and 17B illustrate that feet underneath a robot according to the present disclosure enable it to move forward due to anisotropic friction between the ground and robot. When the pneumatic actuator is inflated, the rear feet act as stationary points and the front of the robot moves forward. Once the pneumatic actuator is deflated, the front feet are stationary, pulling the entire body forward. A displacement (of approximately 1 cm) can be generated after one cycle. Scale bar: 2 cm.

FIG. 18 provides a schematic for discrete model. Each hinge connecting two squares is modeled by three linear springs: a longitudinal spring, a shear spring, and a torsional spring.

FIG. 19 provides

Effects of $K_1$ and $K_2$ on the tensile deformation of a kirigami structure. A. Schematic of a 4×14 kirigami under tensile deformation (the dashed box indicates the initial position of the kirigami). Boundary condition $U_1=V_1=U_2=0$ is applied to the squares in black, and horizontal forces $\overline{F}$ are applied to the squares in green. B. Extension ε of the kirigami as functions of the normalized force $|\overline{F}|$ against different values of $K_1$ with $K_2=0.02$. C. Extension ε of the kirigami as functions of the normalized force $|\overline{F}|$ against different values of $K_2$ with $K_1=0.2$.

FIG. 20 provides

Effects of γ, $K_1$, and $K_2$ on the steering deformation of a kirigami structure embedded with mechanical constraints. A. Schematic of a 4×14 kirigami structure under constraint-driven steering. The two mechanical constraints highlighted in red are located at the center of the bottom row. The external force $\overline{F}$ is allowed to change its direction during steering deformation, and the degree of the direction change is controlled by γ. B. Steering angles α of the kirigami as functions of the normalized force $|\overline{F}|$ against different values of γ with $(K_1, K_2)=(0.2, 0.02)$. C. Steering angles α of the kirigami as functions of the normalized force $|\overline{F}|$ against different values of $K_1$ with $\gamma$=0.1 and $K_2$=0.02. D. Steering angles $\alpha$ of the kirigami as functions of the normalized force $|\overline{F}|$ against different values of $K_2$ with $\gamma$=0.

FIGS. 21A-21D provide a calibration of parameters used in FEA. FIG. 21A. Extension of pneumatic actuator as a function of pressure for both experiments (points) and finite element analysis (solid curves). Parameters for the pneumatic actuator are as follows: C10=14 kPa, k1=350 kPa. FIG. 21B. Comparison of the pneumatic actuator as measured experimentally (white) and simulated via FEA (red). FIG. 21C. Extension of robot (including pneumatic actuator and kirigami layer) under various applied pressures for both experiments (points) and FEA (solid curves). Parameters for the kirigami are as follows: C10=20 kPa. FIG. 21D. Comparison of the actuated robot as measured experimentally (white) and via FEA (red).

FIGS. 22A-22C provide a simplified geometric model for predicting actuating bending angle. FIG. 21A Illustration of geometric parameters of unactuated robot. FIG. 21B—illustration after actuation. FIG. 21C prediction of bending angle for robots with single constraint of various lengths.

FIGS. 23A-23D provide a FEA of robot with rigid mechanical constraints. A The actuated robot with one mechanical constraint of various lengths, showing experiments (optical images) and FEA (in red). B Bending angle of the robot as a function of pressure for both experiments (points) and FEA (solid curves). C-D Same data as in A-B, but now multiple adjacent mechanical constraints are used (instead of the monolithic mechanical constraints of A-B).

FIG. 24 provides an example fluid control system. This system consists of an air pump, micro-controller, solenoid valve, switches, potentiometers, MOSFET, pressure sensors, pressure gauge, and power adapters. The pressurized air can be generated by the air pump, regulated by the solenoid valve through pulse width modulation, and measured by the pressure sensors and pressure gauge.

FIGS. 25A-25B illustrate the effect of the hinge thickness of the kirigami. A: We measure the force-strain relationship of the kirigami platform with different hinge thicknesses (1.0 mm and 1.7 mm). The force is initially small, since the extension of the kirigami is initially rotation dominated. Later, at the "critical strain", the extension becomes stretch-dominated. The smaller hinge thickness (1.0 mm) gives a larger critical strain. B: The kirigami (1.0 mm hinge thickness) extends when the pneumatic actuator is inflated. C: The kirigami (1.7 mm hinge thickness) bends when the pneumatic actuator is inflated, this is due to buckling of the pneumatic actuator. Scale bar in B and C: 2 cm. FIGS. 26A-26B illustrate reversible actuation of LCEs and CNT-LCE composites. A. When the LCE film is heated, it can contract due to a nematic-isotropic phase transition. The LCE can fully recover to its initial shape after cooling. B. When the CNT-LCE film is subjected to intense light, the CNT-LCE composite contracts due to the photothermal effect. The actuation is reversible: the CNT-LCE fully recovers when the light is switched off. Scale bar in A and B: 2 cm.

FIG. 26 illustrates modularity of the disclosed control units. Multiple types of control modules can be easily attached to or removed from the body of a given robot, showing the simplicity of the entire robotic system.

FIGS. 27A-27B illustrate reversible actuation of LCEs and CNT-LCE composites. A. When the LCE film is heated, it can contract due to a nematic-isotropic phase transition. The LCE can fully recover to its initial shape after cooling. B. When the CNT-LCE film is subjected to intense light, the CNT-LCE composite contracts due to the photothermal effect. The actuation is reversible: the CNT-LCE fully recovers when the light is switched off. Scale bar in A and B: 2 cm.

FIGS. 28A-28D illustrate actuation strain and cycling tests of LCE (A, C) and CNT-LCE (B,D). The actuation strain ($\epsilon$) is defined as $\epsilon$=(L−1)/L×100%, where Lis the length of the LCE at room temperature and 1 is the length of the LCE at high temperature. The actuation strain increases with the environmental temperature. Scale bar in A and B: 2 cm.

FIGS. 29A-29B provide an optical image (A) and infrared/thermal image (B) of the robot under the light irradiation A. The CNT-LCE composite strips have relatively higher temperature than the robot body, indicating the CNT-LCE composite strips can absorb light and convert to heat. Scale bar in A: 2 cm.

FIGS. 30A-30B provide an optical image (A) and an infrared/thermal image (B) of the robot under the heat source A. The temperatures of CNT-LCE composite strips and robot body are comparable. Scale bar in A: 2 cm.

FIGS. 31A-31B illustrate response of CNT-LCE under different lighting conditions. A. Actuation strain as a function of time for the CNT-LCE film. In the experiment, the light is switched on for 240 s and then switched off (360 s), the light intensity can be varied by changing the distance between the light source and the sample (420 mm, 320 mm, and 270 mm). The actuation strain gradually increases when the light is switched on. After 100 s, the actuation strain reaches a constant value, corresponding to the steady state. When the light is switched off, the actuation strain drops to 0 within 160 s. B. The maximum surface temperature of the CNT-LCE film during the experiments.

FIGS. 32A-32B illustrate mechanical properties of the CNT-LCE film under different temperatures. A. The force-displacement relationship of the CNT-LCE films (45 mm×15 mm×1 mm) under different temperatures. The maximum force decreases from 50 N to 10 N when the temperature is elevated from 24° C. to 145° C. B. The stress-strain relationship of the CNT-LCE under different temperatures. Both the strength and the stretchability of the CNT-LCE are decreased when the temperature is gradually increased.

FIGS. 33A-33B illustrate mechanical properties of the pristine LCE film under different temperatures. A. The force-displacement relationship of the pristine LCE films (45 mm×15 mm×1 mm) under different temperatures. The maximum force decreases from 60 N to 10 N when the temperature is elevated from 24° C. to 150° C. B. The stress-strain relationship of the CNT-LCE under different temperatures. Both the strength and the stretchability of the CNT-LCE are decreased when the temperature is gradually increased.

FIGS. 34A-34B illustrate bending angle of the kirigami when using different types of mechanical constraints. A. Optical images and B. bending angle ($\alpha$) vs. pressure measurements, which show the effect of different sizes and types of mechanical constraints on the bending angle. Scale bar in A: 2 cm.

FIGS. 35A-35B illustrate the effect of the geometry of the kirigami. In the experiments, three kirigami designs with different geometries (4×10, 4×14, 6×14) are tested. Multiple types of rigid mechanical constraints are attached to the kirigami body. The bending angle of the kirigami is measured. A. Experimental images of the kirigami after inflation of the pneumatic actuator to a pressure of 25 kPa. B. The bending angle $\alpha$ of the kirigami as a function of pressure.

The 4×14 design of the kirigami can generate the largest bending angle. Scale bar in A: 2 cm.

FIGS. 26A-26B illustrate bending of kirigami as a function of the location of rigid mechanical constraints. A 1×4 rigid mechanical constraint is placed at different lo-cations. The bending angle is measured after the pneumatic actuator is pressurized to 25 kPa. Scale bar in A: 2 cm.

FIGS. 37A-37D illustrate the effect of length of the CNT-LCE strip in the control modules. A. Schematic of squares with CNT-LCE strips at different temperatures. B. A strip of length 35 mm is too short to allow free rotation of the kirigami at room temperature (24° C.). C. A strip of length 55 mm is too long to constrain the rotation of the squares, even at high temperature (145° C.). D. The length of the CNT-LCE strip is set to be 45 mm. At 25° C., the pulling force gradually increases when the temperature is increased, which means the CNT-LCE strip constrains the rotation of the squares at high temperatures.

FIG. 38 illustrates repeatability of the control module. The experimental measurements of the bending angle α as a function of the applied pressure under three different inflation/deflation cycles at high temperature (145° C.).

FIGS. 39A-39D illustrate the effect of LCE strip length in the control modules. A. Schematic of squares with LCE strips under different environments (temperatures or exposure of the solvent toluene). B. At room temperature, the pristine LCE cannot prevent the opening of the squares. C. When the temperature is increased, the pristine LCE strip contracts and generates tension. When the kirigami is stretched, the force at 25% strain gradually increases when the temperature of the LCE is increased, which means that the pristine LCE can constrain the rotation of the squares. D. When the LCE strip is exposed to solvents, the LCE contracts due to a nematic-isotropic phase transition. The LCE can thereby generate force and constrain the rotation of the squares.

FIG. 40 illustrates repeatability of the robot's trajectory. The trajectory of the same robot in different runs at same light condition.

FIGS. 41A-41B illustrate that a soft robot steers itself in a dynamic light environment. The soft robot (integrated with control module 3) steers itself and moves toward the light as the light sources are sequentially switched on and off. Scale bar in A: 5 cm.

FIGS. 42A-42B illustrate a swelling mechanism of responsive materials (PDMS or hydrogels). A. We attach the flexible strip with responsive materials (PDMS/hydrogel) onto the kirigami platform. The squares can freely open when there are no stimuli (solvents/water) present in the environment. B. If the control modules are subjected to solvents or water, the responsive materials swell, generating tension in the strip, preventing the square units from rotating and opening.

FIGS. 43A-43B illustrate that a control module can sense and respond to water. A. The control module (integrated with hydrogel) is submerged in water for 2 hours and then attached to the robot. The swollen hydrogel locally prevents the squares from opening when the pneumatic actuator is pressurized. Consequently, the robot bends in the same direction as the module. B. Bending angle α as a function of the applied pressure in different conditions (with water or without water). Scale bar in B: 2 cm.

FIGS. 44A-44B illustrate that a control module can sense and respond to toluene. A. When the module is exposed to toluene, the silicone strip constrains the opening of the squares, causing the kirigami body to bend. In the experiment, we submerge the strip in toluene for 15 minutes and then reattach the strip to the robot. B. Experimental measurements of the bending angle α as a function of the applied pressure under different conditions (with toluene, without toluene). Scale bar in B: 2 cm.

FIGS. 45 and 46 illustrate autonomous changes to trajectory in response to water. FIG. 45 shows that the robot can autonomously steer when exposed to water. When no water is present, the robot moves straight. FIG. 46 provides the trajectory (displacement and steering angle) of the robot in different conditions (without water or with water in the environment). Scale bar: 5 cm.

Figure 47:
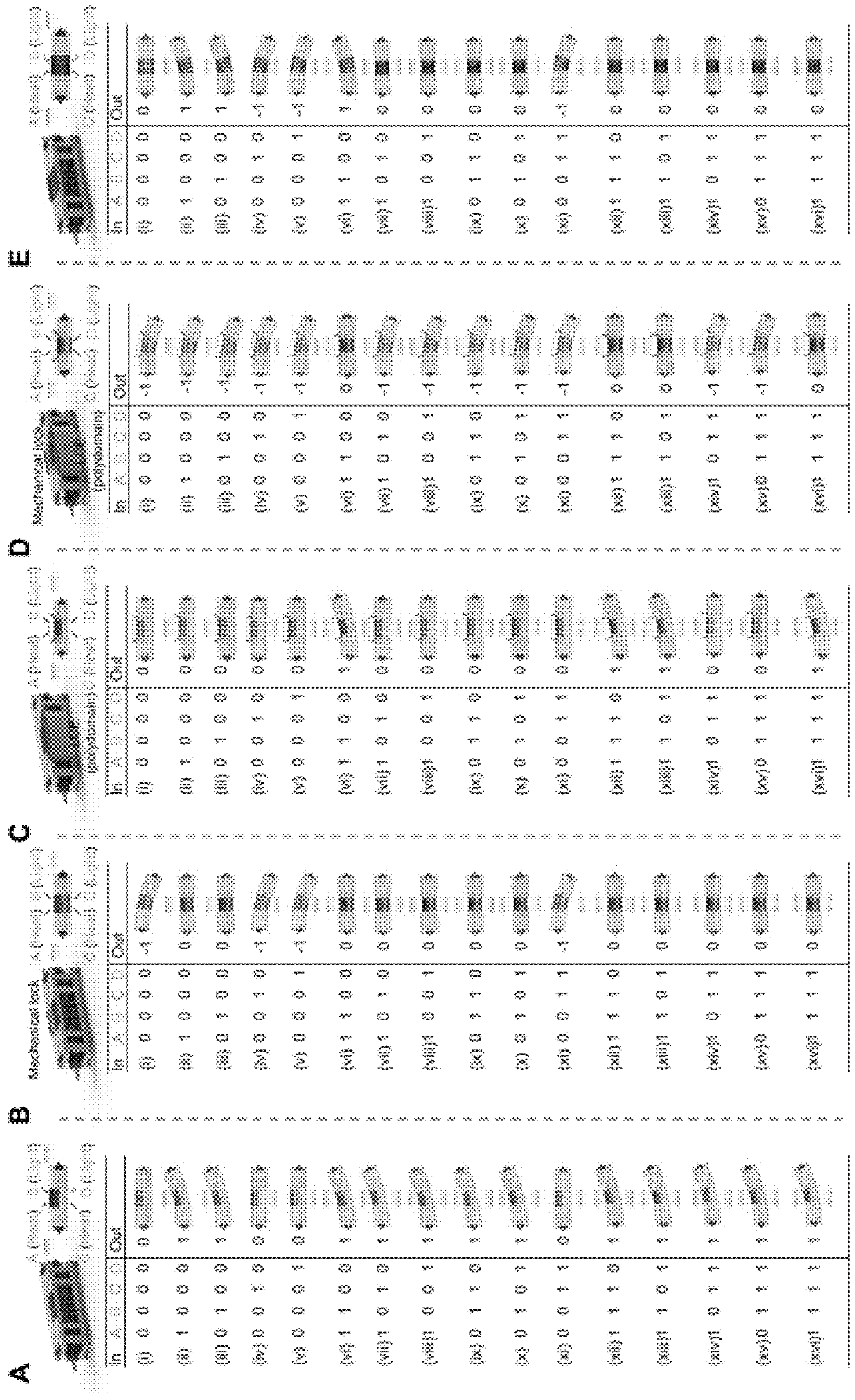

FIG. 47 provides "truth tables" that relate inputs (i.e., the stimuli in the environment) to outputs (i.e., trajectory) for several different control modules. The distance between the robot and the energy source is 200 mm to prevent "over-heating" from occurring too rapidly.

FIGS. 48A-48C provides "OR" response of the robot. A. A single CNT-LCE module (FIG. 3C) acts like a logical "OR". B. The experimental images of the robot under different light and heat conditions. When the robot is subjected to light or heat, the control module is activated, causing the robot to bend to the left. C. Measurements of bending angle α as a function of the applied pressure under different light and heat conditions. Scale bar in B: 2 cm.

FIGS. 49A-49C provide a trajectory caused by an "OR" module of the previous figure. A. The truth table of the "OR" response. B-C. Experimental images and trajectories, respectively, of the robot with different heat or light inputs. Scale bar in B: 5 cm.

FIGS. 50A-50C provide "NOR" response of the robot. A. For the "NOR" response, we attach a "mechanical lock" module and a CNT-LCE module (i.e., FIG. 3C) to the body of the robot. B. The experimental images of the robot under different light and heat conditions. With no stimuli present (A=B=C=D=0), the mechanical lock causes the robot to bend to the right. When the CNT-LCE control module is subjected to heat or light from the left, the activation of the module cancels the effect of the mechanical lock, causing the robot to move straight ahead. C. Measurements of bending angle α as a function of the applied pressure under different light and heat conditions. Scale bar in B: 2 cm.

FIGS. 51A-51C provide "AND" response of the robot. A. For the "AND" response, we attach a mask control module to the exterior of a CNT-LCE module (FIG. 3C). B. The experimental images of the robot under different light and heat conditions. When the robot is exposed to only heat or light from the left side, (A=1, B=C=D=0 or A=0, B=1, C=D=0), the CNT-LCE cannot be actuated because the mask blocks the stimulus. Therefore the robot moves straight ahead. If the robot is exposed to both heat and light (A=B=1, C=D=0), the mask becomes transparent, allowing light to pass through it to actuate the inner CNT-LCE module. As a result, the robot bends to the left. C. Measurement of the bending angle α as a function of the applied pressure under different light and heat conditions. Scale bar in B: 2 cm.

FIGS. 52A-52B illustrate that the polydomain LCE changes its transparency when the temperature is increased A. At room temperature, the polydomain LCE is opaque. B. At high temperature, the LCE is transparent due to a nematic-isotropic phase transition. Scale bar in B: 2 cm.

FIGS. 53A-53C provide "NAND" response of the robot. A. For the "NAND" response, we use a "mechanical lock" module, "mask" module, and CNT-LCE module. B. The robot bends to the right when subjected to only heat or light from the left side (A=1, B=C=D0 or A=0, B=1, C=D=0). However, if the robot is exposed to both heat and light, the mechanical constraints on the two sides cancel one another, causing the robot to move straight ahead. C. Measurement of the bending angle α as a function of the applied pressure under different light and heat conditions. Scale bar in B: 2 cm.

FIGS. 54A-54C provide the trajectories caused by a "NAND" response. A. The truth table of the "NAND" response. B-C. Experimental images and trajectories, respectively, of the robot with different heat or light inputs. Scale bar in B: 2 cm.

FIGS. 55A-55C provide "XOR" response of the robot. A. In this case, two identical control modules are distributed symmetrically along the two sides of the robot body. B. When one side of the control module is subjected to light or heat, the body of the robot bends toward the stimulus. If the control modules on both sides are active, their effects cancel, causing the robot to move straight ahead. C. Measurement of the bending angle α as a function of the applied pressure under different light and heat conditions. Scale bar in B: 2 cm.

FIG. 56 provides an infrared/thermal image of the environment with multiple external stimuli.

FIG. 57 provides additional thermal images of the electronics-free soft robot in different environments.

FIG. 58 illustrates that a robot can sense and respond to the light from top.

FIG. 59 illustrates fabrication of the pneumatic actuator. The pneumatic actuator is fabricated following a conventional molding-casting process. The silicone precursor (Eco flex 30) is poured into the 3D printed mold and cured. Then, a Kevlar fiber is wrapped on the surface of the cured silicone tube. After that, we encapsulate the Kevlar fiber by pouring another layer of the silicone precursor. Two caps are finally glued to the tube and we insert an air tube at one end.

FIG. 60 illustrates fabrication of the rotating squares kirigami platform. The rotating squares kirigami platform is fabricated following a conventional molding-casting process. The silicone precursor (Dragonkin 10) is poured into the 3D-printed mold and cured.

FIGS. 61A-61B illustrate connecting the kirigami body and pneumatic actuator. A. Schematic shows how the actuator and kirigami body are connected to each other. B. All the squares can be freely opened when pressure is applied to the pneumatic actuator. The actuator does not buckle when the applied pressure is 25 kPa. Scale bar in B. 2 cm.

FIG. 62 illustrates a structure of control module 1. This control module consists of two layers of the silicone kirigami (red), two rigid rods, and a CNT-LCE strip.

FIG. 63 provides a detailed structure of control module 2. This control module consists of two layers of the silicone kirigami (blue), four 3D-printed beams, two rigid rods, and a LCE strip.

FIG. 64 provides a detailed structure of control module 3. This control module consists of two layers of the silicone kirigami (green), sixteen 3D-printed beams, four rigid rods, and two CNT-LCE strips.

FIG. 65 provides a detailed structure of control modules 4 and 5. This control module consists of two layers of the silicone kirigami (pink), two rigid rods, and a woven strip integrated with hydrogel or PDMS.

FIG. 66 provides a detailed structure of control module 6. This control module consists of a layer of the silicone kirigami (orange), and a 3D-printed mechanical constraint.

FIG. 67 provides a detailed structure of control module 7. This control module consists of four layers of the silicone kirigami (yellow), and four 3D-printed beams, two rigid rods, and a polydomain LCE.

FIG. 68 illustrates integration of control modules. The silicone kirigami of the control module (blue) is attached to the kirigami layers (gray) of the soft robot. Eight pins are inserted into the holes of the kirigami to connect the control module and robot.

Aspects

The following Aspects are illustrative only and do not limit the scope of the present disclosure or the appended claims. Any part or parts of any one or more Aspects can be combined with any part or parts of any one or more other Aspects.

Aspect 1. A stimulus-responsive robot, comprising: an extensible actuator, the extensible actuator being configured such that extension and contraction of the extensible actuator effects a translational movement of the robot; and the first control unit being in mechanical communication with the extensible actuator, the first control unit comprising a first material responsive to a first external non-electrical stimulus, the control unit being configured to exert a bending force on the extensible actuator, the bending force being related to a response of the first material to the first external stimulus.

As explained elsewhere herein, the control unit can be configured to exert a bending force on the extensible actuator in response to the first external stimulus. Thus, the control unit need not be electrically actuated and can be free of any electrical connections. For example, the control unit can, in some non-limiting embodiments, be responsive to applied heat and/or applied light. In some non-limiting embodiments, the control unit can be heated via Joule heating, e.g., via Joule heating of bodies within the control unit, which heating in turn results in a change in length of a material of the control unit. Similarly, the actuator need not be electrically actuated and can be actuated without application of an electrical current to the actuator. The control unit can thus be responsive to an external stimulus that is applied from external to the control unit. A control unit can also comprise a material that does not change length in response to a current applied to that material but that changes length in response to a non-electrical stimulus (e.g., heat As one example, a pneumatic actuator can be used; in such an actuator, the introduction of pressurized fluid (e.g., air, liquid) can act to extend the actuator. Other actuators, e.g., dielectric elastomer actuators (DEAs) and shape memory alloys can be used. Without being bound to any particular theory or embodiment, one can use an actuators that generates a reversible extension/contraction.

Aspect 2. The robot of Aspect 1, wherein the first control unit is releasably engageable with the extensible actuator. The control unit can be plugged into/onto the actuator, for example.

Aspect 3. The robot of any one of Aspects 1-2, wherein the first control unit comprises a first material that experiences a change in length in response to the external stimulus. The length change can be, e.g., from about 1% to about 35%, from about 5% to about 30%, from about 10% to about 25%, from about 15% to about 20%. Length changes of around 25% are considered particularly suitable.

Aspect 4. The robot of Aspect 3, wherein the first material effects bending of the extensible actuator toward the first stimulus.

Aspect 5. The robot of Aspect 3, wherein the first material effects bending of the extensible actuator away from the first stimulus.

Aspect 6. The robot of Aspect 3, wherein the first material comprises a liquid crystal elastomer. Other materials can be, e.g., hydrogel, silicone rubber, or composites of these materials (e.g., addition of cellulose fibers in hydrogels or glass fibers in silicone).

Aspect 7. The robot of Aspect 3, wherein the first material links two members of the control unit.

Aspect 8. The robot of any one of Aspects 1-7, where in the first stimulus is illumination, heat, or a solvent. As an example, when the environmental stimulus is exposed toward one side of the robot, the rotating square units on that side remain closed. As a result, the robot bends toward the stimulus; when the environmental stimulus is applied to both sides equally (i.e., when the stimulus is directly in front of the robot), then the rotating square units on both sides remain closed, canceling each other out; the robot extends toward the stimulus.

Aspect 9. The robot of any one of Aspects 1-8, further comprising a mechanical lock configured to maintain the extensible actuator in a bent condition in the absence of the first external stimulus.

Aspect 10. The robot of Aspect 9, wherein the mechanical lock comprises at least one resilient member.

Aspect 11. The robot of any one of Aspects 1-10, further comprising a second control unit, the second control unit comprising a second material that experiences a change in length, transparency, or both in response to a second stimulus, the second stimulus optionally being illumination, heat, or a solvent.

Aspect 12. The robot of Aspect 11, wherein the second stimulus differs from the first stimulus.

Aspect 13. The robot of Aspect 12, wherein the second control unit is configured such that the first control unit is susceptible to the first external stimulus only when the second control unit is exposed to the second external stimulus. By reference to FIG. 22, the first control unit (yellow color) can change transparency from an opaque state to a transparent state when it is exposed to heat. The second control unit (red) color can generate tension when the light is applied. When the heat AND light are presented, the first control unit becomes transparent, then the light can pass through the first control unit and can be applied to the second control unit. The robot bends as a result.

Aspect 14. The robot of any one of Aspects 11-13, further comprising a mechanical lock configured to maintain the extensible actuator in a bent condition in the absence of the first external stimulus and the second external stimulus.

Aspect 15. The robot of Aspect 14, wherein the mechanical lock comprises a resilient member.

Aspect 16. The robot of any one of Aspects 1-15, further comprising a plurality of structural units in mechanical communication with the extensible actuator.

Aspect 17. The robot of Aspect 16, wherein at least one of the structural units is configured to engage with the control unit.

Aspect 18. The robot of any one of Aspects 16-17, wherein at least two units are linked to one another by a linkage, the linkage optionally being a rotational linkage.

Aspect 19. The robot of any one of Aspects 1-18, further comprising a gradient source in communication with the extensible actuator, the gradient source configured to effect extension and/or contraction of the extensible actuator.

In the appended figures, the illustrative (non-limiting) robot is controlled by a fluidic control system. The fluidic control system can precisely determine air pressure and, time of inflation time period via pulse width modulation method. A fluidic control system can include, e.g., an air pump, microcontroller, and solenoid valves.

Aspect 20. A method, comprising effecting operation of a robot according to any one of Aspects 1-19.

Aspect 21. A stimulus-responsive robot, comprising: an extensible actuator, the extensible actuator being configured such that extension and contraction of the extensible actuator effects a translational movement of the robot; and at least one control unit in in mechanical communication with the extensible actuator, the at least one control unit comprising a material being responsive to a first external non-electrical stimulus, the control unit being configured to exert a bending force on the extensible actuator, the bending force being related to a response of the material to the first external stimulus, the bending being sufficient to change a direction of the translational movement of the robot in response to extension and contraction of the extensible actuator.

As shown in the appended figures, one can attach the feet underneath the robot body, the feet can generate anisotropic friction during inflation of the actuator. When the actuator is inflated, the rear feet are stationary, the front feet move forward; when the actuator is deflated, the front feet are stationary and the entire body moves forward.

Aspect 22. A method, comprising effecting operation of a robot according to Aspect 21.

Aspect 23. A stimulus-responsive robot, comprising: a first control unit comprising a first material responsive to an external non-electrical stimulus, the first control unit being configured such that one of exposure or removal of the external non-electrical stimulus effects passage of a fluid into a first chamber of the robot and the other of exposure or removal of the external non-electrical stimulus allows passage of the fluid from the first chamber of the robot, passage of the fluid into the first chamber inflating the first chamber so as to effect motion of the robot in a first direction. A control unit can be according to the present disclosure, e.g., according to FIG. 13 and related disclosure or as described elsewhere herein.

Aspect 24. The robot of Aspect 23, wherein the first control unit is configured such that one of exposure or removal of the external non-electrical stimulus effects passage of a fluid into a second chamber of the robot and the other of exposure or removal of the external non-electrical stimulus allows passage of the fluid from the second chamber of the robot, passage of the fluid into the first chamber inflating the second chamber so as to effect motion of the robot in the first direction.

Aspect 25. The robot of Aspect 24, wherein the first control unit is configured such that one of exposure or removal of the external non-electrical stimulus effects passage of the fluid into the first chamber of the robot and the second chamber of the robot.

Aspect 26. The robot of Aspect 23, further comprising a second control unit, the second control unit configured such that one of exposure or removal of the external non-electrical stimulus effects passage of a fluid into a second chamber of the robot and the other of exposure or removal of the external non-electrical stimulus allows passage of the fluid from the second chamber of the robot, passage of the fluid into the second chamber inflating the first chamber so as to effect motion of the robot in a second direction that is generally opposite to the first direction.

Aspect 27. A method, comprising operating a robot according to any one of Aspects 23-26 so as to effect motion of the robot.

An example robot is provided in FIG. 14. As shown, a robot can be constructed such that application of a stimulus to a control unit responsive to that stimulus allows for passage of a fluid (e.g., air) into a pneumatic chamber located within an actuator (in this instance, a hexagonal wheel) of the robot. The wheel comprises two sets of pneumatic chambers, one enables the wheel to move left while another move to right The introduction of the air in turn inflates the chamber, and the inflated chamber in turn protrudes from the wheel. The protruding chamber cause the center of gravity of the wheel shift, thereby effectively rotating the wheel. This can be accomplished by, e.g., inflating chamber no. 4 at the bottom of the lower left panel of FIG. 14. After that chamber inflates, protrudes, and effected tipping of the wheel, the robot can be operated to inflate chamber no. 3 (which would then be at the bottom of the wheel, following the wheel's motion after being tipped from inflation of chamber no. 4), thereby rising the wheel up and causing the wheel to tip. As shown, an actuator comprising the pneumatic chambers can be polygonal in configuration, thereby allowing for step-wise motion of the robot. A second control unit can be present, which second control unit can be used to effect introduction of fluid (e.g., air) to chambers in an actuator on the other side of the robot, which in turn allows for simultaneous inflation of corresponding chambers on opposing actuators, which permits concerted motion of the device. The second control unit can also be configured to effect inflation of an opposing chamber on an opposite actuator (e.g., so that one actuator of the robot moves in one direction and the opposing actuator of the robot moves in the other direction), thereby allowing the robot to execute a turn. The control units can, as described elsewhere herein, be responsive to a stimulus (e.g., light, heat, water, solvent) and can thereby steer the robot toward a stimulus or even away from the stimulus.

An exemplary illustration of such a robot's operation is provided in FIG. 15. As shown, a robot according to the present disclosure is exposed to a stimulus (in this instance, light), to which stimulus the control unit responds. As shown in FIG. 15, when the control unit is in State 1, pneumatic chambers of the robot inflate so as to tip the robot in a forward direction. When light is applied, the control unit is in State 2, in which state the pneumatic chambers inflate so as to tip the robot in in a backward direction. In this way, the soft robot can autonomously reverse its moving direction under external stimulus.

Aspect 28. A stimulus-responsive robot, comprising: a moveable element and a conduit, the moveable element and conduit being arranged such that in a resting state, the moveable element effects occlusion of the conduit; and a first control unit, the first control unit being in mechanical communication with the moveable element, the first control unit comprising a first material responsive to a first external non-electrical stimulus, the control unit being configured to, when exposed to the first external non-electrical stimulus exert a force on the moveable actuator so as to reduce or eliminate the occlusion of the conduit by the moveable element. FIG. 9 and FIG. 11 provide examples of such a robot.

Aspect 29. The robot of Aspect 28, wherein the first material contracts in response to heat, light, or both. Such a material can be, e.g., LCE.

Aspect 30. The robot of Aspect 28, wherein the first material is water-swellable. Such a material can be, e.g., a hydrogel.

Aspect 31. A stimulus-responsive robot, comprising: a moveable element and a conduit, the moveable element and conduit being arranged such that in a resting state, the moveable element effects occlusion of the conduit; and a first control unit, the first control unit being in mechanical communication with the moveable element, the first control unit comprising a first material responsive to a first external non-electrical stimulus, the control unit being configured to, when exposed to the first external non-electrical stimulus exert a force on the moveable actuator so as increase occlusion of the conduit by the moveable element. FIGS. 10 and 12 provide examples of such a robot.

Aspect 32. The robot of Aspect 31, wherein the first material contracts in response to heat, light, or both. Such a material can be, e.g., LCE.

Aspect 33. The robot of Aspect 31, wherein the first material is a water-swellable material. Such a material can be, e.g., a hydrogel.

Aspect 34. A switchable component, comprising: a moveable element; a first control unit in mechanical communication with the moveable element, the first control unit comprising a first material responsive to a first external non-electrical stimulus; a first conduit; and a second conduit, the moveable element and the first conduit and the second conduit being arranged such that when the switchable component is in a first state, the first conduit is unoccluded and the moveable element effects occlusion of the second conduit; and when the first material contracts in response to exposure to the first external non-electrical stimulus, the first material exerts a force on the moveable actuator so as to reduce occlusion of the second conduit by the moveable element and increase occlusion of the first conduit by the moveable element. Such a component is shown in FIG. 13, which illustrates that by application of a non-electrical stimulus (e.g., heat, light), the component can be switched between a first state and a second state, thereby changing the location of the component's output.

Aspect 35. The component of Aspect 34, wherein the first material contracts in response to heat, light, or both.

Aspect 36. The component of Aspect 34, wherein the first material is a water-swellable material.

As shown herein, the "steering" control module allows the robot to move directly toward a stimulus source. One can could move the stimulus source (e.g., a light source) around and the robot would steer toward it. Liquid crystal elastomers can be actuated via Joule heating of electrical elements. If resistors are placed in the material of a control unit, then then the robot's movement can be guided via an electrical remote controller, e.g., to guide the movement of a drone.

The disclosed robots can be useful in situations where a user may desire a robot responsive to different stimuli. Such a robot can be useful in case where the robot needs to protect itself from damaging stimuli. For instance, the robot can could be designed to sense and detect move away from a toxic chemical or an excessively high temperature. This "protective" strategy can be used to cancel an operational control strategy (e.g., "move toward water, unless a temperature above 100 C is detected, in which case move away).

Although external stimuli are shown as controlling robot motion, external stimuli can also be used to control other aspects of the robot's operation. For example, external stimuli can modulate the robot's color (e.g., a pH indicator or other solvent indicator), the release of a payload from the robot (e.g., via a control unit that opens a payload compartment in response to an external stimulus), the direction of a camera or other sensor mounted on the robot, and the like.

REFERENCES

1. Carmel Majidi. Soft robotics: a perspective—current trends and prospects for the future. Soft Robot., 1(1): 5-11, 2014.

2. D. Rus and M. T. Tolley. Structures undergoing discrete phase transformation. Nature, 521: 467-475, 2015.
3. Cecilia Laschi, Matteo Cianchetti, Barbara Mazzolai, Laura Margheri, Maurizio Follador, and Paolo Dario. Soft robot arm inspired by the octopus. Adv. Robot., 26(7): 709-727, 2012.
4. Robert F Shepherd, Filip Ilievski, Wonjae Choi, Stephen A Morin, Adam A Stokes, Aaron D Mazzeo, Xin Chen, Michael Wang, and George M Whitesides. Multigait soft robot. Proc. Natl. Acad. Sci. U.S.A., 108(51): 20400-20403, 2011.
5. Matteo Cianchetti, Cecilia Laschi, Arianna Menciassi, and Paolo Dario. Biomedical applications of soft robotics. Nat. Rev. Mater., 3(6): 143-153, 2018.
6. Zhao, Kevin O'Brien, Shuo Li, and Robert F Shepherd. Optoelectronically innervated soft prosthetic hand via stretchable optical waveguides. Sci. Robot., 1(1): eaai7529, 2016.
7. Michael Ishida, Dylan Drotman, Benjamin Shih, Mark Hermes, Mitul Luhar, and Michael T Tolley. Morphing structure for changing hydrodynamic characteristics of a soft underwater walking robot. IEEE Robot. Autom. Lett., 4(4): 4163-4169, 2019.
8. Arda Kotikian, Connor McMahan, Emily C Davidson, Jalilah M Muhammad, Robert D Weeks, Chiara Daraio, and Jennifer A Lewis. Untethered soft robotic matter with passive control of shape morphing and propulsion. Sci. Robot., 4(33):eaax7044, 2019.
9. Cagdas D Onal and Daniela Rus. Autonomous undulatory serpentine locomotion utilizing body dynamics of a fluidic soft robot. Bioinspir. Biomim., 8(2): 026003, 2013.
10. Tom Kalisky, Yueqi Wang, Benjamin Shih, Dylan Drotman, Saurabh Jadhav, Eliah Aronoff-Spencer, and Michael T Tolley. Differential pressure control of 3d printed soft fluidic actuators. In 2017 IEEE/RSJ International Conference on Intelligent Robots and Systems (IROS), pages 6207-6213. IEEE, 2017.
11. Yichuan Wu, Justin K Yim, Jiaming Liang, Zhichun Shao, Mingjing Qi, Junwen Zhong, Zi hao Luo, Xiaojun Yan, Min Zhang, Xiaohao Wang, et al. Insect-scale fast moving and ultrarobust soft robot. Sci. Robot., 4(32): eaax 1594, 2019.
12. Zhijian Wang, Kai Li, Qiguang He, and Shengqiang Cai. A light-powered ultralight tensegrity robot with high deformability and load capacity. Adv. Mater., 31(7): 1806849, 2019.
13. M T Tolley, R F Shepherd, B. Mosadegh, K C Galloway, M. Wehner, M. Karpelson, R J Wood, and GM Whitesides. A resilient, untethered soft robot. Soft Robot., 2014.
14. Hyunwoo Yuk, Shaoting Lin, Chu Ma, Mahdi Takaffoli, Nicolas X Fang, and Xuanhe Zhao. Hydraulic hydrogel actuators and robots optically and sonically camouflaged in water. Nat. Commun., 8(1): 1-12, 2017.
15. Yinding Chi, Yaoye Hong, Yao Zhao, Yanbin Li, and Jie Yin. Snapping for high-speed and high-efficient butterfly stroke-like soft swimmer. Sci. Adv., 8(46):eadd3788, 2022.
16. Xiaobin Ji, Xinchang Liu, Vito Cacucciolo, Matthias Imboden, Yoan Civet, Alae El Haitami, Sophie Cantin, Yves Perriard, and Herbert Shea. An autonomous untethered fast soft robotic insect driven by low-voltage dielectric elastomer actuators. Sci. Robot., 4(37): eaaz6451, 2019.
17. Eric Acome, Shane K Mitchell, T G Morrissey, M B Emmett, Claire Benjamin, Madeline King, Miles Radakovitz, and Christoph Keplinger. Hydraulically amplified self-healing electrostatic actuators with muscle-like performance. Science, 359(6371): 61-65, 2018.
18. Qiguang He, Zhijian Wang, Yang Wang, Adriane Minori, Michael T Tolley, and Shengqiang Cai. Electrically controlled liquid crystal elastomer-based soft tubular actuator with multimodal actuation. Sci. Adv., 5(10):eaax5746, 2019.
19. Qiguang He, Zhijian Wang, Yang Wang, Zijun Wang, Chenghai Li, Raja Annapooranan, Jian Zeng, Renkun Chen, and Shengqiang Cai. Electrospun liquid crystal elastomer microfiber actuator. Sci. Robot., 6(57): eabi9704, 2021.
20. Yao Zhao, Yaoye Hong, Fangjie Qi, Yinding Chi, Hao Su, and Jie Yin. Self-sustained snapping drives autonomous dancing and motion in free-standing wavy rings. Adv. Mater., page 2207372, 2022.
21. Qiji Ze, Xiao Kuang, Shuai Wu, Janet Wong, S Macrae Montgomery, Rundong Zhang, Joshua M Kovitz, Fengyuan Yang, H Jerry Qi, and Ruike Zhao. Magnetic shape memory polymers with integrated multifunctional shape manipulation. Adv. Mater., 32(4): 1906657, 2020.
22. Yoonho Kim, Hyunwoo Yuk, Ruike Zhao, Shawn A Chester, and Xuanhe Zhao. Printing ferromagnetic domains for untethered fast-transforming soft materials. Nature, 558(7709): 274-279, 2018.
23. Yusen Zhao, Chen Xuan, Xiaoshi Qian, Yousif Alsaid, Mutian Hua, Lihua Jin, and Ximin He. Soft phototactic swimmer based on self-sustained hydrogel oscillator. Sci. Robot., 4(33):eaax7112, 2019.
24. Yusen Zhao, Chiao-Yueh Lo, Lecheng Ruan, Chen-Huan Pi, Cheolgyu Kim, Yousif Al-said, Imri Frenkel, Rossana Rico, Tsu-Chin Tsao, and Ximin He. Somatosensory actuator based on stretchable conductive photothermally responsive hydrogel. Sci. Robot., 6(53):eabd5483, 2021.
25. Eric Brown, Nicholas Rodenberg, John Amend, Annan Mozeika, Erik Steltz, Mitchell R Zakin, Hod Lipson, and Heinrich M Jaeger. Universal robotic gripper based on the jamming of granular material. Proc. Natl. Acad. Sci. U.S.A., 107(44): 18809-18814, 2010.
26. Filip Ilievski, Aaron D Mazzeo, Robert F Shepherd, Xin Chen, and George M Whitesides. Soft robotics for chemists. Angewandte Chem. Int. Ed., 123(8): 1930-1935, 2011.
27. Chengjun Wang, Kyoseung Sim, Jin Chen, Hojin Kim, Zhoulyu Rao, Yuhang Li, Weiqiu Chen, Jizhou Song, Rafael Verduzco, and Cunjiang Yu. Soft ultrathin electronics innervated adaptive fully soft robots. Adv. Mater., 30(13): 1706695, 2018.
28. Yichao Tang, Yinding Chi, Jiefeng Sun, Tzu-Hao Huang, Omid H Maghsoudi, Andrew Spence, Jianguo Zhao, Hao Su, and Jie Yin. Leveraging elastic instabilities for amplified performance: Spine-inspired high-speed and high-force soft robots. Sci. Adv., 6(19): eaaz6912, 2020.
29. Yongjin Kim, Jay van den Berg, and Alfred J Crosby. Autonomous snapping and jumping polymer gels. Nat. Mater., 20(12): 1695-1701, 2021.
30. Nicholas W Bartlett, Michael T Tolley, Johannes T B Overvelde, James C Weaver, Bobak Mosadegh, Katia Bertoldi, George M Whitesides, and Robert J Wood. A 3d-printed, functionally graded soft robot powered by combustion. Science, 349(6244): 161-165, 2015.
31. JH Pikul, S Li, H Bai, RT Hanlon, I Cohen, and Robert F Shepherd. Stretchable surfaces with programmable 3d texture morphing for synthetic camouflaging skins. Science, 358(6360): 210-214, 2017.

32. Emmanuel Siefert, ´Etiienne Reyssat, Jose´ Bico, and Benoˆit Roman. Bio-inspired pneumatic shape-morphing elastomers. Nat. Mater., 18(1): 24-28, 2019.
33. Thomas George Thuruthel, Benjamin Shih, Cecilia Laschi, and Michael Thomas Tolley. Soft robot perception using embedded soft sensors and recurrent neural networks. Sci. Robot., 4(26): eaav1488, 2019.
34. Kevin Y Ma, Pakpong Chirarattananon, Sawyer B Fuller, and Robert J Wood. Controlled flight of a biologically inspired, insect-scale robot. Science, 340(6132): 603-607, 2013.
35. Zhenishbek Zhakypov, Kazuaki Mori, Koh Hosoda, and Jamie Paik. Designing minimal and scalable insect-inspired multi-locomotion millirobots. Nature, 571(7765): 381-386, 2019.
36. Jonathan Sauder, Evan Hilgemann, Jessie Kawata, Katie Stack, Aaron Parness, and Michael Johnson. Automation rover for extreme environments (aree). 2017.
37. Hiromi Yasuda, Philip R Buskohl, Andrew Gillman, Todd D Murphey, Susan Stepney, Richard A Vaia, and Jordan R Raney. Mechanical computing. Nature, 598 (7879): 39-48, 2021.
38. Metin Sitti. Physical intelligence as a new paradigm. Extreme Mech. Lett., 46:101340, 2021.
39. Michael Wehner, Ryan L Truby, Daniel J Fitzgerald, Bobak Mosadegh, George M White-sides, Jennifer A Lewis, and Robert J Wood. An integrated design and fabrication strategy for entirely soft, autonomous robots. Nature, 536(7617): 451-455, 2016.
40. Yao Zhao, Yinding Chi, Yaoye Hong, Yanbin Li, Shu Yang, and Jie Yin. Twisting for soft intelligent autonomous robot in unstructured environments. Proc. Natl. Acad. Sci. U.S.A., 119(22):e2200265119, 2022.
41. Huachen Cui, Desheng Yao, Ryan Hensleigh, Haotian Lu, Ariel Calderon, Zhenpeng Xu, Sheyda Davaria, Zhen Wang, Patrick Mercier, Pablo Tarazaga, et al. Design and printing of proprioceptive three-dimensional architected robotic metamaterials. Science, 376(6599): 1287-1293, 2022.
42. Dylan Drotman, Saurabh Jadhav, David Sharp, Christian Chan, and Michael T Tol-ley. Electronics-free pneumatic circuits for controlling soft-legged robots. Sci. Robot., 6(51): eaay2627, 2021.
43. Philipp Rothemund, Alar Ainla, Lee Belding, Daniel J Preston, Sarah Kurihara, Zhigang Suo, and George M Whitesides. A soft, bistable valve for autonomous control of soft actuators. Sci. Robot., 3(16): eaar7986, 2018.
44. Ahmad Rafsanjani, Katia Bertoldi, and Andre' R Studart. Programming soft robots with flexible mechanical metamaterials. Sci. Robot., 4(29): eaav7874, 2019.
45. Katia Bertoldi, Vincenzo Vitelli, Johan Christensen, and Martin Van Hecke. Flexible mechanical metamaterials. Nat. Rev. Mater., 2(11): 1-11, 2017.
46. Hiromi Yasuda, Tomohiro Tachi, Mia Lee, and Jinkyu Yang. Origami-based tunable truss structures for non-volatile mechanical memory operation. Nat. Commun., 8(1): 1-7, 2017.
47. Tie Mei, Zhiqiang Meng, Kejie Zhao, and Chang Qing Chen. A mechanical metamaterial with reprogrammable logical functions. Nat. Commun., 12(1): 1-11, 2021.
48. Treml, A. Gillman, P. Buskohl, and R. Vaia. Origami mechanologic. Proc. Natl. Acad. Sci. U.S.A., 115(27): 6916-6921, 2018.
49. Yaoye Hong, Yinding Chi, Shuang Wu, Yanbin Li, Yong Zhu, and Jie Yin. Boundary curvature guided programmable shape-morphing kirigami sheets. Nat. Commun., 13(1): 1-13, 2022.
50. Yanbin Li, Qiuting Zhang, Yaoye Hong, and Jie Yin. 3d transformable modular kirigami based programmable metamaterials. Adv. Funct. Mater., 31(43): 2105641, 2021.
51. Yijie Jiang, Lucia M Korpas, and Jordan R Raney. Bifurcation-based embodied logic and autonomous actuation. Nat. Commun., 10(1): 128, 2019.
52. Lucia M Korpas, Rui Yin, Hiromi Yasuda, and Jordan R Raney. Temperature-responsive multistable metamaterials. ACS Appl. Mater. Interfaces, 13(26): 31163-31170, 2021.
53. J. Grima and K. Evans. Auxetic behavior from rotating squares. J. Mater. Sci. Lett., 19:1563, 2000.
54. B. Deng, J. R. Raney, V. Tournat, and K. Bertoldi. Elastic vector solitons in soft architected materials. Phys. Rev. Lett., 118:204102, 2017.
55. B. Deng, C. Mo, V. Tournat, K. Bertoldi, and J. R. Raney. Focusing and mode separation of elastic vector solitons in a 2d soft mechanical metamaterial. Phys. Rev. Lett., 123:024101, 2019.
56. H. Yasuda, L. M. Korpas, and J. R. Raney. Transition waves and formation of domain walls in multistable mechanical metamaterials. Phys. Rev. Appl., 13:054067, May 2020.
57. Zhihyung Ahn, Xudong Liang, and Shengqiang Cai. Inhomogeneous stretch induced patterning of molecular orientation in liquid crystal elastomers. Extreme Mech. Lett., 5: 30-36, 2015.
58. J M Boothby and T H Ware. Dual-responsive, shape-switching bilayers enabled by liquid crystal elastomers. Soft Matter, 13(24): 4349-4356, 2017.
59. Yuanyuan Shang, Junchao Liu, Manbo Zhang, Wanli He, Xinyu Cao, Jingxia Wang, Tomiki Ikeda, and Lei Jiang. Reversible solvent-sensitive actuator with continuous bend-ing/debending process from liquid crystal elastomer-colloidal material. Soft Matter, 14(27): 5547-5553, 2018.
60. Caixia Yang, Fang Su, Yixue Xu, Yan Ma, Li Tang, Ningbo Zhou, Enxiang Liang, Guox-iang Wang, and Jianxin Tang. ph oscillator-driven jellyfish-like hydrogel actuator with dissipative synergy between deformation and fluorescence color change. ACS Macro Lett., 11(3): 347-353, 2022.
61. Zhijian Wang, Wei Fan, Qiguang He, Yang Wang, Xudong Liang, and Shengqiang Cai. A simple and robust way towards reversible mechanochromism: Using liquid crystal elastomer as a mask. Extreme Mech. Lett., 11: 42-48, 2017.
62. Fionnuala Connolly, Panagiotis Polygerinos, Conor J Walsh, and Katia Bertoldi. Mechanical programming of soft actuators by varying fiber angle. Soft Robot., 2(1): 26-32, 2015.
63. C M. Yakacki, M. Saed, D P. Nair, T. Gong, S M. Reed, and C N. Bowman "Tailorable and programmable liquid-crystalline elastomers using a two-stage thiol-acrylate reaction," RSC Adv. 5(25), 18997-19001 (2015).
64. Jeong-Yun Sun, Xuanhe Zhao, Widusha R K Illeperuma, Ovijit Chaudhuri, Kyu Hwan, Oh, David J Mooney, Joost J Vlassak, and Zhigang Suo "Highly stretchable and tough hydrogels," Nature, 489(7414), 133-136 (2012).
65. Qiguang He, Zhijian Wang, Yumin Yan, Jianlin Zheng, and Shengqiang Cai "Polymer nanofiber reinforced double network gel composite: Strong, tough and transparent," Extreme Mech. Lett. 9, 165-170(2016).
66. Sang Yup Kim, Robert Baines, Joran Booth, Nikolaos Vasios, Katia Bertoldi, and Rebecca Kramer-Bottiglio "Reconfigurable soft body trajectories using unidirectionally stretchable composite laminae," Nat. Commun. 10(1), 1-8 (2019).

67. Panagiotis Polygerinos, Stacey Lyne, Zheng Wang, Luis Fernando Nicolini, Bobak Mosadegh, George M Whitesides, and Conor J Walsh "Towards a soft pneumatic glove for hand rehabilitation," IEEE/RSJ International Conference on Intelligent Robots and Systems", 1512-1517 (2013).

What is claimed:

1. A stimulus-responsive robot, comprising:

a flexible body;

an extensible actuator coupled to the flexible body, the extensible actuator being configured such that extension and contraction of the extensible actuator effects a translational movement of the robot via the flexible body; and a first control unit, the first control unit being in mechanical communication with the extensible actuator via the flexible body, the first control unit comprising a first material responsive to a first external non-electrical stimulus, the control unit being configured to exert a bending force on the extensible actuator via the flexible body, the bending force being related to a response of the first material to the first external stimulus.

2. The robot of claim 1, wherein the first control unit is releasably engageable with the extensible actuator.

3. The robot of claim 1, wherein the first control unit comprises a first material that experiences a change in length in response to the first external non-electrical stimulus.

4. The robot of claim 3, wherein the first material effects bending of the extensible actuator toward the first external non-electrical stimulus.

5. The robot of claim 3, wherein the first material effects bending of the extensible actuator away from the first external non-electrical stimulus.

6. The robot of claim 3, wherein the first material comprises a liquid crystal elastomer, a hydrogel, a silicone rubber, or any combination thereof.

7. The robot of claim 3, wherein the first material links two members of the control unit.

8. The robot of claim 1, where in the first external non-electrical stimulus is illumination, heat, or a solvent.

9. The robot of claim 1, further comprising a mechanical lock configured to maintain the extensible actuator in a bent condition in the absence of the first external non-electrical stimulus.

10. The robot of claim 9, wherein the mechanical lock comprises at least one resilient member.

11. The robot of claim 1, further comprising a second control unit, the second control unit comprising a second material that experiences a change in length, transparency, or both in response to a second external stimulus.

12. The robot of claim 11, wherein the second external stimulus differs from the first external non-electrical stimulus.

13. The robot of claim 12, wherein the second control unit is configured such that the first control unit is susceptible to the first external non-electrical stimulus only when the second control unit is exposed to the second external stimulus.

14. The robot of claim 11, further comprising a mechanical lock configured to maintain the extensible actuator in a bent condition in the absence of the first external non-electrical stimulus and the second external stimulus.

15. The robot of claim 14, wherein the mechanical lock comprises a resilient member.

16. The robot of claim 15, wherein at least one of the structural units is configured to engage with the control unit.

17. The robot of claim 11, wherein the second external stimulus is heat when the second material experiences the change in transparency.

18. The robot of claim 11, wherein the second external stimulus is illumination, heat, or a solvent when the second material experiences the change in length.

19. The robot of claim 1, further comprising a plurality of structural units in mechanical communication with the extensible actuator.

20. The robot of claim 19, wherein at least two units are linked to one another by a linkage, the linkage optionally being a rotational linkage.

21. The robot of claim 1, further comprising a gradient source in communication with the extensible actuator, the gradient source configured to effect extension and/or contraction of the extensible actuator.

22. A method, comprising effecting operation of a robot according to claim 1.

23. The robot of claim 1, wherein the flexible body comprises a plurality of connected sub-units.

24. The robot of claim 1, wherein the plurality of connected sub-units comprise a plurality of connected squares, and wherein the plurality of connected squares are configured to rotate based on pressure applied via the extensible actuator.

25. The robot of claim 1, wherein the robot further comprises one or more feet, and the translational movement of the robot is based on the one or more feet causing anisotropic friction between the robot and a surface.

26. A stimulus-responsive robot, comprising:

a flexible body;

an extensible actuator coupled to the flexible body, the extensible actuator being configured such that extension and contraction of the extensible actuator effects a translational movement of the robot via the flexible body; and at least one control unit in in mechanical communication with the extensible actuator, the at least one control unit comprising a material being responsive to a first external non-electrical stimulus via the flexible body, the control unit being configured to exert a bending force on the extensible actuator via the flexible body, the bending force being related to a response of the first material to the first external stimulus, the bending being sufficient to change a direction of the translational movement of the robot in response to extension and contraction of the extensible actuator.

27. A method, comprising effecting operation of a robot according to claim 26.

* * * * *